(12) United States Patent
Li

(10) Patent No.: US 11,008,898 B2
(45) Date of Patent: May 18, 2021

(54) SINGLE WORKING-MEDIUM VAPOR COMBINED CYCLE AND VAPOR POWER DEVICE FOR COMBINED CYCLE

(71) Applicant: Huayu Li, Shandong (CN)

(72) Inventor: Huayu Li, Shandong (CN)

(\*) Notice: Subject to any disclaimer, the term of this patent is extended or adjusted under 35 U.S.C. 154(b) by 0 days.

(21) Appl. No.: 16/090,189

(22) PCT Filed: Sep. 29, 2017

(86) PCT No.: PCT/CN2017/000611
§ 371 (c)(1),
(2) Date: Sep. 28, 2018

(87) PCT Pub. No.: WO2018/068430
PCT Pub. Date: Apr. 19, 2018

(65) Prior Publication Data
US 2019/0112949 A1    Apr. 18, 2019

(30) Foreign Application Priority Data

Oct. 12, 2016  (CN) .......................... 201610920013.X

(51) Int. Cl.
*F01K 23/06*    (2006.01)
*F01K 25/00*    (2006.01)
(Continued)

(52) U.S. Cl.
CPC ................ *F01K 23/06* (2013.01); *F01K 7/44* (2013.01); *F01K 11/02* (2013.01); *F01K 23/02* (2013.01);
(Continued)

(58) Field of Classification Search
CPC . F01K 23/06; F01K 7/44; F01K 11/02; F01K 23/02; F01K 25/00; F01K 25/005; F02C 7/16; F02C 1/105; Y02E 20/16
(Continued)

(56) References Cited

U.S. PATENT DOCUMENTS

| 7,096,665 B2 * | 8/2006 | Stinger | ................... F01K 25/08 60/651 |
| 7,827,792 B2 * | 11/2010 | Brown, Jr. | .............. F01K 9/003 60/653 |

(Continued)

FOREIGN PATENT DOCUMENTS

JP    2009-191762    *    8/2009

*Primary Examiner* — Hoang M Nguyen

(57) ABSTRACT

The single working-medium vapor combined cycle and the vapor power device for combined cycle is provided in this invitation and belongs to the field of energy and power technology. The condenser connects the mixing evaporator by a condensate pipeline via the circulating pump and the preheater, the expander connects the mixing evaporator by a vapor channel via the middle-temperature evaporator, the mixing evaporator connects the compressor and the second expander by a vapor channel, the compressor connects the expander by a vapor channel via the high-temperature heat exchanger, the second expander connects the condenser by a vapor channel; the condenser connects the middle-temperature evaporator by a condensate pipeline via the second circulating pump and a second preheater, the middle-temperature evaporator connects the third expander and the condenser by a vapor channel; the high-temperature heat exchanger, the middle-temperature evaporator, the mixing evaporator, the preheater and the second preheater connects the external part by a working-medium channel of the heat source, the expander connects the compressor and transfers power, the expander, the second expander and the third expander connects the external part and output power, in summary, these above-mentioned equipment and pipelines build up the vapor power device for combined cycle.

24 Claims, 25 Drawing Sheets

(51) Int. Cl.
*F01K 7/44* (2006.01)
*F01K 23/02* (2006.01)
*F01K 11/02* (2006.01)
*F02C 7/16* (2006.01)
*F02C 1/10* (2006.01)

(52) U.S. Cl.
CPC .............. *F01K 25/00* (2013.01); *F02C 1/105* (2013.01); *F02C 7/16* (2013.01); *Y02E 20/16* (2013.01)

(58) Field of Classification Search
USPC .. 60/649, 650, 673, 682–684, 655, 677–680
See application file for complete search history.

(56) References Cited

U.S. PATENT DOCUMENTS

| | | | |
|---|---|---|---|
| 7,971,424 B2 * | 7/2011 | Masada | F01K 9/003 60/39.182 |
| 8,056,350 B2 * | 11/2011 | Minds | F01K 13/00 60/641.8 |
| 8,857,186 B2 * | 10/2014 | Held | F01K 25/08 60/655 |

* cited by examiner

SINGLE WORKING-MEDIUM VAPOR COMBINED CYCLE AND VAPOR POWER DEVICE FOR COMBINED CYCLE

FIELD

This invention belongs to the flied of energy and power technology.

BACKGROUND

Cold demand, heat demand and power demand are common in human life and production. In the field of power demand technology, the conversion of thermal energy into mechanical energy is an important way to obtain and provide power. For the case of a high-temperature heat source such as a nuclear-reaction-driven heat source, and an external combustion type steam power device using steam as a circulating working-medium, when the steam is working—because it is subjected to temperature and pressure resistance of the material and the safety limitation—there is often a large temperature difference between the circulating working-medium and the heat source, that is, the irreversible loss is large and the thermal efficiency is low, which means that the potential for improving the thermal efficiency is very large.

For example, an external combustion type steam power device using steam as a circulating medium has significant advantages in working medium, heat-releasing in a low temperature and dynamic load range: For example, water vapor has a wide parameter working range; The exothermic temperature of the cycle be close to the environment, the load range of the device is wide, etc. In order to improve the efficiency of conversion of thermal energy into mechanical energy, the current main measure is to make the water vapor work in a critical, supercritical or ultra-supercritical state, which requires heat exchange tube bundles to support both high pressure and high temperature, but this is extremely difficult, so the temperature difference between steam and gas is still very large. It is precisely because of the material properties that there is still a large temperature difference between the average endothermic temperature of water vapor and the average exothermic temperature of the heat source (such as high temperature gas), making it difficult to achieve a substantial breakthrough in the improvement of thermal efficiency; in addition, taking the operation of critical, supercritical or ultra-supercritical parameters brings about a reduction in the operational safety of the steam power device.

In order to improve the thermal efficiency of high-temperature thermal energy conversion to mechanical energy, in order to improve the thermal efficiency of a vapor power device with solid fuel (such as coal) as input energy, and to consider the advantages of the vapor power device, overcoming the shortages of the thermal efficiency and safety of the steam power device, the present invention proposes the single work-medium vapor combined cycle and the vapor power device for combined cycle; The present invention greatly improve the thermal efficiency of the steam power device and the safety of the operation of the steam power device while retaining the advantages of the steam power device.

THE CONTENTS OF THE INVENTION

The single working-medium vapor combined cycle and the vapor power device for combined cycle are mainly provided in this invention, and the specific content of the invention is as follows:

1. Single working-medium vapor combined cycle comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 from a low temperature in liquid state, the heat-absorption and vaporization process 2-3 because of the mixing with the working-medium weighing $m_2$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 3-4, the heat-absorption process 4-5 from the heat source, the pressure-decreasing and working process 5-6, and the heat-releasing process 6-3 because of the mixing with the working-medium weighing $m_1$ kg, in summary, these above-mentioned processes build up the thermal cycle 3-4-5-6-3.

2. Single working-medium vapor combined cycle comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 from a low temperature in liquid state, the heat-absorption and vaporization process 2-3 because of the mixing with the working-medium weighing $m_2$ kg and the heat-absorption from the heat source, the pressure-decreasing and working process 3-7, and the heat-releasing and condensation process 7-1, in summary, these above-mentioned processes build up the thermal cycle 1-2-3-7-1; The working-medium weighing $m_2$ kg work in the 3-7-1; The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

3. Single working-medium vapor combined cycle comprises separate thermal cycles of the working-medium weighing m kg and the working-medium weighing $m_2$ kg and mix-heating between the two, among them, the working-medium weighing $m_1$ kg work in the following order: the temperature-rising process 1-2 from a low temperature in liquid state, the heat-absorption process 2-a from the heat source, the heat-absorption and vaporization process a-3 because of the mixing with the working-medium weighing $m_2$ kg, the pressure-decreasing and working process 3-7, and the heat-releasing and condensation process 7-1, in summary, these above-mentioned processes build up the thermal cycle 1-2-a-3-7-1; The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

4. Single working-medium vapor combined cycle comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 from a low temperature in liquid state, the heat-absorption process 2-a from the heat source, the heat-absorption and vaporization process a-3 because of the mixing with the working-medium weighing $m_2$ kg and the heat-absorption from the heat source, the pressure-decreasing and working process 3-7, and the heat-releasing and condensation process 7-1, in summary, these above-mentioned processes build up the thermal cycle 1-2-a-3-7-1; The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

5. Single working-medium vapor combined cycle comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 of the working-medium weighing $(m_1-m_e)$ kg from a low temperature in liquid state, the extraction mixing process 2-b between the working-medium weighing $(m_1-m_c)$ kg and the working-medium weighing $m_c$ kg, the pressure-rising process b-c of the working-medium weighing $m_1$ kg, the heat-absorption and vaporization process c-3 because of the mixing with the working-medium weighing $m_2$ kg, the pressure-decreasing and working process 3-a of the working-medium weighing $m_1$ kg, the heat-releasing and condensation process a-b of the working-medium weighing $m_c$ kg because of the mixing with the working-medium weighing $m_c$ kg in the state of point 2, the pressure-decreasing and working process a-7 of the working-medium weighing $(m_1-m_c)$ kg, the heat-releasing to the cold source and condensation process of the working-medium weighing $(m_1-m_c)$ kg, in summary, these above-mentioned processes build the extraction vapor reheating cycle (1-2-b-c-3-7-1+b-c-3-a-b); The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

6. Single working-medium vapor combined cycle comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 of the working-medium weighing $(m_1-m_e)$ kg from a low temperature in liquid state, the extraction mixing process 2-b between the working-medium weighing $(m_1-m_c)$ kg and the working-medium weighing $m_c$ kg, the pressure-rising process b-c of the working-medium weighing $m_1$ kg, the heat-absorption and vaporization process c-3 because of the mixing with the working-medium weighing $m_2$ kg and the heat-absorption from the heat source, the pressure-decreasing and working process 3-a of the working-medium weighing $m_1$ kg, the heat-releasing and condensation process a-b of the working-medium weighing $m_c$ kg because of the mixing with the working-medium weighing $m_c$ kg in the state of point 2, the pressure-decreasing and working process a-7 of the working-medium weighing $(m_1-m_c)$ kg, the heat-releasing to the cold source and condensation process 7-1 of the working-medium weighing $(m_1-m_e)$ kg, in summary, these above-mentioned processes build the extraction vapor reheating cycle (1-2-b-c-3-7-1+b-c-a-b); The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

7. If 'the heat-absorption process 4-5 from the heat source of the working-medium weighing $m_2$ kg' is replaced by 'the heat-absorption process 4-e and the heat-absorption process e-5 from the heat source', 'the mix-heating process 6-3 between the working-medium weighing $m_1$ kg and the working fluids weighing $m_2$ kg' is replaced by 'the extraction heat-releasing process 6-d and the mix-heating process d-3', and heat of the heat-releasing process of the process 6-d satisfies the heat of the heat-absorption of the process 4-e, these above-mentioned processes build up the Single working-medium vapor combined cycle.

8. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the vaporization process a-8 which absorbs the heat from the process 6-b, the pressure-decreasing and working process 8-9, the heat-releasing to the cold source and the condensation process 9-1, in summary, these above-mentioned processes build up the thermal cycle 1-a-8-9-1; The working process weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

9. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg and the heat-absorption from the heat source, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the vaporization process a-8 which absorbs the heat from the process 6-b, the pressure-decreasing and working process 8-9, the heat-releasing to the cold source and the condensation process 9-1, in summary, these above-mentioned processes build up the thermal cycle 1-a-8-9-1; The working process weighing $m_3$ kg work in the following order: the pressure-rising process 3-4, the heat-absorption process 4-5 from the heat source, the pressure-decreasing process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

10. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_2$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the heat-absorption and vaporization process a-8 which absorbs the heat from the process 6-b and heat source, the pressure-decreasing and working process 8-9, the heat-releasing to the cold source and the condensation process 9-1, in summary, these above-mentioned processes build up the thermal cycle 1-a-8-9-1; The working process weighing $m_3$ kg work in the following order: the pressure-rising process 3-4, the heat-absorption process 4-5 from the heat source, the pressure-decreasing process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

11. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg and the heat-absorption from the heat source, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the heat-absorption and vaporization process a-8 which absorbs the heat from the process 6-b and the heat source, the pressure-decreasing and working process 8-9, the heat-releasing to the cold source and the condensation process 9-1, in summary, these above-mentioned processes build up the thermal cycle 1-a-8-9-1; The working process weighing $m_3$ kg work in the following order: the pressure-rising process 3-4, the heat-absorption process 4-5 from the heat source, the pressure-decreasing process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

12. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption process 2-c from an external heat source, the heat-absorption and vaporization process 2-3 because of the mixing with the working-medium weighing $m_3$ kg or the heat-absorption from the heat source as the same time, the pressure-decreasing and working process 3-7, and the heat-releasing and condensation process 7-1, in summary, these above-mentioned processes build up the thermal cycle 1-2-c-3-7-1; The working-medium weighing $m_2$ kg work in the following order: the pressure-rising process 1-a from a low temperature in liquid state, the vaporization process a-8 which absorbs the heat from the process 6-b, the pressure-decreasing and working process 8-9, the heat-releasing to the cold source and the condensation process 9-1, in summary, these process build up the thermal cycle 1-a-8-9-1; The working process weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

13. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the heat-absorption process ac from the external heat source, the vaporization process d-8 which absorbs the heat from the process 6-b or the heat from the heat source as the same time, the pressure-decreasing and working process 8-9, the heat-releasing to the cold source and the condensation process 9-1, in summary, these above-mentioned processes build up the thermal cycle 1-a-8-9-1; The working process weighing $m_3$ work in the following order: the pressure-rising process 3-4, the heat-absorption process 4-5 from the heat source, the pressure-decreasing process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

14. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption process 2-c from the external heat source, the heat-absorption and vaporization process c-3 because of the mixing with the working-medium weighing $m_3$ kg or the heat-absorption from the heat source as the same time, the pressure-decreasing and working process 3-7, and the heat-releasing and condensation process 7-1, in summary, these above-mentioned processes build up the thermal cycle 1-2-c-3-7-1; The working-medium weighing $m_2$ kg work in the following order: the pressure-rising process 1-a from a low temperature in liquid state, the heat-absorption process ad from the external heat source, the heat-absorption and vaporization process d-8 which absorbs the heat from the process 6-b or the heat from the heat source as the same time, the pressure-decreasing and working process 8-9, the heat-releasing to the cold source and the condensation process 9-1, in summary, these above-mentioned process build up the thermal cycle 1-a-d-8-9-1; The working-medium weighing $m_3$ kg work in the following order: the pressure-rising process 3-4, the heat-absorption process 4-5 from the heat source, the pressure-decreasing process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

15. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ work in the following order: the pressure-rising process 1-2 of the working fluids weighing $(m_1-m_c)$ kg from a low temperature in liquid state, the extraction mixing process 2-e between the working-medium weighing $(m_1-m_c)$ kg and the working-medium weighing $m_c$ kg, the pressure-rising process e-f of the working-medium weighing $m_1$ kg, the heat-absorption and vaporization process f-3 of the working-medium weighing $m_1$ kg because of the mixing between the working-medium weighing $m_1$ kg and the working-medium weighing $m_3$ kg or the heat-absorption from the heat source as the same time, the pressure-decreasing and working process 3-d of the working-medium weighing $m_1$ kg, the heat-releasing and condensation process d-e because of the mixing between the working-medium weighing $m_c$ kg and the working-medium weighing $(m_1-m_c)$ kg in the state of point 2, the pressure-decreasing and working process d-7 of the working-medium weighing $(m_1-m_c)$ kg, the heat-releasing to the cold source and condensation process 7-1 of the working-medium weighing $(m_1-m_c)$ kg, in summary, these above-mentioned processes build up the extraction vapor reheating cycle (1-2-e-f-3-7-1+e-f-3-d-e); The working-medium weighing $m_2$ kg work in the following order: the pressure-rising process 1-a from a low temperature in liquid state, the heat-absorption and vaporization process a-8 which absorbs the heat of the heat-releasing process 6-b of the working-medium weighing $m_3$ kg or the heat from the heat source as the same time, the pressure-decreasing and working process 8-9, the heat-releasing and condensation process 9-1, in summary, these above-mentioned processes build up the cycle 1-a-8-9-1; The working-medium weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$, the heat-releasing process b-3 because of the mixing with the working-medium weighing $m_1$ kg, in summary, these above-mentioned processes build up the cycle 3-4-5-6-b-3.

16. Single working-medium vapor combined cycle comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ work in the following order: the pressure-rising process 1-2 from a low temperature in liquid state, the heat-absorption and vaporization process 2-3 because of the mixing with the working-medium weighing $m_3$ kg, the pressure-decreasing and working process 3-7, the heat-releasing and condensation process 7-1 to the cold source, in summary, these above-mentioned processes build up the cycle 1-2-3-7-1; The working-medium weighing $m_2$ kg work in the following order: the pressure-rising process 1-a of the working-medium weighing $(m_2-m_c)$ kg from a low temperature in liquid state, the extraction vapor mixing process a-e between the working-medium weighing $(m_2-m_c)$ kg and the working-medium weighing $m_c$ kg, the pressure-rising process e-f of the working-medium weighing $m_2$ kg, the vaporization process f-8 which absorbs the heat from the heat-releasing process 6-b of the working-medium weighing $m_3$ kg or the heat from the heat source as the same time, the pressure-decreasing and working process 8-d of the working-medium weighing $m_2$ kg, the heat-releasing and condensation process d-e because of the mixing between the working-medium weighing $m_c$ kg and the working-medium weighing $(m_2-m_c)$ kg in the state of point 2, the pressure-decreasing and working process d-9 of the working-medium weighing $(m_2-m_c)$ kg, the heat-releasing to the cold source and condensation process 9-1 of the working-medium weighing $(m_2-m_c)$ kg, in summary, these above-mentioned processes build up the extraction vapor reheating cycle (1aef891+ef8de); The working-medium weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$, the heat-releasing process b-3 because of the mixing with the working-medium weighing $m_1$ kg, in summary, these above-mentioned processes build up the cycle 3-4-5-6-b-3.

17. Single working-medium vapor combined cycle comprises separate thermal cycle of the working-medium weighing $m_1$, the working-medium weighing $m_3$, the working-medium weighing $m_3$ and mix-heating between the working-medium weighing $m_1$ and the working-medium weighing $m_2$, and the heat exchange between the working-medium weighing $m_1$ kg and the working-medium weighing $m_3$ kg, among them, the working-medium weighing $m_1$ work in the following order: the pressure-rising process 1-2 of the working fluids weighing $(m_1-m_{c1})$ kg from a low temperature in liquid state, the extraction mixing process 2-e between the working-medium weighing $(m_1-m_{c1})$ kg and the working-medium weighing $m_{c1}$ kg, the pressure-rising process e-f of the working-medium weighing $m_1$ kg, the heat-absorption and vaporization process f-3 of the working-medium weighing $m_1$ kg because of the mixing between the working-medium weighing $m_1$ kg and the working-medium weighing $m_3$ kg or the heat-absorption from the heat source as the same time, the pressure-decreasing and working process 3-d of the working-medium weighing $m_1$ kg, the heat-releasing and condensation process d-e because of the mixing between the working-medium weighing $m_{c1}$ kg and the working-medium weighing $(m_1-m_{c1})$ kg in the state of point 2, the pressure-decreasing and working process d-7 of the working-medium weighing $(m_1-m_{c1})$ kg, the heat-releasing to the cold source and condensation process 7-1 of the working-medium weighing $(m_1-m_{c1})$ kg, in summary, these above-mentioned processes build up the extraction vapor reheating cycle (1-2-e-f-3-7-1+e-f-3-d-e); The working-medium weighing $m_2$ kg work in the following order: the pressure-rising process 1-a of the working-medium weighing $(m_2-m_cz)$ kg from a low temperature in liquid state, the extraction vapor mixing process ah between the working-medium weighing $(m_2-m_{c2})$ kg and the working-medium weighing $m_{c2}$ kg, the pressure-rising process h-i of the working-medium weighing $m_2$ kg, the vaporization process i-8 which absorbs the heat from the heat-releasing process 6-b of the working-medium weighing $m_3$ or the heat from the heat source as the same time, the pressure-decreasing and working process 8-g of the working-medium weighing $m_2$, the heat-releasing and condensation process g-h because of the mixing between the working-medium weighing $m_cz$ kg and the working-medium weighing $(m_2-m_{c2})$ kg in the state of point 2, the pressure-decreasing and working process g-9 of the working-medium weighing $(m_2-m_{c2})$ kg, the heat-releasing to the cold source and condensation process 9-1 of the working-medium weighing $(m_2-m_{c2})$ kg, in summary, these above-mentioned processes build up the extraction vapor reheating cycle (1-a-h-i-8-9-1+g-h-i-8-g); The working-medium weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$, the heat-releasing process b-3 because of the mixing with the working-medium weighing $m_1$ kg, in summary, these above-mentioned processes build up the cycle 3-4-5-6-b-3.

18. If 'the heat-absorption process 4-5 of the working-medium weighing $m_3$ kg' is replaced by 'the heat-absorption process 4-k and the heat-absorption process k-5 from the heat source', and 'the heat-releasing process 6-b of the working-medium weighing $m_3$ kg to the working-medium weighing $m_2$ kg' is replaced by 'the heat-releasing process 6-j, which meets the thermal requirement of the heat-absorption process 4-k, and the heat-releasing process j-b to the working-medium weighing $m_2$ kg', these above-mentioned processes build up the single working-medium vapor combined cycle.

19. A vapor power device for combined cycle comprises a compressor, an expander, the second expander, a circulating pump, a high temperature heat exchanger, a condenser and a mixing evaporator; The condenser connects the mixing evaporator by a condensate pipeline via the circulating pump, the expander connects the mixing evaporator by a vapor channel, the mixing evaporator connects the compressor and the second expander respectively, the compressor connects the expander by a vapor channel via the high temperature heat exchanger, the second expander connects condenser by a vapor channel; The high temperature heat exchanger connects the external part by the working-medium channel of the heat source, the condenser connects the external part by a refrigerant working-medium channel, the mixing evaporator connect to the external part by a working-medium channel of the heat source, the expander connects compressor and transfers power, the expander and the second expander connect to the external part and output power, these above-mentioned equipment and pipelines build up the vapor power device for combined cycle; Among them, the expander be connected to the compressor and the circulating pump and transfers power.

20. A vapor power device for combined cycle comprises a compressor, an expander, the second expander, a circulating pump, a high temperature heat exchanger, a condenser, a mixing evaporator, a reheater and the second circulating pump; The condenser connects the reheater by a condensate pipeline via the circulating pump, the second expander connects the reheater by a extraction vapor channel, the reheater connects the mixing evaporator by a condensate pipeline via the second circulating pump, the expander connects the mixing evaporator by a vapor channel, the mixing evaporator connects the compressor and the second expander respectively, the compressor connects the expander by a vapor channel via the high temperature heat exchanger, the second expander connects the condenser by a vapor channel; The high temperature heat exchanger connects the external part by a working-medium channel of the heat source, the condenser connects the external part by a refrigerant channel, the mixing evaporator is connected with the external part by a working-medium channel of heat source, the expander connects the compressor and transfers power, the expander and the second expander connect to the external part and output power, these above-mentioned equipment and pipelines build up the vapor power device for combined cycle; Among them, the expander be connected with the compressor, the circulating pump and the second circulating pump and transfers power.

21. A vapor power device for combined cycle comprises a compressor, an expander, the second expander, a circulating pump, a high temperature heat exchanger, a condenser, a mixing evaporator and a preheater; The condenser connects the mixing evaporator by a condensate pipeline via the circulating pump and the preheater, the expander connects the mixing evaporator by a vapor channel, the mixing evaporator connects the compressor and the second expander respectively, the compressor connects the expander by a vapor channel via the high temperature heat exchanger, the second expander connects condenser by a vapor channel; The high temperature heat exchanger connects the external part by a working-medium channel of the heat source, the condenser connects the external part by a refrigerant working-medium channel, the mixing evaporator connect to the external part by the working-medium channel of the heat source, the preheater connects the external part by a working-medium channel of heat source, the expander connects the compressor and transfers power, the expander and the second expander connect to the external part and output power, in summary, these above-mentioned equipment and pipelines build up the vapor power device for combined cycle; Among them, the expander be connected with the compressor and transfers power.

22. If an added compressor and an added high temperature heat exchanger are added, and 'the compressor connects expander by a vapor channel via the high temperature heat exchanger' is replaced by 'the compressor connects the added compressor by a vapor pipeline via the high temperature heat exchanger, the added compressor connects the expander by a vapor channel via the added high temperature heat exchanger', the added high temperature heat exchanger connects the external part by a working-medium pipeline of the heat source, the expander connects the added compressor and transfers power, these above-mentioned equipment and pipelines build up the vapor power device for combined cycle.

23. If an added expander and an added high temperature heat exchanger are added, and 'the compressor connects expander by a vapor channel via the high temperature heat exchanger' is replaced by 'the compressor connects the added expander by a vapor pipeline via the high temperature heat exchanger, the added compressor connects the expander by a vapor channel via the added high temperature heat exchanger', the added high temperature heat exchanger connects the external part by a working-medium pipeline of the heat source, the added expander connects the compressor and transfers power, these above-mentioned equipment and pipelines build up the vapor power device for combined cycle.

24. If a high temperature reheater is added, and 'the compressor connects expander by a vapor channel via the high temperature heat exchanger' is replaced by 'the compressor connects the added compressor by a vapor channel via the high temperature reheater the high temperature heat exchanger', and 'the expander connects the mixing evaporator by a vapor channel' is replaced by 'the expander connects the mixing evaporator by a vapor channel via the high temperature reheater', these above-mentioned equipment and pipelines build up the vapor power device for combined cycle.

25. If a high temperature reheater, an added compressor and an added high temperature heat exchanger are added, 'the compressor connects expander by vapor channel via the high temperature heat exchanger' is replaced by 'the compressor connects the added compressor by a vapor pipeline via the high temperature reheater and high temperature heat exchanger, the added compressor connects the expander by a vapor channel via the added high temperature heat exchanger, the 'expander connects the mixing evaporator by a vapor channel' is replaced by 'the expander connects the mixing evaporator by a vapor channel via the high temperature reheater', the added high temperature heat exchanger connects the external part by a working-medium pipeline of the heat source, and the expander connects the added compressor and transfers power', these above-mentioned equipment and pipelines build up the vapor power device for combined cycle.

26. If a high temperature reheater, an added expander and an added high temperature heat exchanger are added, 'the compressor connects expander by a vapor channel via the high temperature heat exchanger' is replaced by 'the compressor connects the added expender by a vapor pipeline via the high temperature reheater and the high temperature heat exchanger, the added exchanger connects the expander by a vapor channel via the added high temperature heat exchanger, 'the expander connects the mixing evaporator by a vapor channel' is replaced by 'the expander connects the mixing evaporator by a vapor channel via the high temperature reheater', the added high temperature heat exchanger connects the external part by a working-medium pipeline of the heat source, and the added expander connects the compressor and transfers power, these above-mentioned equipment and pipelines build up the vapor power device for combined cycle.

27. A vapor power device for combined cycle comprises a compressor, a expander, the second expander, a circulating pump, a high temperature heat exchanger, a condenser, a mixing evaporator, the third expander, the second circulating pump and a middle temperature evaporator; The condenser connects the mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; The condenser connects the middle temperature heat exchanger by a condensate pipeline via the second circulating pump, the middle temperature heat exchanger connects the third expander by a vapor channel, the third expander connects the condenser by a vapor channel; The high temperature heat exchanger connects the external part by a heat source working-medium channel, the condenser connects the external part by a refrigerant working-medium channel, the expander connects the compressor and transfers power, the expander, the second expander and the third expander connect to the external part and output power, in summary, these above-mentioned equipment and pipelines build up the vapor power device for combined cycle.

28. A vapor power device for combined cycle comprises a compressor, a expander, the second expander, a circulating pump, a high temperature heat exchanger, a condenser, a mixing evaporator, the third expander, the second circulating pump and a middle temperature evaporator; The condenser connects the mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; The condenser connects the middle temperature heat exchanger by a condensate pipeline via the second circulating pump, the middle temperature heat exchanger connects the third expander by a vapor channel, the third expander connects the condenser by a vapor channel; The high temperature heat exchanger connects the external part by a heat source working-medium channel, the condenser connects the external part by a refrigerant working-medium channel, the middle temperature evaporator or the mixing evaporator connects the external part by a heat source working-medium channel, the expander connects the compressor and transfers power, the expander, the second expander and the third expander connect to the external part and output power, in summary, these above-mentioned equipment and pipelines build up the vapor power device for combined cycle.

29. A vapor power device for combined cycle comprises a compressor, a expander, the second expander, a circulating pump, a high temperature heat exchanger, a condenser, a mixing evaporator, the third expander, the second circulating pump and a middle temperature evaporator; The condenser connects the mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; The condenser connects the middle temperature heat exchanger by a condensate pipeline via the second circulating pump, the middle temperature heat exchanger connects the third expander by a vapor channel, the third expander connects the condenser by a vapor channel; The high temperature heat exchanger connects the external part by a heat source working-medium channel, the condenser connects the external part by a refrigerant working-medium channel, the middle temperature evaporator and the mixing evaporator connects the external part by the heat source working-medium channel respectively, the expander connects the compressor and transfers power, the expander, the second expander and the third expander connect to the external part and output power, in summary, these above-mentioned equipment and pipelines build up the vapor power device for combined cycle.

30. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects the reheater by a condensate pipeline via the circulating pump, the second expander or the third expander connects the reheater by the extraction vapor pipeline, the reheater connects mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the expander by a vapor channel via the high temperature heat exchanger, the second expander connects the condenser by a vapor channel; The high temperature heat exchanger connects the external part by a working-medium channel of the heat source, the condenser connects the external part by a refrigerant working-medium channel, the expander connects the compressor and transfers power, the expander, the second expander and the third expander connect to the external part and output power, in summary, these above-mentioned equipment and pipelines build up the vapor power device for combined cycle.

31. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects the reheater by a condensate pipeline via the circulating pump, the second expander or the third expander connects the reheater by the extraction vapor pipeline, the reheater connects mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the expander by a vapor channel via the high temperature heat exchanger, the second expander connects the condenser by a vapor channel; The high temperature heat exchanger connects the external part by a working-medium channel of the heat source, the condenser connects the external part by a refrigerant working-medium channel, the middle temperature evaporator or the mixing evaporator connects the external part by a working-medium channel of the hear source, the expander connects the compressor and transfers power, the expander, the second expander and the third expander connect to the external part and output power, in summary, these equipment and pipelines build up the vapor power device for combined cycle.

32. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects the reheater by a condensate pipeline via the circulating pump, the second expander or the third expander connects the reheater by the extraction vapor pipeline, the reheater connects mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the expander by a vapor channel via the high temperature heat exchanger, the second expander connects the condenser by a vapor channel; The high temperature heat exchanger connects the external part by a working-medium channel of the heat source, the condenser connects the external part by a refrigerant working-medium channel, the middle temperature evaporator and the mixing evaporator connects the external part by a working-medium channel of the hear source, the expander connects the compressor and transfers power, the expander, the second expander and the third expander connect to the external part and output power, in summary, these equipment and pipelines build up the vapor power device for combined cycle.

33. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects high temperature heat exchanger and the expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; The high temperature evaporator connects the external part by a working-medium of the heat source, the condenser connects the external part by a refrigerant working-medium pipeline, the expander connects the compressor and transfers power, the expander, the second expander and the third expander connect to the external part and output power, in summary, these equipment and pipelines build up the vapor power device for combined cycle.

34. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects high temperature heat exchanger and the expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; The high temperature evaporator connects the external part by a working-medium of the heat source, the condenser connects the external part by a refrigerant working-medium pipeline, the expander connects the compressor and transfers power, the middle temperature evaporator or the mixing evaporator connects the external part by a working-medium pipeline of the heat source, the expander connects the compressor and transfers power, the expander, the second expander and the third expander connect to the external part and output power, in summary, these equipment and pipelines build up the vapor power device for combined cycle.

35. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser connects mixing evaporator by a condensate pipeline via the circulating pump, the expander connects the mixing evaporator by a vapor channel via the middle temperature evaporator, the mixing evaporator connects the compressor and the second expander by a vapor channel respectively, the compressor connects high temperature heat exchanger and the expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; The high temperature evaporator connects the external part by a working-medium of the heat source, the condenser connects the external part by a refrigerant working-medium pipeline, the expander connects the compressor and transfers power, the middle temperature evaporator and the mixing evaporator connects the external part by a working-medium pipeline of the heat source, the expander connects the compressor and transfers power, the expander, the second expander and the third expander connect to the external part and output power, in summary, these equipment and pipelines build up the vapor power device for combined cycle.

36. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator, the third circulating pump, the second reheater and a forth circulating pump; The condenser connects the reheater by a condensate pipeline via the circulating pump, the second expander or the third expander connects the reheater by a extraction vapor channel, the reheater connects the mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the high temperature heat exchanger and the expander by a vapor channel, the second expander connects the condenser by a vapor channel; The condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the expander connects the compressor and transfers power, the expander, the second expander and the third expander connect to the external part and output power, in summary, these equipment and pipelines build up the vapor power device for combined cycle.

37. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator, the third circulating pump, the second reheater and a forth circulating pump; The condenser connects the reheater by a condensate pipeline via the circulating pump, the second expander or the third expander connects the reheater by a extraction vapor channel, the reheater connects the mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the high temperature heat exchanger and the expander by a vapor channel, the second expander connects the condenser by a vapor channel; The condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the middle evaporator or the mixing evaporator connects the external part by a working-medium channel of the heat source, the expander connects the compressor and transfers power, the expander, the second expander and the third expander connect to the external part and output power, in summary, these equipment and pipelines build up the vapor power device for combined cycle.

38. A vapor power device for combined cycle comprises a compressor, a expander, the second expander, a circulating pump, a high temperature heat exchanger, a condenser, a mixing evaporator, a reheater, the second circulating pump, the third expander, a middle temperature evaporator, the third circulating pump, the second reheater and a forth circulating pump; The condenser connects the reheater by a condensate pipeline via the circulating pump, the second expander or the third expander connects the reheater by a extraction vapor channel, the reheater connects the mixing evaporator by a condensate pipeline via the second circulating pump, the expander connects the mixing evaporator by a vapor channel via the middle temperature evaporator, the mixing evaporator connects the compressor and the second expander by a vapor channel respectively, the compressor connects the high temperature heat exchanger and the expander by a vapor channel, the second expander connects the condenser by a vapor channel; The condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the middle evaporator and the mixing evaporator connects the external part by a working-medium channel of the heat source respectively, the expander connects the compressor and transfers power, the expander, the second expander and the third expander connect to the external part and output power, in summary, these equipment and pipelines build up the vapor power device for combined cycle.

39. A vapor power device for combined cycle comprises a compressor, a expander, the second expander, a circulating pump, a high temperature heat exchanger, a condenser, a mixing evaporator, the second circulating pump, a preheater, the third expander and a middle temperature evaporator; The condenser connects the mixing evaporator by a condensate pipeline via the circulating pump and the preheater, the expander connects the mixing evaporator by a vapor channel via the middle temperature evaporator, the mixing evaporator connects the compressor and second expander by a vapor channel respectively, the compressor connects the expander by a vapor channel via the high temperature heat exchanger, the second expander connects the condenser by a vapor channel; The condenser connects the middle temperature evaporator by a condensate pipeline via the second circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the preheater connects the external part by a working-medium pipeline of the heat source, the expander, the second expander and the third expander connect to the external part and output power, in summary, these equipment and pipelines build up the vapor power device for combined cycle.

40. A vapor power device for combined cycle comprises a compressor, a expander, the second expander, a circulating pump, a high temperature heat exchanger, a condenser, a mixing evaporator, the second circulating pump, a preheater, the third expander and a middle temperature evaporator; The condenser connects the mixing evaporator by a condensate pipeline via the circulating pump and the preheater, the expander connects the mixing evaporator by a vapor channel via the middle temperature evaporator, the mixing evaporator connects the compressor and second expander by a vapor channel respectively, the compressor connects the expander by a vapor channel via the high temperature heat exchanger, the second expander connects the condenser by a vapor channel; The condenser connects the middle temperature evaporator by a condensate pipeline via the second circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the middle evaporator or the mixing evaporator connects the external part by a working-medium channel of the heat source, the preheater connects the external part by a working-medium pipeline of the heat source, the expander, the second expander and the third expander connect to the external part and output power, in summary, these equipment and pipelines build up the vapor power device for combined cycle.

41. A vapor power device for combined cycle comprises a compressor, a expander, the second expander, a circulating pump, a high temperature heat exchanger, a condenser, a mixing evaporator, the second circulating pump, a preheater, the third expander and a middle temperature evaporator; The condenser connects the mixing evaporator by a condensate pipeline via the circulating pump and the preheater, the expander connects the mixing evaporator by a vapor channel via the middle temperature evaporator, the mixing evaporator connects the compressor and second expander by a vapor channel respectively, the compressor connects the expander by a vapor channel via the high temperature heat exchanger, the second expander connects the condenser by a vapor channel; The condenser connects the middle temperature evaporator by a condensate pipeline via the second circulating pump, the middle temperature evaporator connects the third expander by a vapor channel, the third expander connects the condenser by a vapor channel; The high temperature evaporator connects the external part by a working-medium pipeline of the heat source, the condenser connects the external part by the refrigerant working-medium channel, the middle evaporator and the mixing evaporator connects the external part by a working-medium channel of the heat source respectively, the preheater connects the external part by a working-medium pipeline of the heat source, the expander, the second expander and the third expander connect to the external part and output power, in summary, these equipment and pipelines build up the vapor power device for combined cycle.

42. A vapor power device for combined cycle comprises a compressor, a expander, the second expander, a circulating pump, a high-temperature heat exchanger, a condenser, a mixing evaporator, the second circulating pump, a preheater, the third expander and a middle-temperature evaporator; The condenser connects the mixing evaporator by a condensate pipeline via the circulating pump, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the preheater, the middle-temperature evaporator connects the third expander by a vapor channel, the third expander connects the condenser by a vapor channel; The high-temperature evaporator connects the external part by a working-medium channel of the heat source, the condenser connects the external part by a condensate pipeline, the preheater connects the external part by a working-medium pipeline of the heat source, the expander connects the compressor and transfers power, the expander, the second expander and the third expander connect to the external part and output power, in summary, these equipment and pipelines build up the vapor power device for combined cycle.

43. A vapor power device for combined cycle comprises a compressor, a expander, the second expander, a circulating pump, a high-temperature heat exchanger, a condenser, a mixing evaporator, the second circulating pump, a preheater, the third expander and a middle-temperature evaporator; The condenser connects the mixing evaporator by a condensate pipeline via the circulating pump, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the preheater, the middle-temperature evaporator connects the third expander by a vapor channel, the third expander connects the condenser by a vapor channel; The high-temperature evaporator connects the external part by a working-medium channel of the heat source, the condenser connects the external part by a condensate pipeline, the middle-temperature evaporator or the mixing evaporator connects the external part by a working-medium pipeline of the heat source, the preheater connects the external part by a working-medium pipeline of the heat source, the expander connects the compressor and transfers power, the expander, the second expander and the third expander connect to the external part and output power, in summary, these equipment and pipelines build up the vapor power device for combined cycle.

44. A vapor power device for combined cycle comprises a compressor, a expander, the second expander, a circulating pump, a high-temperature heat exchanger, a condenser, a mixing evaporator, the second circulating pump, a preheater, the third expander and a middle-temperature evaporator; The condenser connects the mixing evaporator by a condensate pipeline via the circulating pump, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the preheater, the middle-temperature evaporator connects the third expander by a vapor channel, the third expander connects the condenser by a vapor channel; The high-temperature evaporator connects the external part by a working-medium channel of the heat source, the condenser connects the external part by a condensate pipeline, the middle-temperature evaporator and the mixing evaporator connects the external part by a working-medium pipeline of the heat source respectively, the preheater connects the external part by a working-medium pipeline of the heat source, the expander connects the compressor and transfers power, the expander, the second expander and the third expander connect to the external part and output power, in summary, these equipment and pipelines build up the vapor power device for combined cycle.

45. A vapor power device for combined cycle comprises a compressor, a expander, the second expander, a circulating pump, a high-temperature heat exchanger, a condenser, a mixing evaporator, the second circulating pump, a preheater, the third expander, a middle-temperature evaporator and the second preheater; The condenser connects the mixing evaporator by a condensate pipeline via the circulating pump and the preheater, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the second preheater, the middle-temperature evaporator connects the third expander by a vapor channel, the third expander connects the condenser by a vapor channel; The high-temperature heat exchanger connects the external part by a working-medium pipeline of the heat source, the condenser connects the external part by a refrigerant working-medium channel, the preheater and the second preheater connect to the external part by a working-medium pipeline respectively, the expander connects the compressor and transfers power, the expander, the second expander and the third expander connect to the external part and output power, in summary, these equipment and pipelines build up the vapor power device for combined cycle.

46. A vapor power device for combined cycle comprises a compressor, a expander, the second expander, a circulating pump, a high-temperature heat exchanger, a condenser, a mixing evaporator, the second circulating pump, a preheater, the third expander, a middle-temperature evaporator and the second preheater; The condenser connects the mixing evaporator by a condensate pipeline via the circulating pump and the preheater, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the second preheater, the middle-temperature evaporator connects the third expander by a vapor channel, the third expander connects the condenser by a vapor channel; The high-temperature heat exchanger connects the external part by a working-medium pipeline of the heat source, the condenser connects the external part by a refrigerant working-medium channel, the middle-temperature evaporator or mixing evaporator connect to the external part by a working-medium channel of the heat source, the preheater and the second preheater connect to the external part by a working-medium pipeline respectively, the expander connects the compressor and transfers power, the expander, the second expander and the third expander connect to the external part and output power, in summary, these equipment and pipelines build up the vapor power device for combined cycle.

47. A vapor power device for combined cycle comprises a compressor, a expander, the second expander, a circulating pump, a high-temperature heat exchanger, a condenser, a mixing evaporator, the second circulating pump, a preheater, the third expander, a middle-temperature evaporator and the second preheater; The condenser connects the mixing evaporator by a condensate pipeline via the circulating pump and the preheater, the expander connects the mixing evaporator by a vapor channel via the middle-temperature evaporator, the mixing evaporator connects the compressor and the second expander by a vapor channel respectively, the compressor connects the expander by a vapor channel via the high-temperature heat exchanger, the second expander connects the condenser by a vapor channel; The condenser connects the middle-temperature evaporator by a condensate pipeline via the second circulating pump and the second preheater, the middle-temperature evaporator connects the third expander by a vapor channel, the third expander connects the condenser by a vapor channel; The high-temperature heat exchanger connects the external part by a working-medium pipeline of the heat source, the condenser connects the external part by a refrigerant working-medium channel, the middle-temperature evaporator and mixing evaporator connect to the external part by a working-medium channel of the heat source respectively, the preheater and the second preheater connect to the external part by a working-medium pipeline respectively, the expander connects the compressor and transfers power, the expander, the second expander and the third expander connect to the external part and output power, in summary, these equipment and pipelines build up the vapor power device for combined cycle.

48. A vapor power device for combined cycle comprises a compressor, a expander, the second expander, a circulating pump, a high-temperature heat exchanger, a condenser, a mixing evaporator, the second circulating pump, a preheater, a middle-temperature evaporator and the second preheater; The condenser connects the mixing evaporator by a condensate pipeline via the circulating pump and the preheater, the expander connects the mixing evaporator by a vapor channel via the middle-temperature evaporator, and the mixing evaporator connects the compressor by a vapor channel, the mixing evaporator connects the second compressor by an intermediate intake channel, the compressor connects the expander by a vapor channel via the high-temperature heat exchanger; The condenser connects the middle-temperature evaporator by a condensate pipeline via the second circulating pump and the second preheater, the middle-temperature evaporator connects the second expander by a vapor channel, the second expander connects the condenser by a vapor channel; The high-temperature heat exchanger connects the external part by a working-medium pipeline of the heat source, the condenser connects the external part by a refrigerant working-medium channel, the middle-temperature evaporator and the mixing evaporator connect to the external part by a working-medium channel of the heat source, the preheater and the second preheater connect to the external part by a working-medium pipeline of the heat source, the expander connects the compressor and transfers power, the expander and the second expander connect to the external part and transfer power, in summary, these equipment and pipelines build up the vapor power device for combined cycle.

49. If an intermediate reheater is added, 'the middle-temperature evaporator connects the third expander by a vapor channel, and the third expander connects the condenser by a vapor channel' is replaced by 'the middle-temperature evaporator connects the third expander by a vapor channel, the third expander connects the third expander by an intermediate reheating vapor channel via the intermediate reheater, the third expander connects the condenser by a vapor channel, and the intermediate reheater connects the external part by a working-medium channel of the heat source', these equipment and pipelines build up the vapor power device for combined cycle.

50. If 'the third expander connects the condenser by a vapor channel' is replaced by 'the third expander connects the second expander by a vapor channel', these above-mentioned equipment and pipelines build up the vapor power device for combined cycle.

51. If the second condenser is added, 'the third expander connects the condenser by a vapor channel' is replaced by 'the third expander connects the second condenser by a vapor channel', 'the condenser connects the middle-temperature evaporator by a condensate pipeline via the second circulating pump and the second preheater' is replaced by 'the second condenser connects the middle-temperature evaporator by a condensate pipeline via the second circulating pump and the second preheater, and the second condenser connects the external part by the refrigerant working-medium pipeline', these above-mentioned equipment and pipelines build up the vapor power device for combined cycle.

52. If 'the condenser connects the mixing evaporator by a condensate pipeline via the circulating pump and the preheater, and the condenser connects the middle-temperature evaporator by a condensate pipeline via the second circulating pump and the second preheater' is replaced by 'the condenser connects the mixing evaporator by a condensate pipeline via the circulating and the preheater directly, and the condenser connects the middle-temperature evaporator by a condensate pipeline via the circulating pump, the preheater, the second circulating pump and the second preheater', these equipment and pipelines build up the vapor power device for combined cycle.

53. If an added compressor and an added high-temperature heat exchanger is added, 'the compressor connects the expander by a vapor channel via the high-temperature heat exchanger' is replaced by 'the compressor connects the added compressor by a vapor channel via the high-temperature heat exchanger, the added compressor connects the expander by a vapor channel via the added high-temperature heat exchanger, the added high-temperature heat exchanger connects the external part by a working-medium pipeline, and the expander connects the added compressor and transfers power', these above-mentioned equipment and pipelines build up the vapor power device for combined cycle.

54. If an added high-temperature reheater is added, 'the compressor connects the expander by a vapor channel via a high-temperature heat exchanger' is replaced by 'the compressor connects the expander by a vapor channel via a high-temperature reheater and the high-temperature heat exchanger', 'the expander connects the mixing evaporator by a vapor channel via the middle-temperature evaporator' is replaced by 'the expander connects the mixing evaporator by a vapor channel via the high-temperature reheater and the middle-temperature evaporator', these equipment and pipelines build up the vapor power device for combined cycle.

55. If an added high-temperature reheater, an added compressor and an added high-temperature heat exchanger is added, 'the compressor connects the expander by a vapor channel via the high-temperature heat exchanger' is replaced by 'the compressor connects the added compressor by a vapor channel via the high-temperature heat exchanger, the added compressor connects the expander by a vapor channel via the added high-temperature heat exchanger', 'the expander connects the mixing evaporator by a vapor channel via the middle-temperature reheater' is replaced by 'the expander connects the mixing evaporator by a vapor channel via the high-temperature reheater and the middle-temperature evaporator, the added high-temperature heat exchanger connects the external part by a working-medium pipeline, the expander connects the added compressor and transfers power', these above-mentioned equipment and pipelines build up the vapor power device for combined cycle.

56. If an added expander and an added high-temperature heat exchanger is added, 'the compressor connects the expander by a vapor channel via the high-temperature heat exchanger' is replaced by 'the compressor connects the added expander by a vapor channel via the high-temperature heat exchanger, the added expander connects the expander by a vapor channel via the high-temperature heat exchanger, the added high-temperature heat exchanger connects the external part by a working-medium pipeline of the heat source, the added expander connects the compressor and transfers power', in summary, these above-mentioned equipment and pipelines build up the vapor power device for combined cycle.

57. If an high-temperature reheater, an added expander and an added high-temperature heat exchanger are added, 'the compressor connects the expander by a vapor channel via the high-temperature heat exchanger' is replaced by 'the compressor connects the added expander by a vapor channel via the high-temperature reheater and the high-temperature heat exchanger, the added expander connects the expander by a vapor channel via the added high-temperature heat exchanger', 'the expander connects the mixing evaporator by a vapor channel via the middle-temperature evaporator' is replaced by 'the expander connects the mixing evaporator by a vapor channel via the high-temperature reheater and the middle-temperature evaporator, the added high-temperature heat exchanger connects the external part by a working-medium pipeline of the heat source, the added expander connects the compressor and transfers power', these equipment and pipelines build up the vapor power device for combined cycle.

58. If an added expander, an added middle-temperature evaporator and an added circulating pump is added, the condenser connects the added middle-temperature evaporator by an added condensate pipeline via the added circulating pump, the added middle-temperature evaporator connects the added expander by a vapor channel, the added expander connects the condenser by a vapor channel, 'the expander connects the mixing evaporator by a vapor channel via the middle-temperature evaporator' is replaced by 'the expander connects the mixing evaporator by a vapor channel via the added middle-temperature evaporator and the middle-temperature evaporator, the added middle-temperature evaporator be connected to the external part by a working-medium channel of the heat source, the added expander connects the external part and outputs power', these equipment and pipelines build up the vapor power device for combined cycle.

59. If an added expander, an added middle-temperature evaporator, an added circulating pump and an added preheater, the condenser connects the added middle-temperature evaporator by a added condensate pipeline via the added circulating pump and the added preheater, the added middle-temperature evaporator connects the added expander by a vapor channel, the added expander connects the condenser by a vapor channel, 'the expander connects the mixing evaporator by a vapor channel via the middle-temperature evaporator' is replaced by 'the expander connects the mixing evaporator by a vapor channel via the added middle-temperature evaporator and the middle-temperature evaporator', the added preheater connects the external part by a working-medium pipeline of the heat source, the added middle-temperature evaporator be connected to the external part by a working-medium pipeline of the heat source, the added expander connects the external part and output power, in summary, these equipment and pipelines build up the vapor power device for combined cycle.

60. If an added expander, an added middle-temperature evaporator, an added circulating pump, an added reheater and an added second circulating pump, the condenser connects the added reheater by a added condensate pipeline via the added circulating pump, the added expander or the third expander connects added reheater by an extraction vapor channel, the added reheater connects the added middle-temperature evaporator by a condensate pipeline via the added circulating pump, the added middle-temperature connects the added expander by a vapor channel, the added expander connects the condenser by a vapor channel, 'the expander connects the mixing evaporator by a vapor channel via the middle-temperature evaporator' is replaced by 'the expander connects the mixing evaporator by a vapor channel via the added middle-temperature evaporator and the middle-temperature', the added middle-temperature evaporator be connected to the external part by a working-medium channel, the added expander connects the external part and transfers power.

61. If an added expander, an added middle-temperature evaporator and an added circulating pump, the condenser connects the added middle-temperature evaporator by an added condensate pipeline via the added circulating pump, the added middle-temperature evaporator connects the added expander by a vapor channel, the added expander connects the condenser by a vapor channel, 'the expander connects the mixing evaporator by a vapor channel via high temperature reheater and the middle-temperature' is replaced by 'the expander connects the mixing evaporator by a vapor channel via the high-temperature evaporator, the added middle-temperature evaporator and the middle-temperature evaporator', the added middle-temperature evaporator be connected to the external of the heat source, the added expander connects the external part and transfers power, in summary, these equipment and pipelines build up the vapor power device for combined cycle.

62. If an added expander, an added middle-temperature evaporator, an added circulating pump and an added preheater, the condenser connects the added middle-temperature evaporator by a condensate pipeline via the added circulating pump and the added preheater, the added middle-temperature evaporator connects the added expander by a vapor channel, the added expander connects the condenser by a vapor channel, 'the expander connects the mixing evaporator by a vapor channel via high-temperature reheater and the middle-temperature evaporator' is replaced by 'the expander connects the mixing evaporator by a vapor channel via the high-temperature reheater, the added middle-temperature evaporator and the middle-temperature', the added preheater connects the external part by a working-medium pipeline of the heat source, the added middle-temperature evaporator be connected to the external part by a working-medium pipeline of the heat source, the added expander connects the external part and outputs power, in summary, these equipment and pipelines build up the vapor power device for combined cycle.

63. If an added expander, an added middle-temperature evaporator, an added circulating pump, an added reheater and an added circulating pump are added, the condenser connects the added reheater by an added condensate pipeline via the added circulating pump, the added expander or the third expander connects the added reheater by a extraction vapor channel, the added reheater connects the added middle-temperature evaporator by a condensate pipeline via the added second circulating pump, the middle-temperature evaporator connects the added expander by a vapor channel, the added expander connects the condensate by a vapor channel, 'the expander connects the mixing evaporator by a vapor channel via high-temperature reheater and the middle-temperature evaporator' is replaced by 'the expander connects the mixing evaporator by a vapor channel via the high-temperature reheater, the added middle-temperature evaporator and the middle-temperature', the added middle-temperature evaporator be connected to the external part by a working-medium pipeline of the heat source, the added expander connects the external part and outputs power, in summary, these equipment and pipelines build up the vapor power device for combined cycle.

64. If an added second expander, an added middle-temperature evaporator and an added circulating pump, the condenser connects the added middle-temperature evaporator by a condensate pipeline via the added circulating pump, the added middle-temperature evaporator connects the added second expander by a vapor pipeline, the added second expander connects the condenser by a vapor pipeline, 'the expander connects the mixing evaporator by a vapor channel via the middle-temperature evaporator' is replaced by 'the expander connects the mixing evaporator by a vapor channel via the added middle-temperature evaporator and the middle-temperature evaporator', the added middle-temperature evaporator be connected to the external part by a working-medium channel of the heat source, the added second expander connects the external part and transfers power, in summary, these equipment and pipelines build up the vapor power device for combined cycle.

65. If an added second expander, an added middle-temperature evaporator, an added circulating pump and an added preheater, the condenser connects the added middle-temperature evaporator by a condensate pipeline via added circulating pump and the added preheater, the middle-temperature evaporator connects the added second expander by a vapor channel, the added second expander connects the condenser by a vapor channel, 'the expander connects the mixing evaporator by a vapor channel via middle-temperature evaporator' is replaced by 'the expander connects the mixing evaporator by a vapor channel via the added middle-temperature evaporator and the middle-temperature evaporator', the added preheater connects the external part by a working-medium channel of the heat source, the added middle-temperature evaporator be connected to the external part by a working-medium channel of the heat source, the added second expander connects the external part and transfers power, in summary, these above-mentioned equipment and pipelines build up the vapor power device for combined cycle.

66. If an added expander, an added middle-temperature evaporator, an added circulating pump, an added reheater and an added circulating pump are added, the condenser connects the added reheater by an added condensate pipeline via the added circulating pump, the added second expander or the third expander connects the added reheater by an extraction vapor channel, the added reheater connects the added middle-temperature evaporator by a condensate pipeline via the added second circulating pump, the middle-temperature evaporator connects the added second expander by a vapor channel, 'the expander connects the mixing evaporator by a vapor channel via the middle-temperature evaporator' is replaced by 'the expander connects the mixing evaporator by a vapor channel via the added middle-temperature evaporator and the middle-temperature', the added middle-temperature evaporator be connected to the external part by a working-medium pipeline of the heat source, the added second expander connects the external part and outputs power, in summary, these above-mentioned equipment and pipelines build up the vapor power device for combined cycle.

67. If an added second expander, an added middle-temperature evaporator and an added circulating pump, the condenser connects the added middle-temperature evaporator by a condensate pipeline via the added circulating pump, the added middle-temperature evaporator connects the added second expander by a vapor pipeline, the added second expander connects the condenser by a vapor pipeline, 'the expander connects the mixing evaporator by a vapor channel via the high-temperature reheater and the middle-temperature evaporator' is replaced by 'the expander connects the mixing evaporator by a vapor channel via the high-temperature reheater, the added middle-temperature evaporator and the middle-temperature evaporator', the added middle-temperature evaporator be connected to the external part by a working-medium channel of the heat source, the added second expander connects the external part and transfers power, in summary, these above-mentioned equipment and pipelines build up the vapor power device for combined cycle.

68. If an added second expander, an added middle-temperature evaporator, an added circulating pump and an added preheater, the condenser connects the added middle-temperature evaporator by a condensate pipeline via added circulating pump and the added preheater, the middle-temperature evaporator connects the added second expander by a vapor channel, the added second expander connects the condenser by a vapor channel, 'the expander connects the mixing evaporator by a vapor channel via the high-temperature reheater, the middle-temperature evaporator' is replaced by 'the expander connects the mixing evaporator by a vapor channel via the high-temperature reheater, the added middle-temperature evaporator and the middle-temperature evaporator', the added preheater connects the external part by a working-medium channel of the heat source, the added middle-temperature evaporator be connected to the external part by a working-medium channel of the heat source, the added second expander connects the external part and transfers power, in summary, these above-mentioned equipment and pipelines build up the vapor power device for combined cycle.

69. If an added second expander, an added middle-temperature evaporator, an added circulating pump, an added reheater and an added circulating pump are added, the condenser connects the added reheater by an added condensate pipeline via the added circulating pump, the added second expander or the third expander connects the added reheater by a extraction vapor channel, the added reheater connects the added middle-temperature evaporator by a condensate pipeline via the added second circulating pump, the middle-temperature evaporator connects the added second expander by a vapor channel, the added second expander connects the condenser by a vapor channel, 'the expander connects the mixing evaporator by a vapor channel via high-temperature reheater and the middle-temperature evaporator' is replaced by 'the expander connects the mixing evaporator by a vapor channel via the high-temperature reheater, the added middle-temperature evaporator and the middle-temperature', the added middle-temperature evaporator be connected to the external part by a working-medium pipeline of the heat source, the added second expander connects the external part and outputs power, in summary, these equipment and pipelines build up the vapor power device for combined cycle.

In these figures, 1—compressor, 2—expander, 3—the second expander, 4—circulating pump, 5—high-temperature heat exchanger, 6—condenser, 7—mixing evaporator, 8—reheater, 9—the second circulating pump, 10—preheater, 11—high-temperature reheater, 12—the third expander, 13—middle-temperature evaporator, 14—the third circulating pump, 15—the second reheater, 16—the forth circulating pump, 17—the second preheater, 18—the second condenser, 19—intermediate reheater; A—added compressor, B—added expander, C—added high-temperature heat exchanger, D—added middle-temperature evaporator, E—added circulating pump, F—added preheater, G—added second expander.

DETAILED DESCRIPTION

Figure 1:
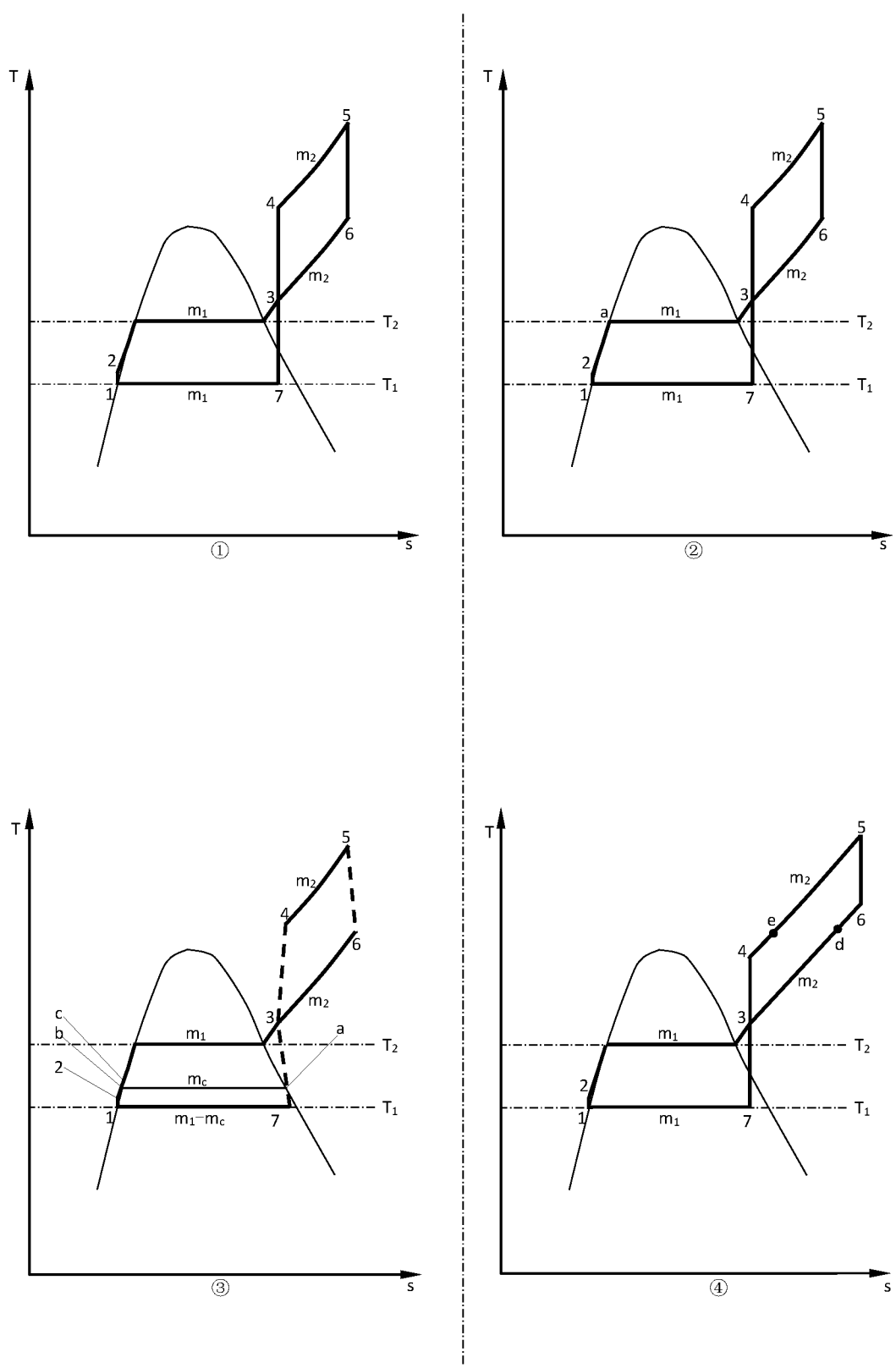
FIG. 1 is the sample graph of the type 1 circuit of the single working-medium vapor combined cycle provided in this invention.

The first thing to note is that, in the structure and circuit description, the processes will not be repeated described if not necessary, and the obvious processes will not be described. The detailed description of this invention is as follows:

The T-s diagrams of the single working-medium vapor combined cycle in the FIG. 1 work as follows:

(1) The single working-medium vapor combined cycle in the Sample ① comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 from a low temperature in liquid state, the heat-absorption and vaporization process 2-3 because of the mixing with the working-medium weighing $m_2$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 3-4, the heat-absorption process 4-5 from the heat source, the pressure-decreasing and working process 5-6, and the heat-releasing process 6-3 because of the mixing with the working-medium weighing $m_1$ kg, in summary, these above-mentioned processes build up the thermal cycle 3-4-5-6-3.

It should be noted that, in the sample ①, the heat-absorption and vaporization process 2-3 because of the mixing of the working-medium weighing $m_1$ kg and the working-medium weighing $m_2$ kg absorb the heat of the external heat source; The net work of the thermal cycle 1-2-3-7-1 of the working-medium weighing $m_1$ kg and net work of the thermal cycle 3-4-5-6-3 of the working-medium weighing $m_2$ kg, output power and drive the working machine and generator jointly.

(2) The single working-medium vapor combined cycle in the Sample ②  comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 from a low temperature in liquid state, the heat-absorption process 2-a from the heat source, the heat-absorption and vaporization process a-3 because of the mixing with the working-medium weighing $m_2$ kg, the pressure-decreasing and working process 3-7, and the heat-releasing and condensation process 7-1, in summary, these above-mentioned processes build up the thermal cycle 1-2-a-3-7-1; The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

It should be noted that, in the Sample ②, the heat-absorption and vaporization process a-3 because of the mixing with the working-medium weighing $m_2$ kg absorb the heat of the external heat source; The net work of the thermal cycle 1-2-a-3-7-1 of the working-medium weighing $m_1$ kg and the net work of the thermal cycle 3-4-5-6-3 of the working-medium weighing $m_2$ kg, output power and drive the working machine and generator jointly.

(3) The single working-medium vapor combined cycle in the Sample ③, comprises separate thermal cycles of the working-medium weighing $m_1$ kg and the working-medium weighing $m_2$ kg and mix-heating between the two, among them, the working-medium weighing $m_1$ kg work in the following order: the temperature-rising process 1-2 of the working-medium weighing $(m_1-m_c)$ kg from a low temperature in liquid state, the extraction mixing process 2-b between the working-medium weighing $(m_1-m_e)$ kg and the working-medium weighing $m_c$ kg, the pressure-rising process b-c of the working-medium weighing $m_1$ kg, the heat-absorption and vaporization process c-3 because of the mixing with the working-medium weighing $m_2$ kg, the pressure-decreasing and working process 3-a of the working-medium weighing $m_1$ kg, the heat-releasing and condensation process a-b of the working-medium weighing $m_c$ kg because of the mixing with the working-medium weighing $m_c$ kg in the state of point 2, the pressure-decreasing and working process a-7 of the working-medium weighing $(m_1-m_c)$ kg, the heat-releasing to the cold source and condensation process of the working-medium weighing $(m_1-m_c)$ kg, in summary, these above-mentioned processes build the extraction steam reheating cycle (1-2-b-c-3-7-1+b-c-3-a-b); The working-medium weighing $m_2$ kg work in the following order: the pressure-rising process 3-4, the heat-absorption process 4-5, the pressure-decreasing process 5-6, and the heat-releasing process 6-3 because of the mixing with the working-medium weighing $m_1$ kg, in summary, these above-mentioned processes build up the thermal cycle 3-4-5-6-3.

It should be noted that, in the Sample ③, the heat-absorption and vaporization process c-3 because of the mixing with the working-medium weighing $m_2$ kg absorb the heat of the external heat source; The net work of the thermal cycle (1-2-b-c-3-7-1+b-c-3-a-b) of the working-medium weighing $m_1$ kg and the net work of the thermal cycle 3-4-5-6-3 of the working-medium weighing $m_2$ kg, output power and drive the working machine and generator jointly.

(4) Sample ④: in the single working-medium vapor combined cycle in the Sample ①, if 'the heat-absorption process 4-5 from the heat source' is replaced by 'the heat-absorption process 4-e and the heat-absorption process e-5 from the heat source', 'the heat-releasing and temperature-decreasing process 6-3 because of the mixing between the working-medium weighing $m_1$ kg and the working-medium weighing $m_2$ kg' is replaced by 'the reheating heat-releasing temperature-decreasing process 6-d and the mixing heat-releasing and temperature-decreasing process d-3', and the heat from the process 6-d is used for and meets the needs of the heat-absorption of the process 4-e, in summary, these above-mentioned processes build up the single working-medium vapor combined cycle of the Sample ④.

Figure 2:
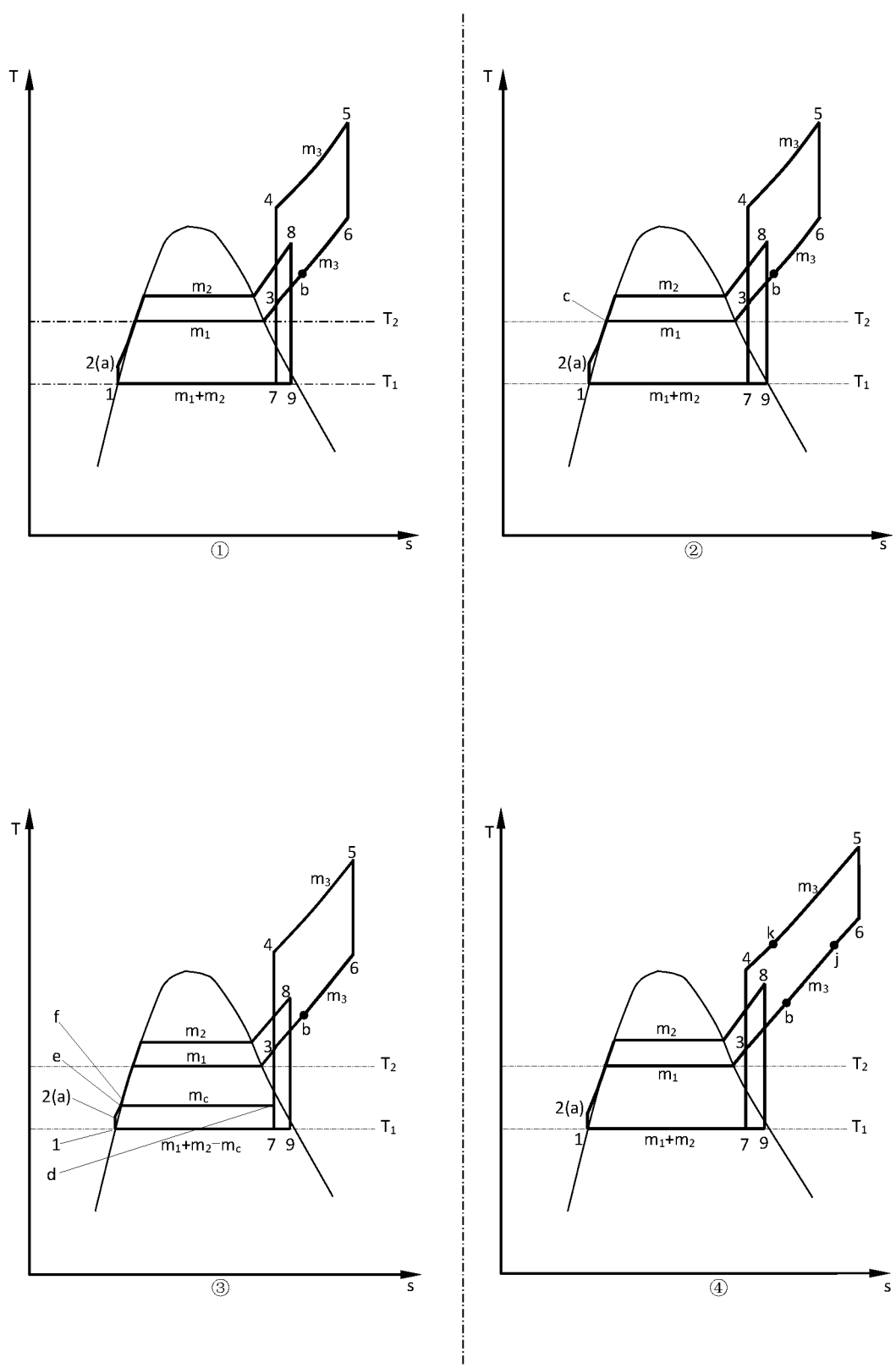
FIG. 2 is the sample graph of the type 2 circuit of the single working-medium vapor combined cycle provided in this invention.

The T-s diagrams of the single working-medium vapor combined cycle in the FIG. 2 work as follows:

(1) The single working-medium vapor combined cycle in the Sample ① comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption and vaporization process 2-3 because of the mixing with the working-medium weighing $m_3$ kg, the pressure-decreasing and working process 3-7, and the heat-releasing and condensation process 7-1, in summary, these above-mentioned processes build up the thermal cycle 1-2-3-7-1; The working-medium weighing $m_2$ kg work in the following order: the pressure-rising process 1-a from a low temperature in liquid state, the vaporization process a-8 which absorbs the heat from the process 6-b, the pressure-decreasing and working process 8-9, the heat-releasing to the cold source and the condensation process 9-1, in summary, these above-mentioned processes build up the thermal cycle 1-a-8-9-1; The working process weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

It should be noted that, in the sample ①, the heat-absorption and vaporization process 2-3 because of the mixing of the working-medium weighing $m_1$ kg and the working-medium weighing $m_3$ kg absorb the heat of the external heat source, the heat-absorption and vaporization process a-8 which absorbs the heat of the heat-releasing process 6-b absorb the heat of the external heat source; The net work of the thermal cycle 1-2-3-7-1 of the working-medium weighing $m_1$ kg, the net work of the thermal cycle 1-a-8-9-1 of the working-medium weighing $m_2$ kg and the net work of the thermal cycle 3-4-5-6-b-3 output power and drive the working machine and generator jointly.

(2) The single working-medium vapor combined cycle in the Sample ② comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ kg work in the following order: the pressure-rising process 1-2 from a low temperature in liquid state, the heat-absorption process 2-c from an external heat source, the heat-absorption and vaporization process 2-3 because of the mixing with the working-medium weighing $m_3$ kg or the heat-absorption from the heat source as the same time, the pressure-decreasing and working process 3-7, and the heat-releasing and condensation process 7-1, in summary, these above-mentioned processes build up the thermal cycle 1-2-c-3-7-1; The working-medium weighing $m_2$ kg work in the following order: the pressure-rising process 1-a from a low temperature in liquid state, the vaporization process a-8 which absorbs the heat from the process 6-b, the pressure-decreasing and working process 8-9, the heat-releasing to the cold source and the condensation process 9-1, in summary, these process build up the thermal cycle 1-a-8-9-1; The working process weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$ kg, the heat-releasing process b-3 because of the mixing with the working-medium weighing $m_1$ kg, in summary, these above-mentioned processes build up the thermal cycle 3-4-5-6-b-3.

It should be noted that, in the sample ②, the heat-absorption and vaporization process c-3 because of the mixing of the working-medium weighing $m_1$ kg and the working-medium weighing $m_3$ kg absorb the heat of the external heat source, the heat-absorption and vaporization process a-8 which absorbs the heat of the heat-releasing process 6-b absorb the heat of the external heat source; The net work of the thermal cycle 1-2-c-3-7-1 of the working-medium weighing $m_1$ kg, the net work of the thermal cycle 1-a-8-9-1 of the working-medium weighing $m_2$ kg and the net work of the thermal cycle 3-4-5-6-b-3 output power and drive the working machine and generator jointly.

(3) The single working-medium vapor combined cycle in the Sample ③ comprises separate thermal cycles of the working-medium weighing $m_1$ kg, the working-medium weighing $m_2$ kg and the working-medium weighing $m_3$ kg, mix-heating between the working-medium weighing $m_1$ kg and the working-medium weighing $m_3$ kg, and the heat exchange between the working-medium weighing $m_1$ kg and the working-medium weighing $m_3$ kg, among them, the working-medium weighing $m_1$ work in the following order: the pressure-rising process 1-2 of the working fluids weighing $(m_1-m_c)$ kg from a low temperature in liquid state, the extraction mixing process 2-e between the working-medium weighing $(m_1-m_e)$ kg and the working-medium weighing $m_c$ kg, the pressure-rising process e-f of the working-medium weighing $m_1$ kg, the heat-absorption and vaporization process f-3 of the working-medium weighing $m_1$ kg because of the mixing between the working-medium weighing $m_1$ kg and the working-medium weighing $m_3$ kg, the pressure-decreasing and working process 3-d of the working-medium weighing $m_1$ kg, the heat-releasing and condensation process d-e because of the mixing between the working-medium weighing $m_c$ kg and the working-medium weighing $(m_1-m_c)$ kg in the state of point 2, the pressure-decreasing and working process d-7 of the working-medium weighing $(m_1-m_c)$ kg, the heat-releasing to the cold source and condensation process 7-1 of the working-medium weighing $(m_1-m_c)$ kg, in summary, these above-mentioned processes build up the extraction steam reheating cycle (1-2-e-f-3-7-1+e-f-3-d-e); The working-medium weighing $m_2$ kg work in the following order: the pressure-rising process 1-a from a low temperature in liquid state, the heat-absorption and vaporization process a-8 which absorbs the heat of the heat-releasing process 6-b of the working-medium weighing $m_3$ kg or the heat from the heat source as the same time, the pressure-decreasing and working process 8-9, the heat-releasing and condensation process 9-1, in summary, these above-mentioned processes build up the cycle 1-a-8-9-1; The working-medium weighing $m_3$ kg work in the following order: the pressure-rising process 3-4, the heat-absorption process 4-5 from the heat source, the pressure-decreasing and working process 5-6, the heat-releasing process 6-b to the working-medium weighing $m_2$, the heat-releasing process b-3 because of the mixing with the working-medium weighing $m_1$ kg, in summary, these above-mentioned processes build up the cycle 3-4-5-6-b-3.

It should be noted that, in the sample ③, the heat-absorption and vaporization process f-3 because of the mixing of the working-medium weighing $m_1$ kg and the working-medium weighing $m_3$ kg absorb the heat of the external heat source, the heat-absorption and vaporization process a-8 which absorbs the heat of the heat-releasing process 6-b absorb the heat of the external heat source; The net work of the thermal cycle (1-2-e-f-3-7-1+e-f-3-d-e) of the working-medium weighing $m_1$ kg, the net work of the thermal cycle 1-a-8-9-1 of the working-medium weighing $m_2$ kg and the net work of the thermal cycle 3-4-5-6-b-3 output power and drive the working machine and generator jointly.

(4) Sample ④: in the single working-medium vapor combined cycle in the Sample a if 'the heat-absorption process 4-5 from the external heat source of the working-medium weighing $m_3$ kg' is replaced by 'the heat-absorption process 4-k and the heat-absorption process k-5 from the heat source', 'the heat-releasing to the working-medium weighing $m_2$ kg and temperature-decreasing process 6-b' is replaced by 'the heat-releasing process 6-j which meets the needs of the heat of heat-absorption process 4-k and the heat-releasing process j-b to the working-medium weighing $m_2$ kg', in summary, these above-mentioned processes build up the single working-medium vapor combined cycle of the Sample.

Figure 3:
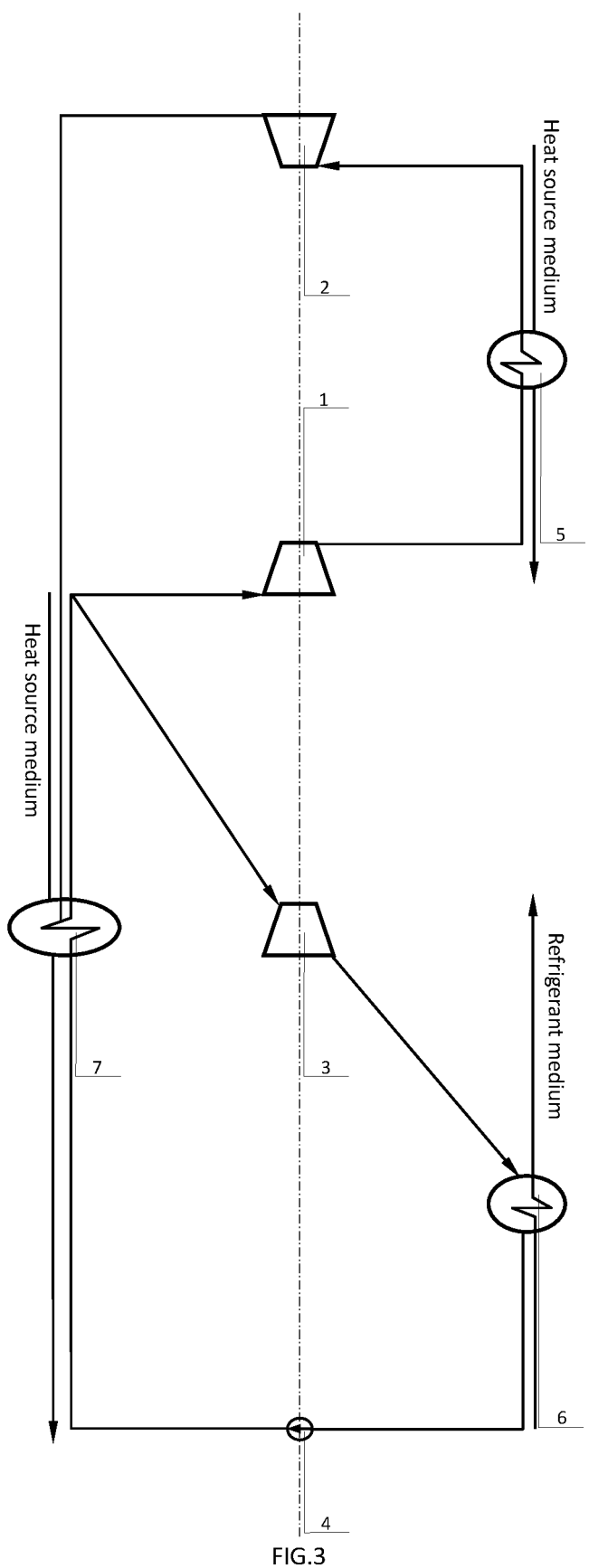
FIG. 3 is the type 1 principle thermal system diagram of the vapor power device for combined cycle provided in this invention.

The vapor power device for combined cycle described in the FIG. 3 works as follows:

(1) Structurally, a vapor power device of the combined cycle comprises a compressor, an expander, the second expander, a circulating pump, a high temperature heat exchanger, a condenser and a mixing evaporator; The condenser 6 connects to the mixing evaporator 7 by a condensate pipeline via the circulating pump 4, the expander 2 connects to the mixing evaporator 7 by a vapor channel, the mixing evaporator 7 connects to the compressor 1 and the second expander 3 respectively, the compressor 1 connects to the expander 2 by a vapor channel via the high temperature heat exchanger 5, the second expander 3 connects to condenser 6 by a vapor channel; The high temperature heat exchanger 5 connects to the external part by the working-medium channel of the heat source, the condenser 6 connects to the external part by a refrigerant working-medium channel, the mixing evaporator 7 connect to the external part by a working-medium channel of the heat source, the expander 2 connects to compressor 1 and transfers power, the expander 2 and the second expander 3 connect to the external part and output power.

(2) Procedurally, the condensate of the condenser 6 is boosted into the mixing evaporator 7 by the circulation pump 4, mixed with the high temperature steam from the expander 2, and absorbs the heat provided by the external heat source, and then vaporized, and the vapor generated by the mixing evaporator 7 enters the compressor 1 where the temperature and pressure of the steam increases and the second expander 3 where the pressure of the steam decreases and the vapor works; The vapor discharged from the compressor 1 flows through the high-temperature heat exchanger 5 and absorbs heat, and flows through the expander 2 where the pressure of the steam decreases and the vapor works and then enters the mixed evaporator 7 where the steam releases heat and condenses; The vapor discharged from the second expander 3 enters the condenser 6, releases heat to the refrigerant working-medium and condenses; The heat source working-medium provide a driving heat load through the high-temperature heat exchanger 5 and the mixing evaporator 7, and the refrigerant working-medium take away the low-temperature heat load through the condenser 6, a part of the output work of the expander 2 is supplied to the compressor 1 for power, and the expander 2 and the second expander 3 jointly provide power (such as driving the working machine or the generator), in summary, these above-mentioned processes build up a vapor power device of the combined cycle.

Figure 4:
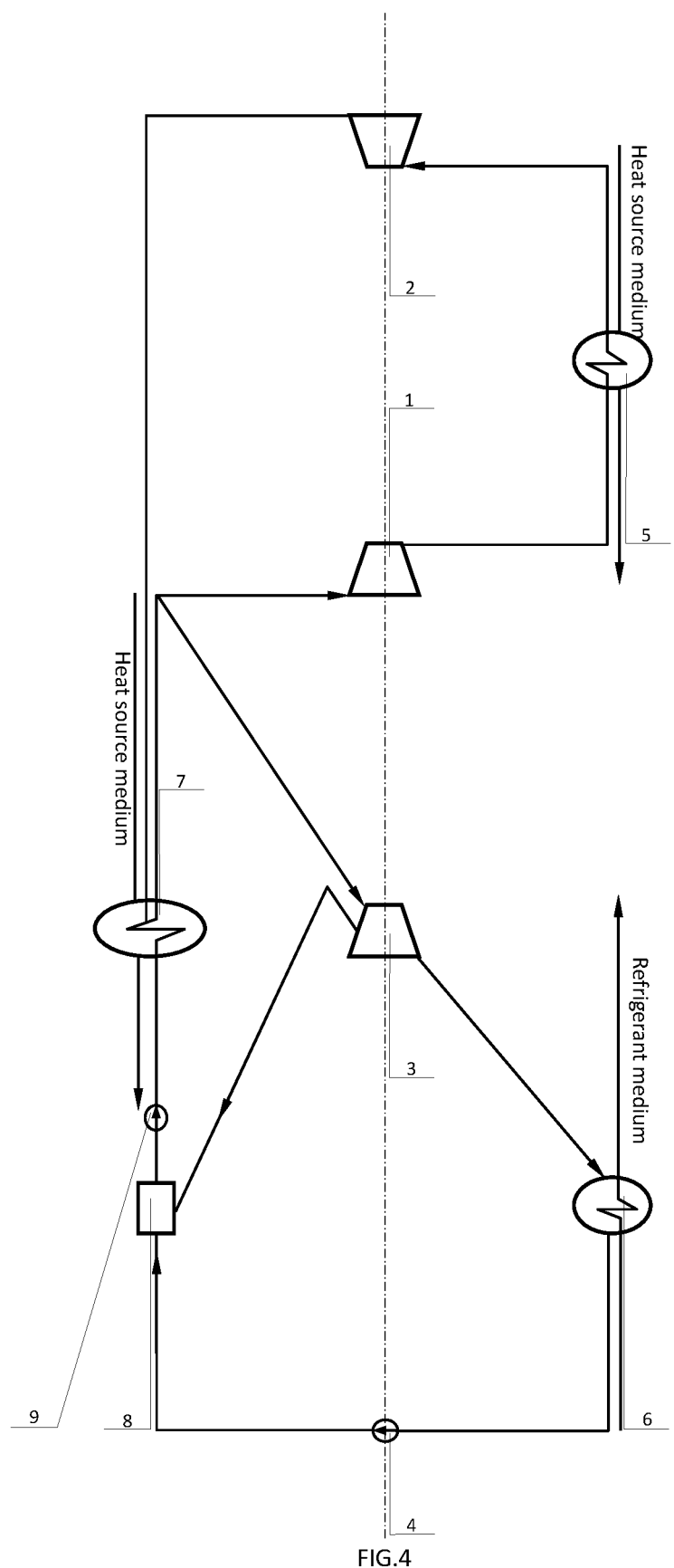
FIG. 4 is the type 2 principle thermal system diagram of the vapor power device for combined cycle provided in this invention.

The vapor power device for combined cycle described in the FIG. 4 works as follows:

(1) Structurally, a vapor power device of the combined cycle comprises a compressor, an expander, the second expander, a circulating pump, a high temperature heat exchanger, a condenser, a mixing evaporator, a reheater and the second circulating pump; The condenser 6 connects to the reheater 8 by a condensate pipeline via the circulating pump 4, the second expander 3 connects to the reheater 8 by a extraction vapor channel, the reheater 8 connects to the mixing evaporator by a condensate pipeline via the second circulating pump 9, the expander 2 connects to the mixing evaporator 7 by a vapor channel, the mixing evaporator 7 connects to the compressor 1 and the second expander 3 respectively, the compressor 1 connects to the expander 2 by a vapor channel via the high temperature heat exchanger 5, the second expander 3 connects to the condenser 6 by a vapor channel; The high temperature heat exchanger 5 connects to the external part by a working-medium channel of the heat source, the condenser 6 connects to the external part by a refrigerant channel, the mixing evaporator 7 is connected with the external part by a working-medium channel of heat source, the expander 2 connects to the compressor 1 and transfers power, the expander 2 and the second expander 3 connect to the external part and output power.

(2) Procedurally, the condensate of the condenser 6 is boosted into the reheater 8 by the circulation pump 4, the extraction vapor of the second expander 3 enters the regenerator 8 to release heat and condense, and the condensate of the regenerator 8 is boosted through the second circulating pump 9 into the mixing evaporator 7, mixes with the high-temperature steam from the expander 2 and absorbed by the heat load provided by the external heat source, and then vaporizes, and the vapor generated by the mixing evaporator 7 is split into two paths—the first path is supplied to the compressor 1 and the second path is supplied to the second expander 3; The vapor of the first path flows through the compressor 1 where the temperature and the compress increases, the high-temperature heat exchanger 5 where the steam absorbs heat, and the expander 2 where the pressure decreases and work and then enters the mixed evaporator 7 where the steam releases heat and cools; The vapor of the second path enters the second expander 3 to work partly and then divides into two paths—the steam of first path enters the reheater 8, the steam of second path continues to work and then enters the condenser 6 where the steam releases heat and condenses; The heat source working-medium provide the driving heat load through the high-temperature heat exchanger 5 and the mixing evaporator 7, the refrigerant working-medium carries away the low temperature heat load by the condenser 6, and a part of the work output from the expander 2 is supplied to the compressor 1 for power, and the expander 2 and the second expander 3 jointly output power, these above-mentioned processes build up a vapor power device of the combined cycle.

The vapor power device for combined cycle described in the FIG. 5 works as follows:

(1) Structurally, a vapor power device of the combined cycle comprises a compressor, an expander, the second expander, a circulating pump, a high temperature heat exchanger, a condenser, a mixing evaporator and a preheater; The condenser 6 connects to the mixing evaporator 7 by a condensate pipeline via the circulating pump 4 and the preheater 10, the expander 2 connects to the mixing evaporator 7 by a vapor channel, the mixing evaporator 7 connects to the compressor 1 and the second expander 3 respectively, the compressor 1 connects to the expander 2 by a vapor channel via the high temperature heat exchanger 5, the second expander 3 connects to condenser 6 by a vapor channel; The high temperature heat exchanger 5 connects to the external part by a working-medium channel of the heat source, the condenser 6 connects to the external part by a refrigerant working-medium channel, the mixing evaporator 7 connects to the external part by the working-medium channel of the heat source, the preheater 10 connects to the external part by a working-medium channel of heat source, the expander 2 connects to the compressor 1 and transfers power, the expander 2 and the second expander 3 connect to the external part and output power, in summary, these above-mentioned equipment and pipelines build up a vapor power device of the combined cycle;

(2) Circulating: the condensate of the condenser 6 is boosted into the mixing evaporator 7 by the circulation pump 4 where the pressure increases and the preheater 10 where the temperature of the vapor increases, mixed with the high temperature steam from the expander 2, and absorbs the heat provided by the external heat source, and then vaporized, and the vapor generated by the mixing evaporator 7 enters the compressor 1 where the temperature and pressure of the steam increases and the second expander 3 where the pressure of the steam decreases and the vapor works; The vapor discharged from the compressor 1 flows through the high-temperature heat exchanger 5 and absorbs heat, and flows through the expander 2 where the pressure of the steam decreases and the vapor works and then enters the mixed evaporator 7 where the steam releases heat and condenses; The vapor discharged from the second expander 3 enters the condenser 6, releases heat to the refrigerant working-medium and condenses; The heat source working-medium provide a driving heat load through the high-temperature heat exchanger 5 and the mixing evaporator 7, and the refrigerant working-medium take away the low-temperature heat load through the condenser 6, a part of the output work of the expander 2 is supplied to the compressor 1 for power, and the expander 2 and the second expander 3 jointly provide power (such as driving the working machine or the generator), in summary, these above-mentioned processes build up a vapor power device of the combined cycle.

Figure 5:
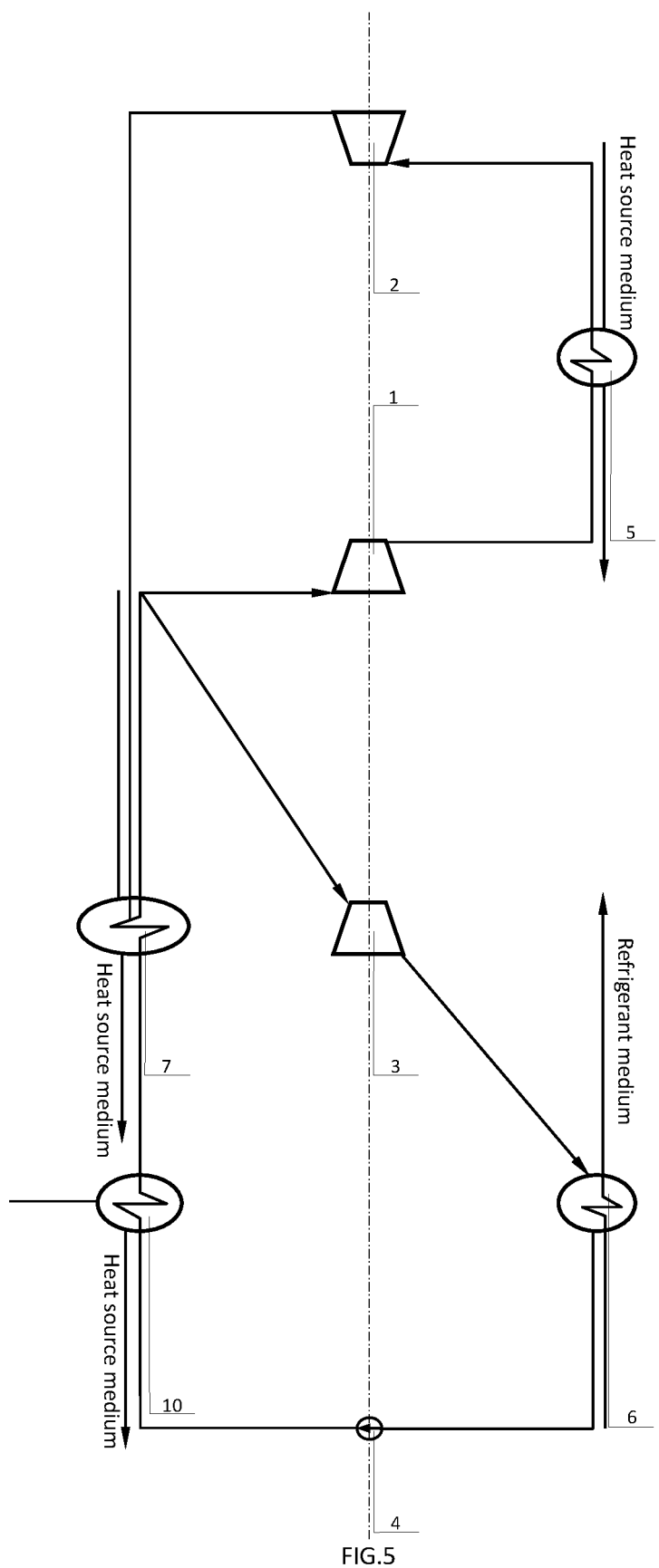
FIG. 5 is the type 3 principle thermal system diagram of the vapor power device for combined cycle provided in this invention.
Figure 6:
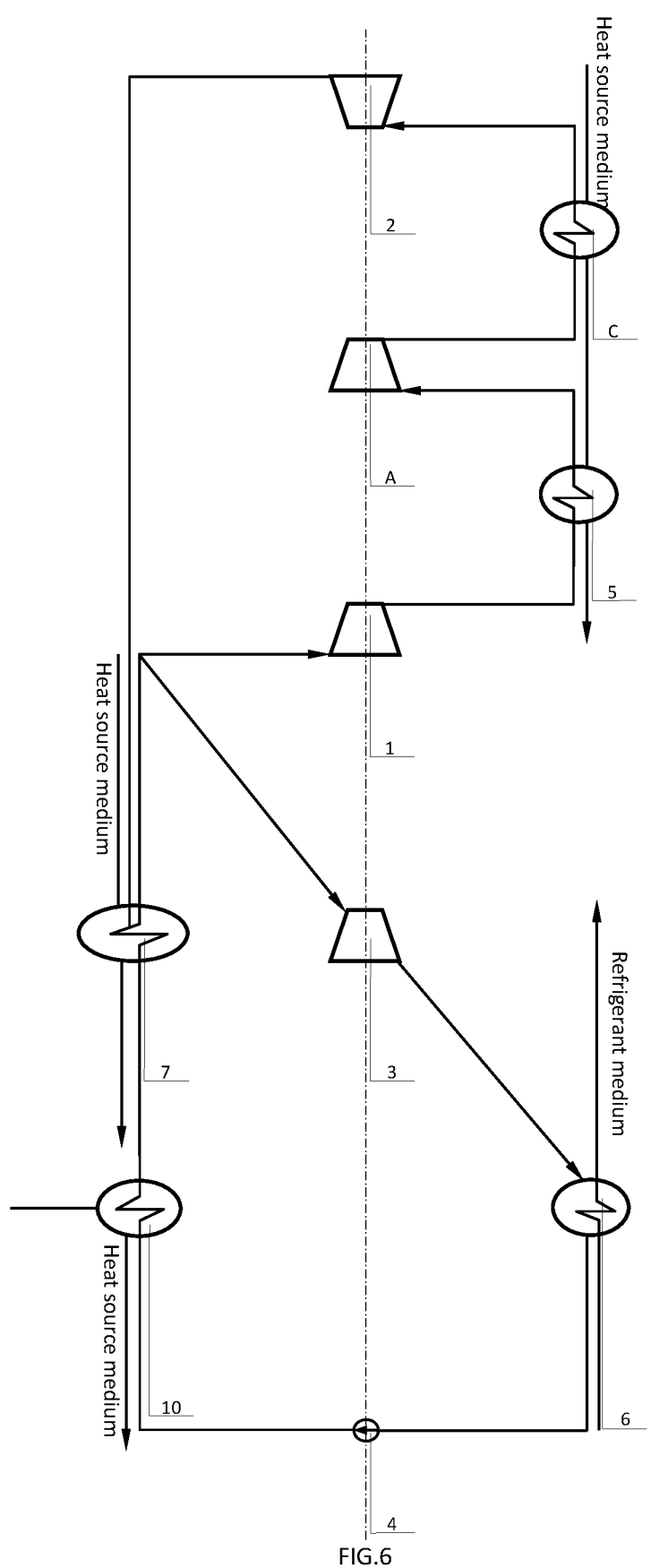
FIG. 6 is the type 4 principle thermal system diagram of the vapor power device for combined cycle provided in this invention.

The vapor power device for combined cycle described in the FIG. 6 works as follows:

(1) Structurally, In the steam power device of the combined cycle described in the FIG. 5, if an added compressor and an added high temperature heat exchanger are added, and 'the compressor 1 connects to expander 2 by a vapor channel via the high temperature heat exchanger 5' is replaced by 'the compressor 1 connects to the added compressor A by a vapor pipeline via the high temperature heat exchanger 5, the added compressor A connects to the expander 2 by a vapor channel via the added high temperature heat exchanger C', the added high temperature heat exchanger C connects to the external part by a working-medium pipeline of the heat source, the expander 2 connects to the added compressor A and transfers power.

(2) Procedurally, compared with the vapor power device for combined cycle shown in FIG. 5, the differences are as follows: the vapor discharged from the compressor 1 flows through the high-temperature heat exchanger 5 and absorbs heat, and then enters the added compressor A where the temperature increases; The vapor discharged from the added compressor A flows through the added high-temperature heat exchanger C and absorbs heat, and then enters the expander 2 where the pressure decreases and works; The expander 2 supplies power to the added compressor A, and the heat source working-medium provide the driving heat load via the high-temperature heat exchanger 5, the added high-temperature heat exchanger C, the mixing evaporator 7 and the preheater 10, these above-mentioned processes build up a steam device of the combined cycle.

Figure 7:
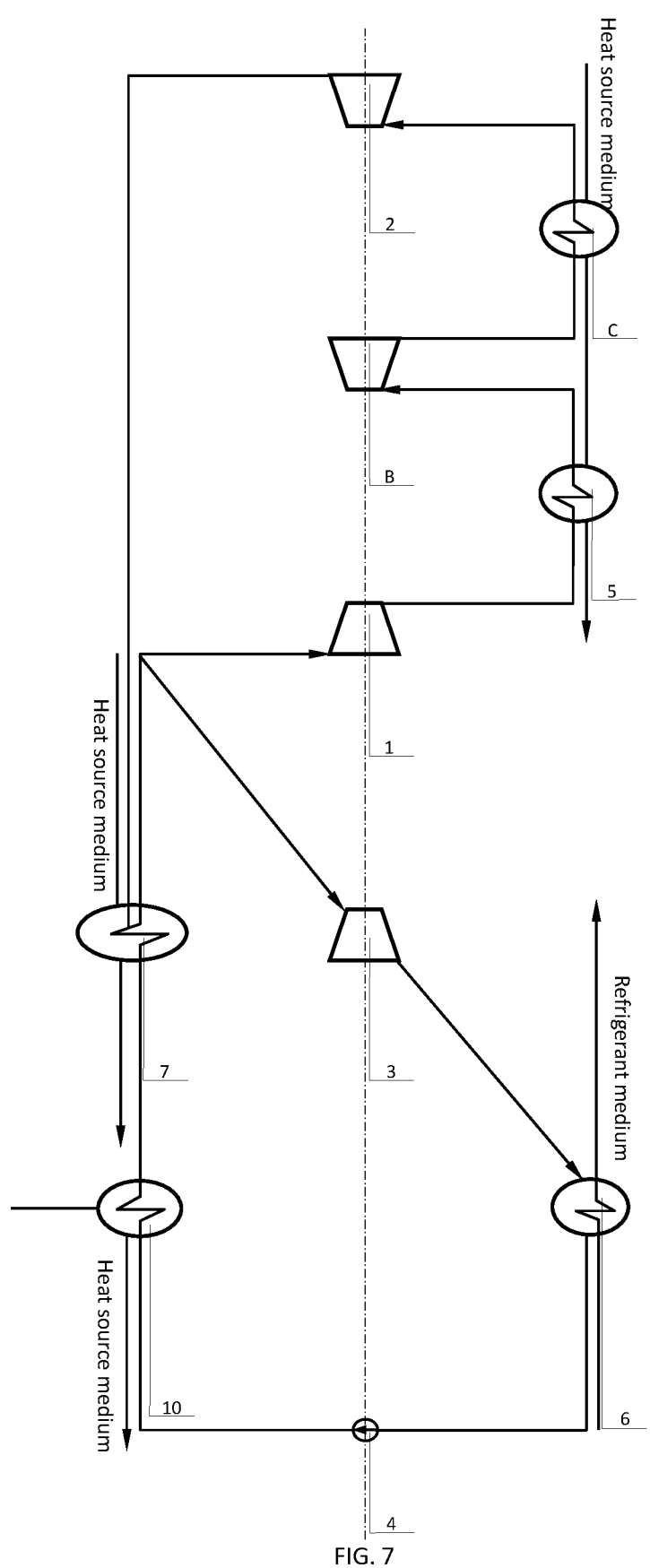
FIG. 7 is the type 5 principle thermal system diagram of the vapor power device for combined cycle provided in this invention.

The vapor power device for combined cycle described in the FIG. 7 works as follows:

(1) Structurally, In the steam power device of the combined cycle described in the FIG. 5, if an added expander and an added high-temperature heat exchanger are added, and 'the compressor 1 connects to expander 2 by a vapor channel via the high temperature heat exchanger 5' is replaced by 'the compressor 1 connects to the added expander B by a vapor pipeline via the high temperature heat exchanger 5, the added compressor A connects to the expander 2 by a vapor channel via the added high temperature heat exchanger C', the added high temperature heat exchanger C connects to the external part by a working-medium pipeline of the heat source, the added expander B connects to the compressor 1 and transfers power, (2) Procedurally, compared with the vapor power device for combined cycle shown in FIG. 5, the differences as following: the vapor discharged from the compressor 1 flows through the high temperature heat exchanger 5 and absorbs heat, and then enters the added expander B where the pressure of the steam decreases and the vapor works; The vapor discharged from the added expander B flows through the added high-temperature heat exchanger C and absorbs heat, and then enters the expander 2 where the pressure of the steam decreases and the vapor works; The work of the added expander B is supplied to the compressor 1 for power or outputted, the heat source working-medium provides the driving heat load via the high-temperature heat exchanger 5, the added high temperature heat exchanger C, the mixing evaporator 7 and the preheater 10, these above-mentioned processes build up a steam device of the combined cycle.

Figure 8:
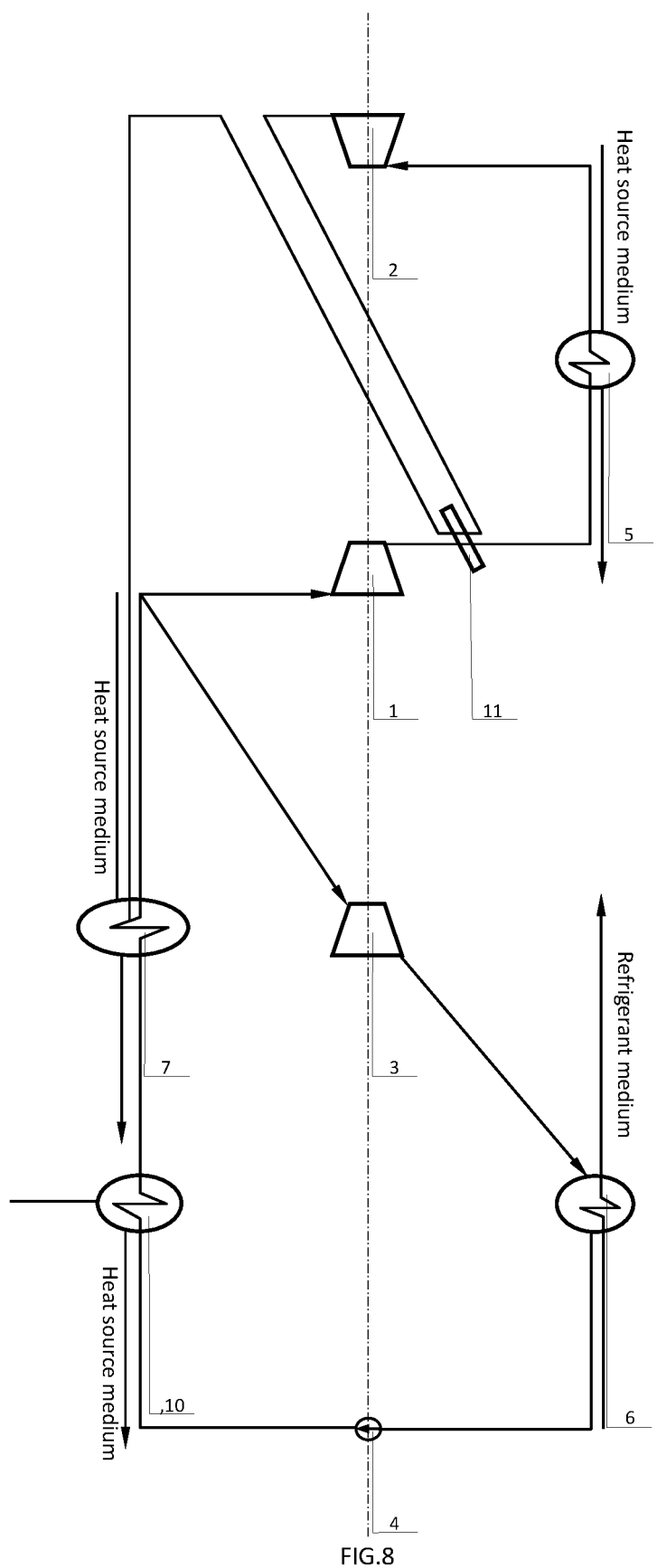
FIG. 8 is the type 6 principle thermal system diagram of the vapor power device for combined cycle provided in this invention.

The vapor power device for combined cycle described in the FIG. 8 works as follows:

(1) Structurally, in the steam power device of the combined cycle described in the FIG. 5, if a high temperature reheater is added, and 'the compressor 1 connects to expander 2 by a vapor channel via the high temperature heat exchanger 5' is replaced by 'the compressor 1 connects to the added compressor A by a vapor channel via the high temperature reheater 11 the high temperature heat exchanger 5', and 'the expander 2 connects to the mixing evaporator 7 by a vapor channel' is replaced by 'the expander 2 connects to the mixing evaporator 7 by a vapor channel via the high temperature reheater 11'.

(2) Procedurally, Compared with the vapor power device for combined cycle shown in FIG. 5, the difference are as follows: the vapor discharged from the compressor 1 flows through the high-temperature reheater 11 and the high-temperature heat exchanger 5 and gradually heats up, and the vapor discharged from the expander 2 flows through the high temperature reheater 11 and releases heat and then enters the mixing evaporator 7, these above-mentioned processes build up a steam device of the combined cycle.

Figure 9:
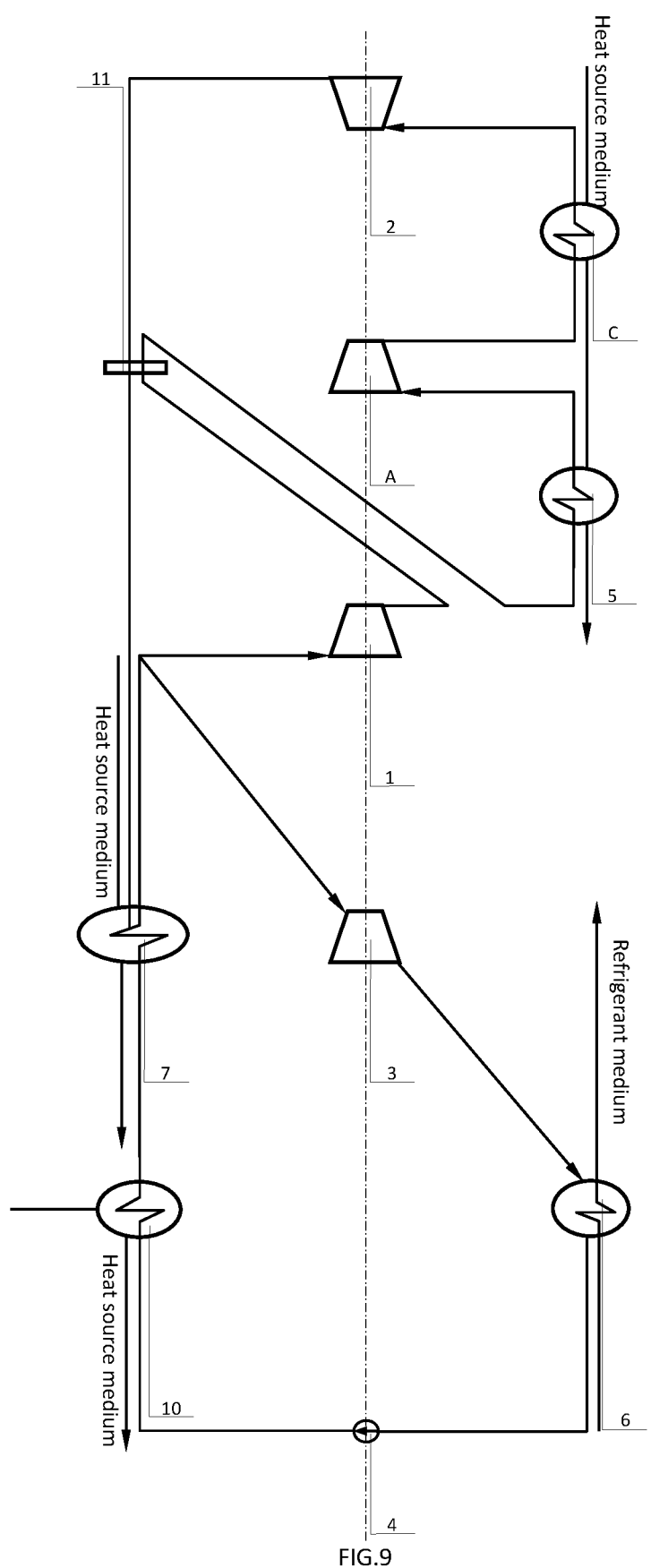
FIG. 9 is the type 7 principle thermal system diagram of the vapor power device for combined cycle provided in this invention.

The vapor power device for combined cycle described in the FIG. 9 works as follows:

(1) Structurally, in the steam power device of the combined cycle described in the FIG. 5, if a high temperature reheater, an added compressor and an added high temperature heat exchanger are added, 'the compressor 1 connects to expander 2 by vapor channel via the high temperature heat exchanger 5' is replaced by 'the compressor 1 connects to the added compressor A by a vapor pipeline via the high temperature reheater 11 and high temperature heat exchanger 5, the added compressor A connects to the expander 2 by a vapor channel via the added high temperature heat exchanger C, the 'expander 2 connects to the mixing evaporator 7 by a vapor channel' is replaced by 'the expander 2 connects to the mixing evaporator 7 by a vapor channel via the high temperature reheater 11', the added high temperature heat exchanger C connects to the external part by a working-medium pipeline of the heat source, and the expander 2 connects to the added compressor A and transfers power', these above-mentioned equipment and pipelines build up a steam device of the combined cycle.

(2) Procedurally, compared with the vapor power device for combined cycle shown in FIG. 5, the difference are as follows: the vapor discharged from the compressor 1 flows through the high-temperature reheater 11 and the high-temperature heat exchanger 5 and gradually absorbs heat and warmings. and then enters the added compressor A where the pressure and temperature increases; The steam from the added compressor A flows through the added high-temperature heat exchanger C and absorbs heat, and then enters the expander 2 where the pressure decreases and works; The vapor discharged from the expander 2 flows through the high-temperature reheater 1 and releases heat to cools down, then enters the mixed evaporator 7; The expander 2 supplies power to the added compressor A, and the heat source working-medium provides a drive thermal load via the high temperature heat exchanger 5, the added high temperature heat exchanger C, the mixed evaporator 7 and the preheater 10, these above-mentioned processes build up a steam device of the combined cycle.

The vapor power device for combined cycle described in the FIG. 10 works as follows:

(1) Structurally, a vapor power device of the combined cycle comprises a compressor, a expander, the second expander, a circulating pump, a high temperature heat exchanger, a condenser, a mixing evaporator, the third expander, the second circulating pump and a middle temperature evaporator; The condenser 6 connects to the mixing evaporator 7 by a condensate pipeline via the circulating pump 4, the expander 2 connects to the mixing evaporator 7 by a vapor channel via the middle temperature evaporator 13, the mixing evaporator 7 connects to the compressor 1 and the second expander 3 by a vapor channel respectively, the compressor 1 connects to the expender 2 by a vapor channel via the high temperature heat exchanger 5, the second expander 3 connects to the condenser 6 by a vapor channel; The condenser 6 connects to the middle temperature heat exchanger 13 by a condensate pipeline via the second circulating pump 9, the middle temperature heat exchanger 13 connects to the third expander 12 by a vapor channel, the third expander connects to the condenser 6 by a vapor channel; The high temperature heat exchanger 5 connects to the external part by a heat source working-medium channel, the condenser 6 connects to the external part by a refrigerant working-medium channel, the expander 2 connects to the compressor 1 and transfers power, the expander 2, the second expander 3 and the third expander 12 connect to the external part and output power.

(2) Procedurally, the vapor discharged from the compressor 1 flows through the high-temperature heat exchanger 5 and absorbs heat, and then enters the expander 2 where the pressure decreases and works; The vapor discharged from the expander 2 flows through the middle-temperature evaporator 13 and releases heat and cools down, and then enters the mixing evaporator 7 and mixes with the condensate from the condenser 6 and releases the heat and cools down; The condensate of the condenser 6 is divided into two paths—the condensate of the first path is boosted by the circulation pump 4 into the mixing evaporator 7, and the condensate of the second path is boosted by the second circulating pump 9 into the middle-temperature evaporator 13 and absorbs heat and vaporizes; The vapor generated by the mixing evaporator 7 enters respectively the compressor 1 where the temperature and the pressure increases and the second expander 3 where the pressure decreases and the vapor works, and the vapor discharged from the second expander 3 enters the condenser 6 and releases heat and condenses; The vapor generated by the middle-temperature evaporator 13 flows through the third expander 12 where the pressure decreases and the vapor works, and then enters the condenser 6 to release heat and condense; The heat source working-medium provide a driving heat load via the high-temperature heat exchanger 5, the refrigerant working-medium carry away the low-temperature heat load via the condenser 6, and a part of the work outputted from the expander 2 is supplied to the compressor 1 for power, and the expander 2, the second expander 3 and the third expander 12 jointly output power to the outside (for example, driving work Machine or generator), in summary, these above-mentioned processes build up the vapor power device of the combined cycle.

Figure 10:
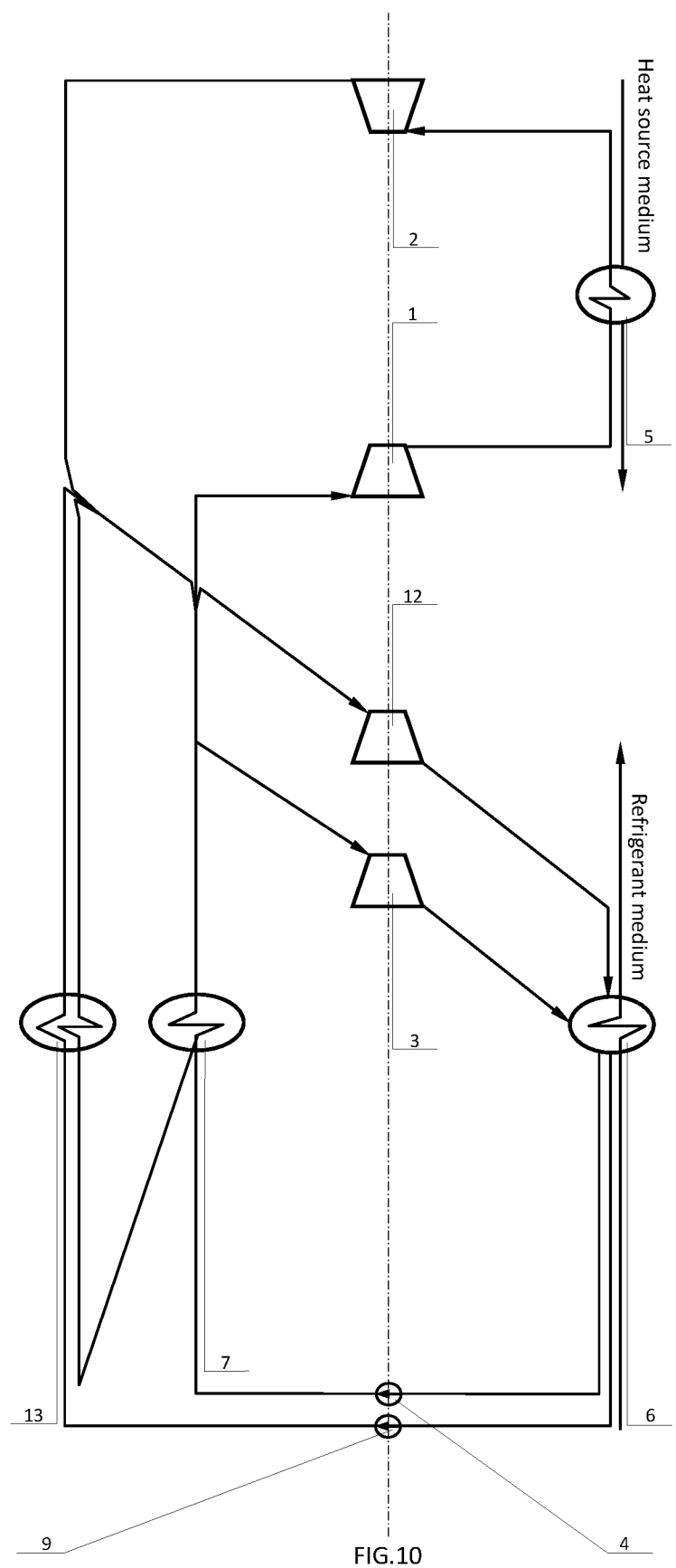
FIG. 10 is the type 8 principle thermal system diagram of the vapor power device for combined cycle provided in this invention.

The vapor power device for combined cycle described in the FIG. 11 works as follows:

In the vapor power device for combined cycle shown in the FIG. 10, a heat source working-medium pipeline to the outside is added to the mixing evaporator 7 and the middle-temperature evaporator 13 respectively; The condensate in the mixing evaporator absorbs heat from the mixing with the steam and the external heat source as the same time, the condensate in the middle-temperature evaporator absorbs heat of the steam and the heat source, these processes build up the vapor power device for combined cycle.

Figure 12:
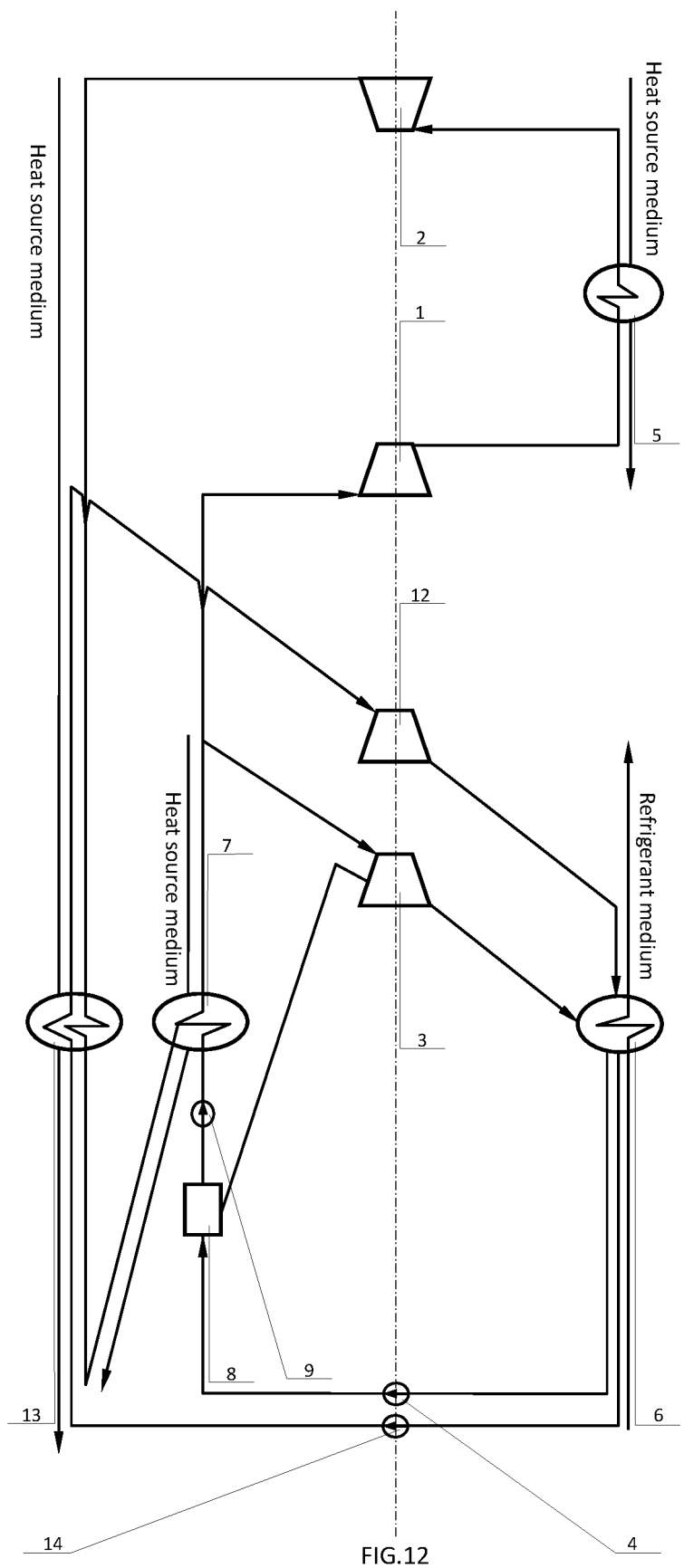
FIG. 12 is the type 10 principle thermal system diagram of the vapor power device for combined cycle provided in this invention.

The vapor power device for combined cycle described in the FIG. 12 works as follows:

(1) Structurally, a vapor power device of the combined cycle comprises a compressor, a expander, the second expander, a circulating pump, a high temperature heat exchanger, a condenser, a mixing evaporator, a reheater, the second circulating pump, the third expander, a middle temperature evaporator and the third circulating pump; The condenser 6 connects to the reheater 8 by a condensate pipeline via the circulating pump 4, the second expander 3 or the third expander 12 connects to the reheater 8 by the extraction steam pipeline, the reheater 8 connects to mixing evaporator 7 by a condensate pipeline via the second circulating pump 9, the expander 2 connects to the mixing evaporator 7 by a vapor channel via the middle temperature evaporator 13, the mixing evaporator 7 connects to the compressor 1 and the second expander 3 by a vapor channel respectively, the compressor 1 connects to the expander 2 by a vapor channel via the high temperature heat exchanger 5, the second expander 3 connects to the condenser 6 by a vapor channel; The high temperature heat exchanger 5 connects to the external part by a working-medium channel of the heat source, the condenser 6 connects to the external part by a refrigerant working-medium channel, the expander 2 connects to the compressor 1 and transfers power, the expander 2, the second expander 3 and the third expander 12 connect to the external part and output power.

(2) Procedurally, the vapor discharged from the compressor 1 flows through the high-temperature heat exchanger 5 and absorbs heat, and then enters the expander 2 where the pressure reduces; The vapor discharged from the expander 2 flows through the middle-temperature evaporator 13 and releases heat and cools down, and then enters the mixing evaporator 7 where the vapor is mixed with the condensate from the reheater 8 and releases the heat and cools down; The condensate of the condenser 6 is split into two paths— the condensate of the first path is boosted by the circulation pump 4 into the reheater 8, and the extraction vapor of the second expander 3 enters the reheater 8 and releases heat and condenses, and the condensate of the regenerator 8 is boosted into the mixing evaporator 7 via the second circulation pump 9, and the condensate of the second path is boosted to the middle-temperature evaporator 13 via the third circulating pump 14 and absorbs heat and vaporizes; The vapor produced by the mixing evaporator 7 is split into two paths—the vapor of the first path is supplied to the compressor 1 where the temperature of the vapor increases, the vapor of the second path is supplied to the second expander 3 where the vapor work partly; After the work, the vapor is divided into two paths—the vapor of the first way enters the reheater 8, the vapor of the second path continues to work and then enters the condenser 6 to release heat and condense; The vapor generated by the middle-temperature evaporator 13 flows through the third expander 12 and works, then entering the condenser 6 to release heat and condenses; The heat source working-medium via high-temperature heat exchange, the middle-temperature evaporator 13 and the mixing evaporator 7 provides a driving heat load, and the cooling working-medium takes away the low-temperature heat load via the condenser 6, and a part of the work outputted by the expander 2 is supplied to the compressor 1 for power, the expander 2, the second The expander 3 and the third expander 12 collectively output power, in summary, these above-mentioned processes build up the vapor power device of the combined cycle.

Figure 13:
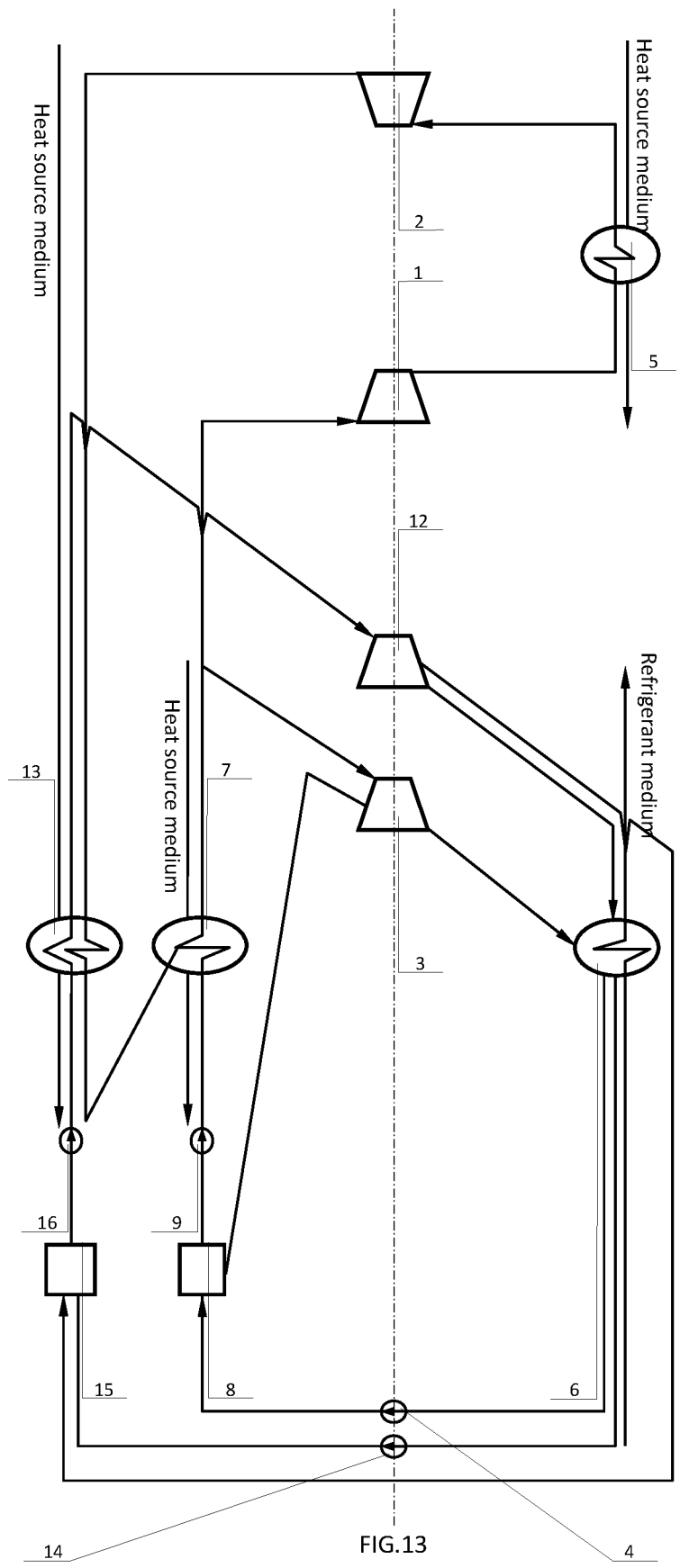
FIG. 13 is the type 11 principle thermal system diagram of the vapor power device for combined cycle provided in this invention.

The vapor power device for combined cycle described in the FIG. 13 works as follows:

(1) Structurally, a vapor power device of the combined cycle comprises a compressor, a expander, the second expander, a circulating pump, a high-temperature heat exchanger, a condenser, a mixing evaporator, a reheater, the second circulating pump, the third expander, a middle-temperature evaporator, the third circulating pump, the second reheater and a forth circulating pump; The condenser 6 connects to the reheater 8 by a condensate pipeline via the circulating pump 4, the second expander 3 or the third expander 12 connects to the reheater 8 by a extraction vapor channel, the reheater 8 connects to the mixing evaporator 7 by a condensate pipeline via the second circulating pump 9, the expander 2 connects to the mixing evaporator 7 by a vapor channel via the middle temperature evaporator 13, the mixing evaporator 7 connects to the compressor 1 and the second expander 3 by a vapor channel respectively, the compressor 1 connects to the high temperature heat exchanger 5 and the expander 2 by a vapor channel, the second expander 3 connects to the condenser 6 by a vapor channel; The condenser 6 connects to the second reheater 15 by a condensate pipeline via the third circulating pump 14, and the third expander 12 or the second expander 3 connects to the second reheater 15 by a extraction vapor channel, the second reheater 15 connects to the middle temperature evaporator 13 by a condensate pipeline via the forth circulating pump 16, the middle temperature evaporator 13 connects to the third expander 12 by a vapor channel, the third expander 12 connects to the condenser 6 by a vapor channel; The high temperature evaporator connects to the external part by a working-medium pipeline of the heat source, the condenser 6 connects to the external part by the refrigerant working-medium channel, the expander 2 connects to the compressor 1 and transfers power, the expander 2, the second expander 3 and the third expander 12 connect to the external part and output power.

(2) Procedurally, the vapor discharged from the compressor 1 flows through the high-temperature heat exchanger 5 and absorbs heat, and then enters the expander 2 where the pressure decreases and works; The vapor discharged from the expander 2 flows through the middle-temperature evaporator 13 and releases heat and cools down, and then enters the mixing evaporator 7 where the vapor is mixed with the condensate from the reheater 8 and releases heat and cools down; The condensate of the condenser 6 is divided into two paths—the condensate of the first passage is boosted by the circulating pump 4 into the reheater 8, the extraction vapor of the second expander 3 enters the reheater 8, release heat and condense, and the condensate of the reheater 8 is boosted into the mixing evaporator 7 via the second circulating pump 9, and the condensate of the second path is boosted to the second reheater via the third circulating pump 14 into the second reheater 15, the extraction vapor of the third expander 12 enters into the second reheater 15, releases heat and condenses, the condensate of the second reheater 15 is boosted by the fourth circulating pump 16 and then enters the middle-temperature evaporator 13, absorbs heat and vaporizes; The vapor produced by the mixing evaporator 7 is divided into two paths—the vapor of the first path is supplied to the compressor 1 and cools down, and the vapor of the second path is supplied to the second expander 3; The vapor enters the second expander 3, works partly and then is divided into two paths. The vapor of the first path enters the reheater 8, and the vapor of the second path continues to work and then enters the condenser 6, releases heat and condenses; The vapor generated by the middle-temperature evaporator 13 flows through the third expander 12 and work partly, and then splits into two paths—the vapor of the first path enters the second regenerator 15, and the vapor of the second path enters the condenser 6 after completely working releases heat and condenses; The heat source working-medium provides a driving heat load via the high-temperature heat exchanger 5, the middle-temperature evaporator 13 and the mixing evaporator 7, the refrigerant working-medium carry away the low-temperature heat load via the condenser 6, and a part of the work outputted by the expander 2 is supplied to the compression 1 for power, and the expander 2, the second expander 3 and the third expander 12 collectively output power, in summary, these processes build up the vapor power device of the combined cycle.

The vapor power device for combined cycle described in the FIG. 14 works as follows:

(1) Structurally, a vapor power device of the combined cycle comprises a compressor, a expander, the second expander, a circulating pump, a high-temperature heat exchanger, a condenser, a mixing evaporator, the second circulating pump, a preheater, the third expander, a middle-temperature evaporator and the second preheater; The condenser connects to the mixing evaporator 7 by a condensate pipeline via the circulating pump 4 and the preheater 10, the expander 2 connects to the mixing evaporator by a vapor channel via the middle-temperature evaporator 13, the mixing evaporator 7 connects to the compressor 1 and the second expander 3 by a vapor channel respectively, the compressor 1 connects to the expander 2 by a vapor channel via the high-temperature heat exchanger 5, the second expander 3 connects to the condenser 6 by a vapor channel; The condenser 6 connects to the middle-temperature evaporator 13 by a condensate pipeline via the second circulating pump 9 and the second preheater 17, the middle-temperature evaporator 13 connects to the third expander 12 by a vapor channel, the third expander 12 connects to the condenser 6 by a vapor channel; The high-temperature heat exchanger 5 connects to the external part by a working-medium pipeline of the heat source, the condenser 6 connects to the external part by a refrigerant working-medium channel, the preheater 10 and the second preheater 17 connect to the external part by a working-medium pipeline respectively, the expander 2 connects to the compressor 1 and transfers power, the expander 2, the second expander 3 and the third expander 12 connect to the external part and output power, in summary, these equipment and pipelines build up the vapor power device of the combined cycle.

(2) Procedurally, the vapor discharged from the compressor 1 flows through the high-temperature heat exchanger 5 and absorbs heat, and then enters the expander 2 where the pressure decreases; The vapor discharged from the expander 2 flows through the middle-temperature evaporator 13, releases heat and cools down, and then enters the mixing evaporator 7 where the vapor is mixed with the condensate from the preheater 10, releases heat and cools down; The condensate of the condenser 6 is divided into two paths—the condensate of the first path is boosted by the circulating pump 4 and flows through the preheater 10, absorbs heat and enters the mixing evaporator 7, the condensate of the second path is boosted by the second circulating pump 9 and flows through the second preheater 17 absorbs heat and then enters the middle-temperature evaporator 13, absorbs heat and vaporizes; The vapor generated by the mixing evaporator 7 enters separately the compressor 1 where the temperature and pressure increases and the second expander 3 where the pressure decreases and the vapor works, the vapor discharged from the second expander 3 enters the condenser 6, releases heat and condenses; The vapor generated by the middle-temperature evaporator 13 flows through the third expander 12 where the pressure decreases and works, and then the vapor enters the condenser 6, releases heat and condenses; The heat source working-medium provides a driving heat load via the high-temperature heat exchanger 5, the middle-temperature evaporator 13, the mixing evaporator 7, the preheater 10, and the second preheater 17, and the refrigerant working-medium takes away the low temperature heat load via the condenser 6, and the output of the expander 2, and a part of the work outputted by the expander 2 is supplied to the compression 1 for power, and the expander 2, the second expander 3 and the third expander 12 collectively output power, in summary, these processes build up the vapor power device of the combined cycle.

Figure 15:
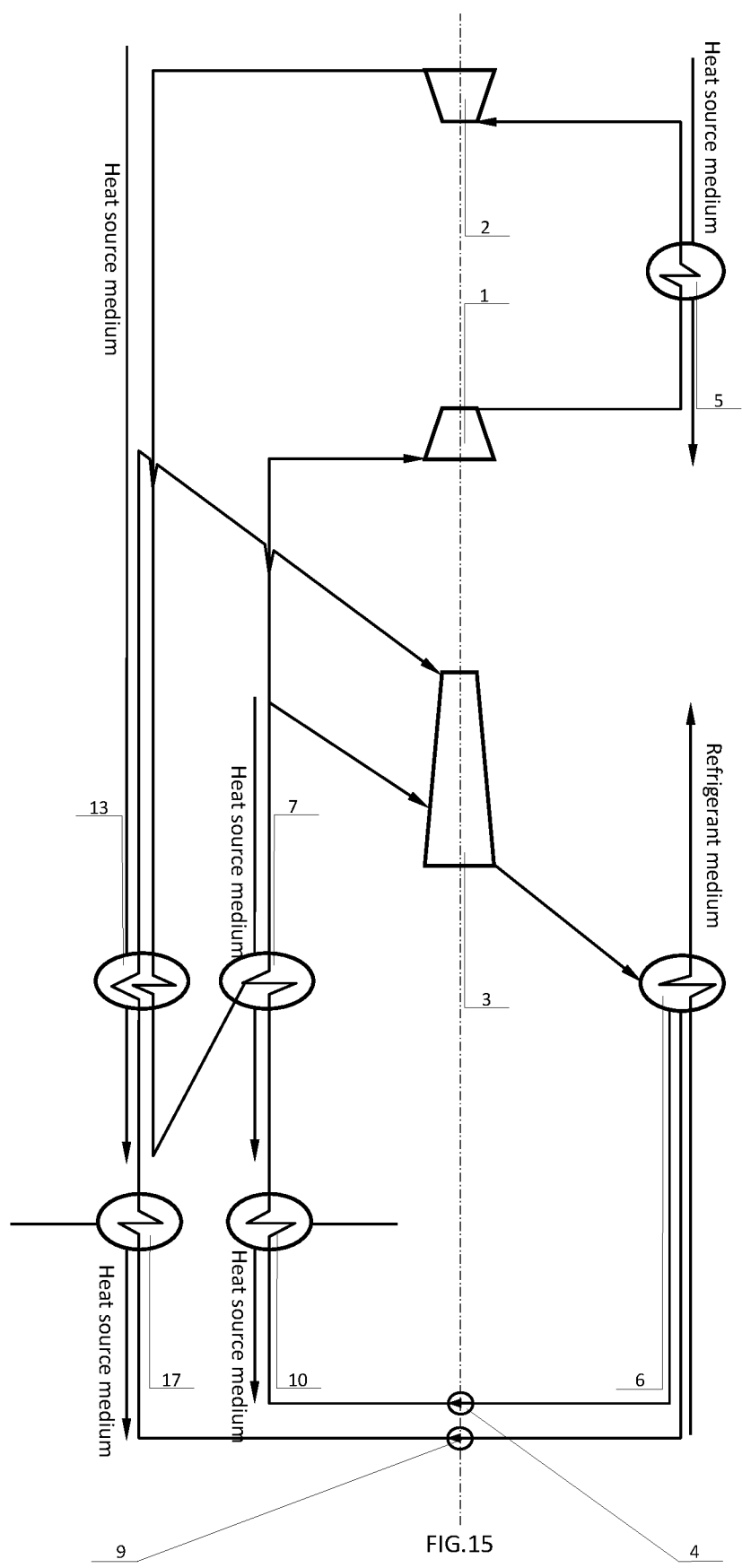
FIG. 15 is the type 13 principle thermal system diagram of the vapor power device for combined cycle provided in this invention.

The vapor power device for combined cycle described in the FIG. 15 works as follows:

(1) Structurally, a vapor power device of the combined cycle comprises a compressor, a expander, the second expander, a circulating pump, a high-temperature heat exchanger, a condenser, a mixing evaporator, the second circulating pump, a preheater, a middle-temperature evaporator and the second preheater; The condenser 6 connects to the mixing evaporator 7 by a condensate pipeline via the circulating pump 4 and the preheater 10, the expander 2 connects to the mixing evaporator 7 by a vapor channel via the middle-temperature evaporator 13, and the mixing evaporator 7 connects to the compressor 1 by a vapor channel, the mixing evaporator 7 connects to the second compressor 3 by an intermediate intake channel, the compressor 1 connects to the expander 2 by a vapor channel via the high-temperature heat exchanger 5; The condenser 6 connects to the middle-temperature evaporator 13 by a condensate pipeline via the second circulating pump 9 and the second preheater 17, the middle-temperature evaporator 13 connects to the second expander 3 by a vapor channel, the second expander 3 connects to the condenser 6 by a vapor channel; The high-temperature heat exchanger 5 connects to the external part by a working-medium pipeline of the heat source, the condenser 6 connects to the external part by a refrigerant working-medium channel, the middle-temperature evaporator 13 and the mixing evaporator 7 connect to the external part by a working-medium channel of the heat source, the preheater 10 and the second preheater 17 connect to the external part by a working-medium pipeline of the heat source, the expander 2 connects to the compressor 1 and transfers power, the expander 2 and the second expander 3 connect to the external part and transfer power.

(2) Procedurally, the vapor discharged from the compressor 1 flows through the high-temperature heat exchanger 5 and absorbs heat, and then enters the expander 2 where the pressure decreases and the vapor works; The vapor discharged from the expander 2 flows through the middle-temperature evaporator 13, releases heat and cool down, and then enters the mixing evaporator 7 where the vapor is mixed with the condensate from the preheater 10, releases heat and cools down; The condensate of the condenser 6 is split into two paths—the condensate of the first path is boosted by the circulating pump 4 and flows through the preheater 10 where the temperature increases and then enters the mixing evaporator 7, the condensate of the second path is boosted by the second circulating pump 9 and flows through the second preheater 17, absorbs heat and then enters the middle-temperature evaporator 13, absorbs heat and vaporizes; The vapor generated by the mixing evaporator 7 enters separately the machine compressor 1 where the temperature and pressure increases and the second expander 3 where the pressure decreases and the vapor works, the vapor generated by the middle-temperature evaporator 13 enters the second expander 3 and works, and the vapor discharged from the second expander 3 enters the condenser 6, releases heat and condenses; The heat source working-medium provides a driving heat load via the high-temperature heat exchanger 5, the middle-temperature evaporator 13, the mixing evaporator 7, the preheater 10 and the second preheater 17, and the refrigerant working-medium takes away the low temperature heat load via the condenser 6, part of the work outputted by the expander 2 is provided to the compressor 1 for power, and the expander 2 and the second expander 3 output jointly power (such as driving a working machine or a generator), in summary, these equipment and pipelines build up the vapor power device of the combined cycle.

Figure 11:
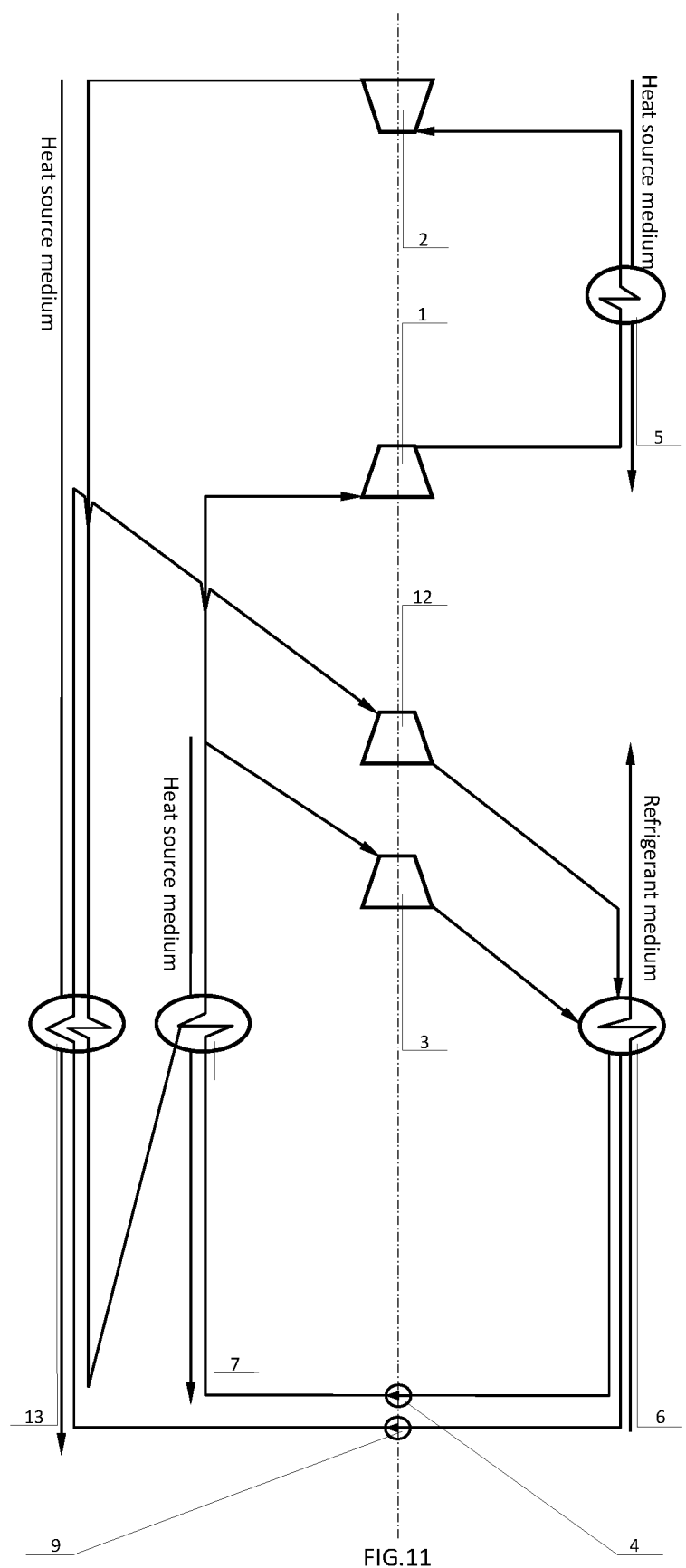
FIG. 11 is the type 9 principle thermal system diagram of the vapor power device for combined cycle provided in this invention.
Figure 16:
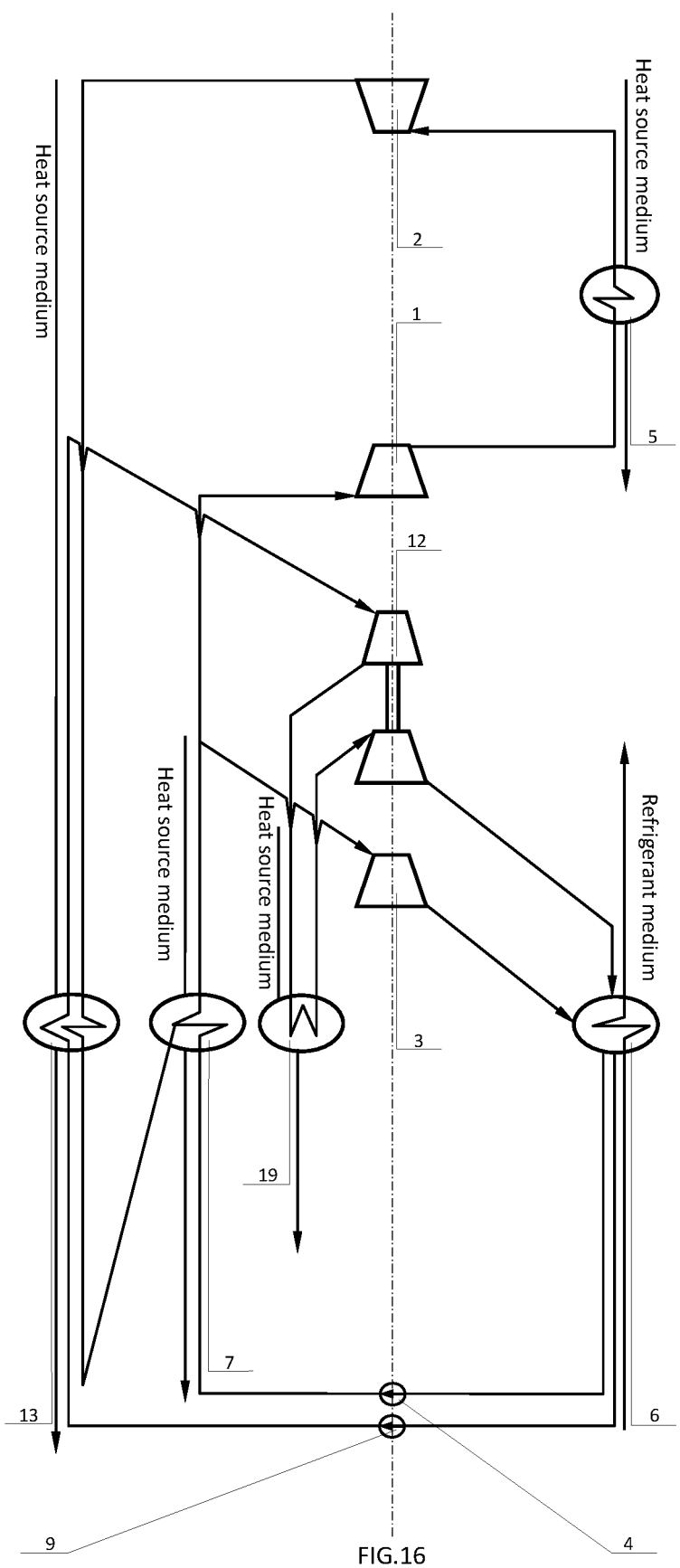
FIG. 16 is the type 14 principle thermal system diagram of the vapor power device for combined cycle provided in this invention.

The vapor power device for combined cycle described in the FIG. 16 works as follows:

In the vapor power device for combined cycle shown in the FIG. 11, if an intermediate reheater is added, 'the middle-temperature evaporator 13 connects to the third expander 12 by a vapor channel, and the third expander 12 connects to the condenser 6 by a vapor channel' is replaced by 'the middle-temperature evaporator 13 connects to the third expander 12 by a vapor channel, the third expander 12 connects to the third expander 12 by an intermediate reheating vapor channel via the intermediate reheater 19, the third expander 12 connects to the condenser 6 by a vapor channel, and the intermediate reheater 19 connects to the external part by a working-medium channel of the heat source'; The vapor produced from the middle-temperature evaporator 13 enters the third expander 12 and works to a certain intermediate pressure, and is taken out through the intermediate reheat vapor passage into the intermediate reheater 19 and absorbs heat, and then enters the third expander via the intermediate reheat vapor passage and continues to work, then enters the condenser 10, releases heat and condenses, these processes build up the vapor power device for combined cycle.

Figure 14:
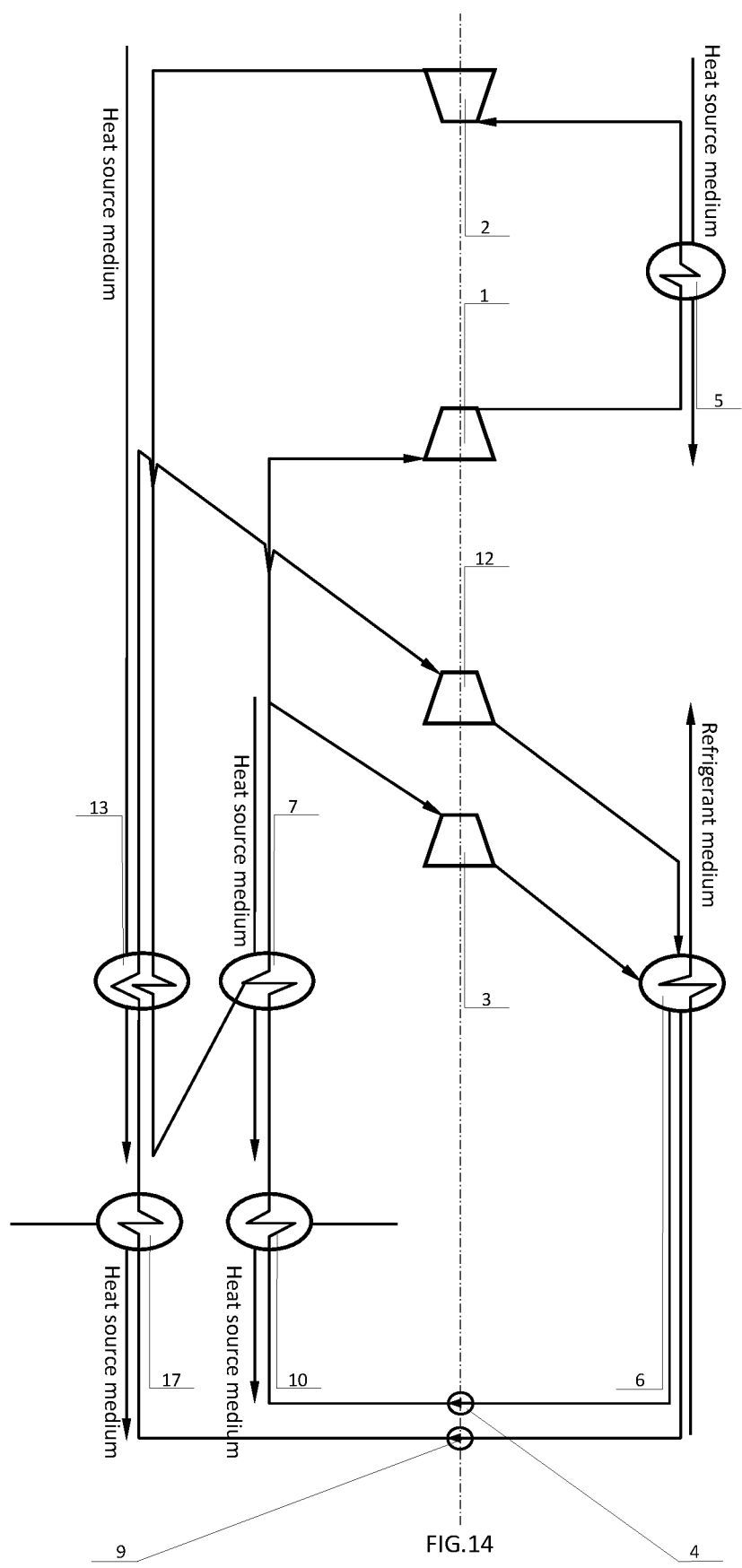
FIG. 14 is the type 12 principle thermal system diagram of the vapor power device for combined cycle provided in this invention.
Figure 17:
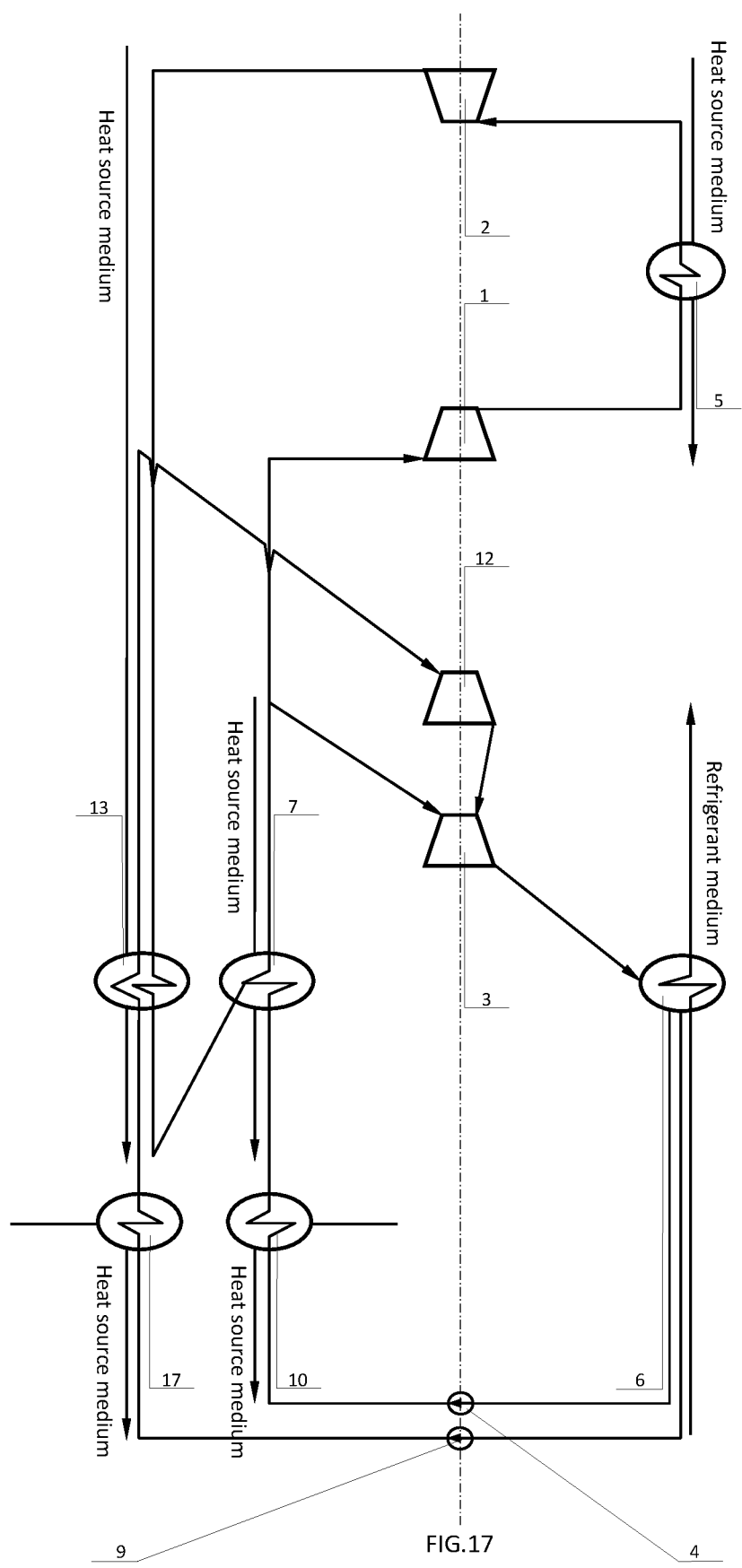
FIG. 17 is the type 15 principle thermal system diagram of the vapor power device for combined cycle provided in this invention.

The vapor power device for combined cycle described in the FIG. 17 works as follows:

In the vapor power device for combined cycle shown in FIG. 14, 'the third expander 12 connects to the condenser 6 by a vapor passage' is replaced by 'the third expander 12 connects to the second expander 3 by a vapor passage; The vapor of the third expander 12 works partly, and enters the second expander 3 and continues to work, and then enters the condenser 6, releases heat and condenses, these processes build up the vapor power device for combined cycle.

Figure 18:
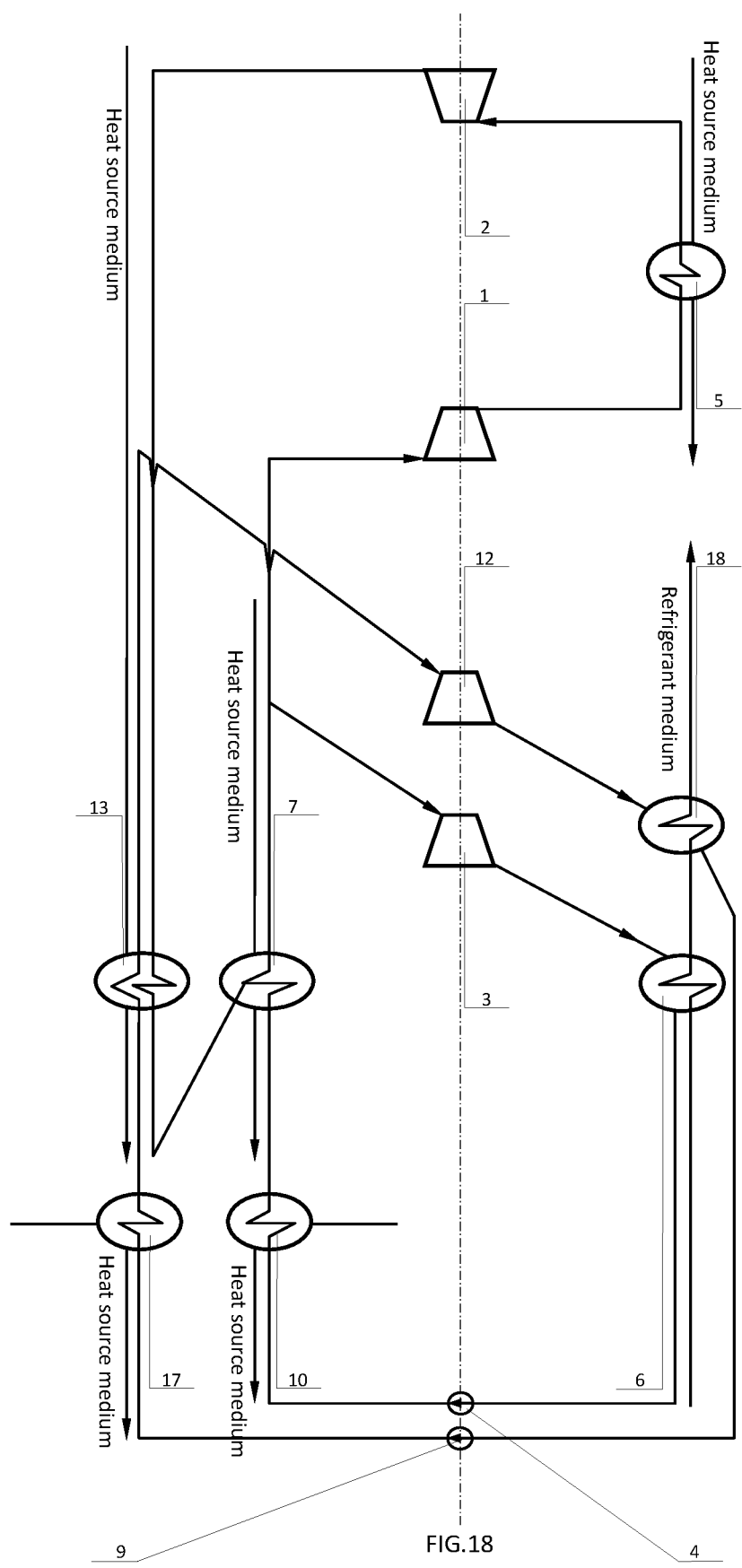
FIG. 18 is the type 16 principle thermal system diagram of the vapor power device for combined cycle provided in this invention.

The vapor power device for combined cycle described in the FIG. 18 works as follows:

(1) Structurally, In the vapor power device for combined cycle shown in the FIG. 14, if the second condenser is added, 'the third expander 12 connects to the condenser 6 by a vapor channel' is replaced by 'the third expander 12 connects to the second condenser 18 by a vapor channel', 'the condenser 6 connects to the middle-temperature evaporator 13 by a condensate pipeline via the second circulating pump 9 and the second preheater 17' is replaced by 'the second condenser 18 connects to the middle-temperature evaporator 13 by a condensate pipeline via the second circulating pump 9 and the second preheater 17, and the second condenser connects to the external part by the refrigerant working-medium pipeline', these above-mentioned equipment and pipelines build up the vapor power device for combined cycle.

(2) Procedurally, compared with the vapor power device for combined cycle shown in FIG. 14, the difference are as follows: the vapor discharged from the third expander 12 enters the second condenser 18, releases heat to the refrigerant working-medium and condenses, the condensate of the second condenser 18 flows through the second circulating pump 9 where the pressure increase, the second preheater 17, absorbs heat and warmings and the middle-temperature evaporator 13, absorbs heat and vaporizes, and then flows into the third expander 12 and works, these above-mentioned processes build up the vapor power device for combined cycle.

Figure 19:
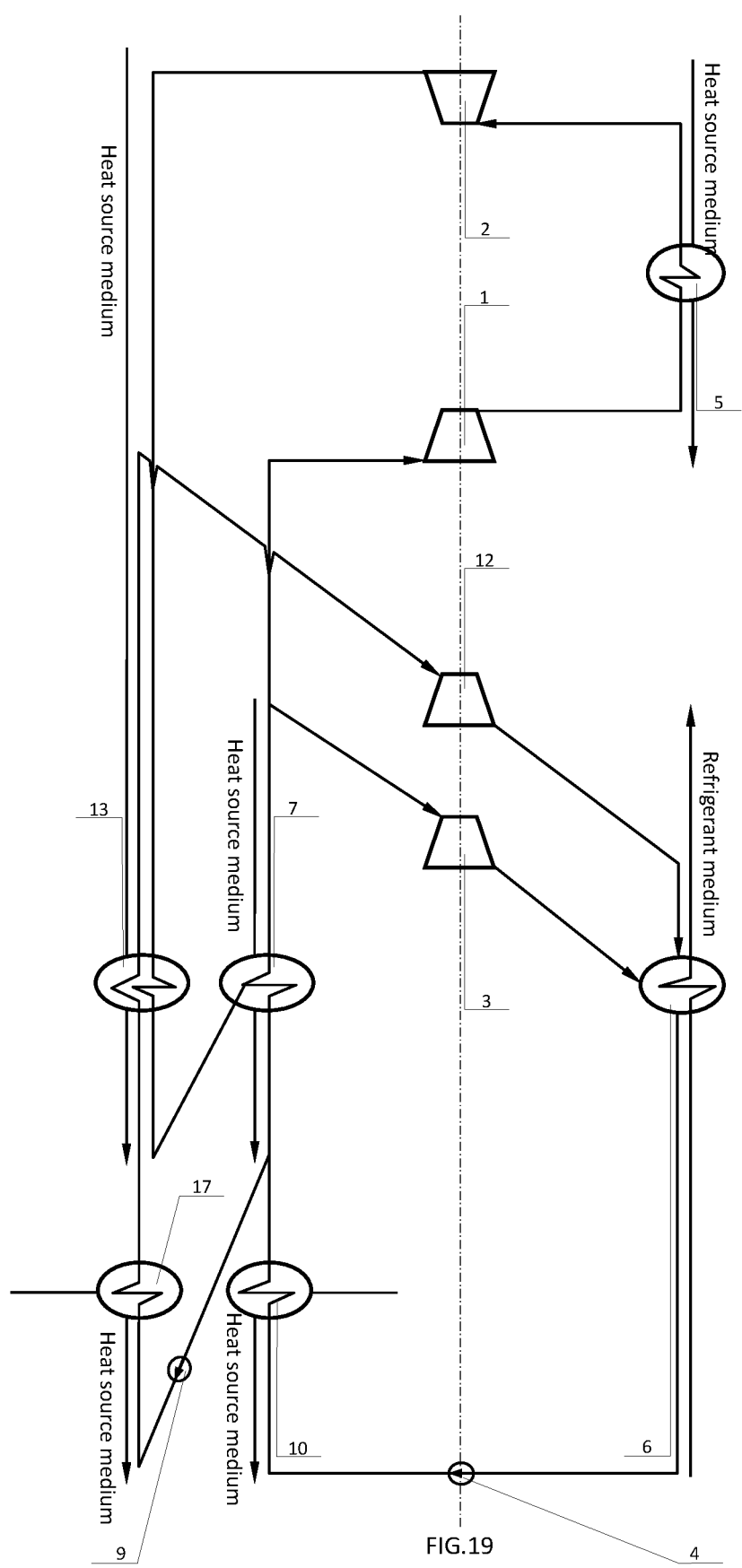
FIG. 19 is the type 17 principle thermal system diagram of the vapor power device for combined cycle provided in this invention.

The vapor power device for combined cycle described in the FIG. 19 works as follows:

(1) Structurally, In the vapor power device for combined cycle shown in FIG. 14, 'the condensate line of the condenser 6 connects to the mixing evaporator 7 via the circulating pump 4 and the preheater 10, and the condensate line of the condenser 6 are in communication with the middle-temperature evaporator 13 via the second circulating pump 9 and the second preheater 17' is adjusted to 'the condenser 6 has a condensate line divided by the circulation pump 4 and the preheater 10 into two paths—the first path connects to the mixing evaporator 7 directly, and the second path connects to the middle-temperature evaporator 13 via the second circulating pump 9 and the second preheater 17.

(2) Procedurally, compared with the vapor power device for combined cycle shown in FIG. 14, the differences are as follows: the condensate of the condenser 6 flows through the circulating pump 4 and the preheater 10 and absorbs heat and then divided into two paths—the condensate of the first path enters the mixing evaporator 7, the second flow is boosted by the second circulation pump 9, flows through the second preheater 17, absorbs heat and flows through the middle-temperature evaporator 13, these above-mentioned processes build up the vapor power device for combined cycle.

Figure 20:
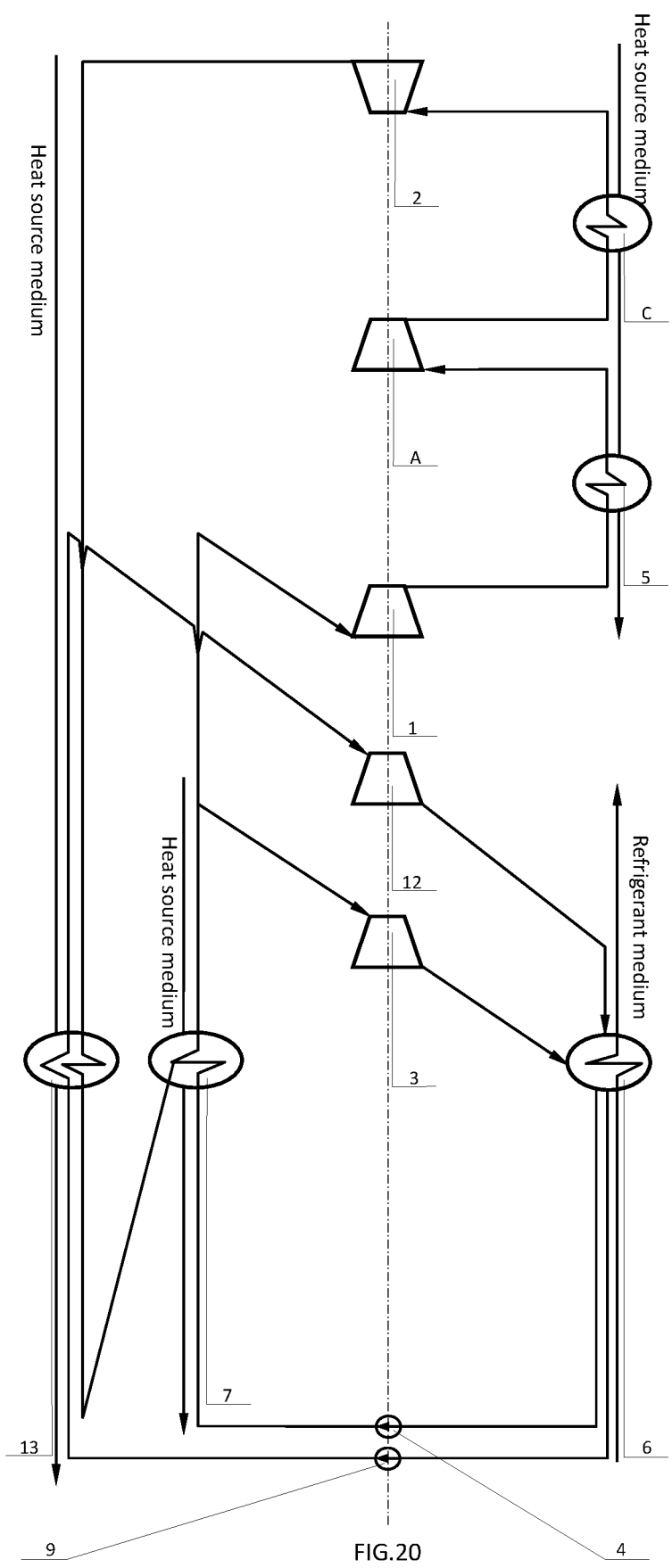
FIG. 20 is the type 18 principle thermal system diagram of the vapor power device for combined cycle provided in this invention.

The vapor power device for combined cycle described in the FIG. 20 works as follows:

(1) Structurally, In the vapor power device for combined cycle shown in the FIG. 11, if an added compressor and an added high temperature heat exchanger are added, and 'the compressor 1 connects to expander 2 by a vapor channel via the high temperature heat exchanger 5' is replaced by 'the compressor 1 connects to the added compressor A by a vapor pipeline via the high temperature heat exchanger 5, the added compressor A connects to the expander 2 by a vapor channel via the added high temperature heat exchanger C', the added high temperature heat exchanger C connects to the external part by a working-medium pipeline of the heat source, the expander 2 connects to the added compressor A and transfers power.

(2) Procedurally, compared with the vapor power device for combined cycle shown in FIG. 11, the differences are as follows: the vapor discharged from the compressor 1 flows through the high-temperature heat exchanger 5 and absorbs heat, and then enters the added compressor A where the pressure increases; The vapor discharged from the added compressor A connects to the added high-temperature heat exchanger C and absorbs heat, and then enters the expander 2 and works; The expander 2 supplies power to the added compressor A, and the heat source working-medium provide a driving thermal load via the added high-temperature heat exchanger C, the high-temperature heat exchanger 5, the middle-temperature evaporator 13 and the mixing evaporator 7, in summary, these above-mentioned processes build up the vapor device of combined cycle.

Figure 21:
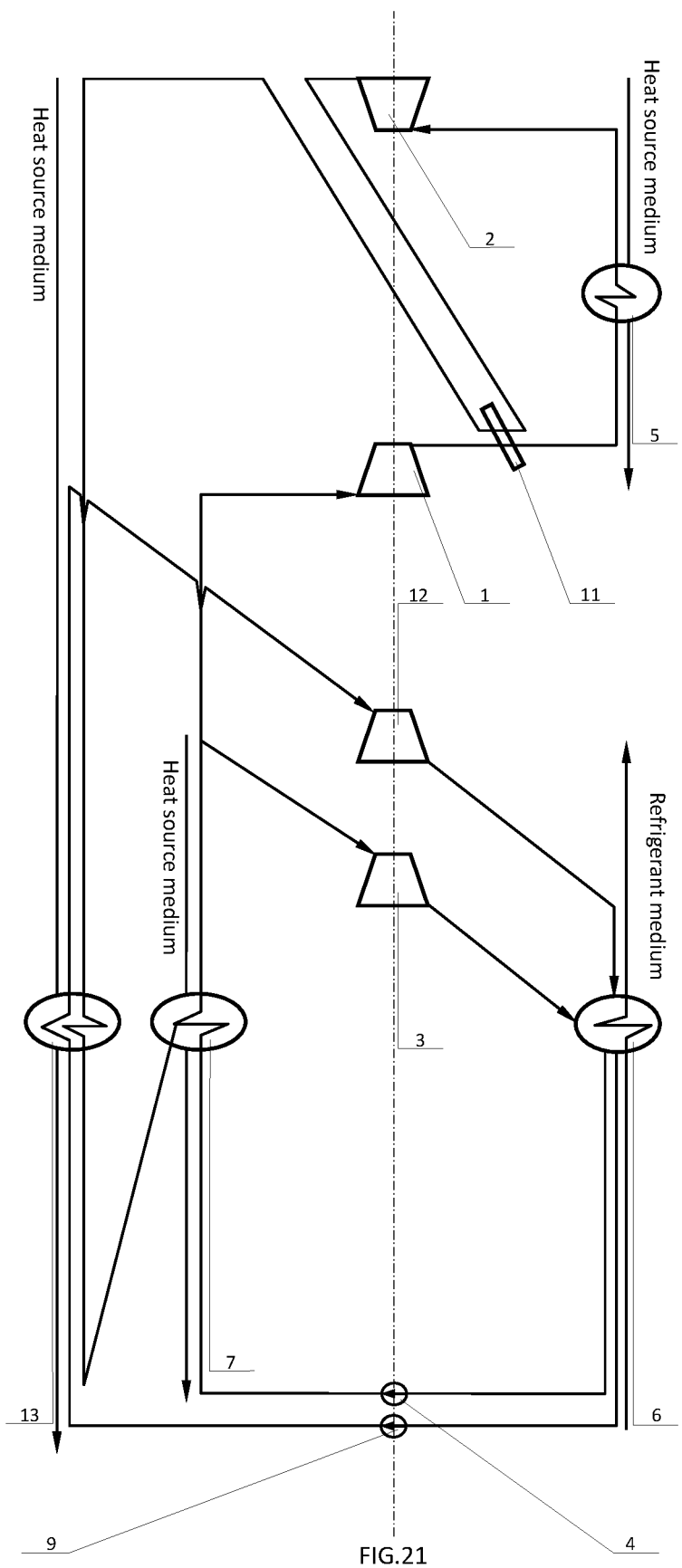
FIG. 21 is the type 19 principle thermal system diagram of the vapor power device for combined cycle provided in this invention.

The vapor power device for combined cycle described in the FIG. 21 works as follows:

(1) Structurally, In the vapor power device for combined cycle shown in the FIG. 11, if a high temperature reheater is added, and 'the compressor 1 connects to expander 2 by a vapor channel via the high temperature heat exchanger 5' is replaced by 'the compressor 1 connects to the added compressor A by a vapor channel via the high temperature reheater 11 and the high temperature heat exchanger 5', and 'the expander 2 connects to the mixing evaporator 7 by a vapor channel via the middle-temperature evaporator 13' is replaced by 'the expander 2 connects to the mixing evaporator 7 by a vapor channel via the high temperature reheater 11 and the middle-temperature evaporator 13', these above-mentioned equipment and pipelines build up the vapor device of combined cycle.

(2) Procedurally, compared with the vapor power device for combined cycle shown in FIG. 11, the differences are as follows: the vapor discharged from the compressor 1 flows through the high-temperature reheater 11 and the high-temperature heat exchanger 5 and gradually heats up, the vapor discharged from the expander 2 flows through the high-temperature reheater 11 and the middle-temperature evaporator 13 and gradually releases the heat and then enter the mixing evaporator 7, in summary, these above-mentioned processes build up the vapor device of combined cycle.

Figure 22:
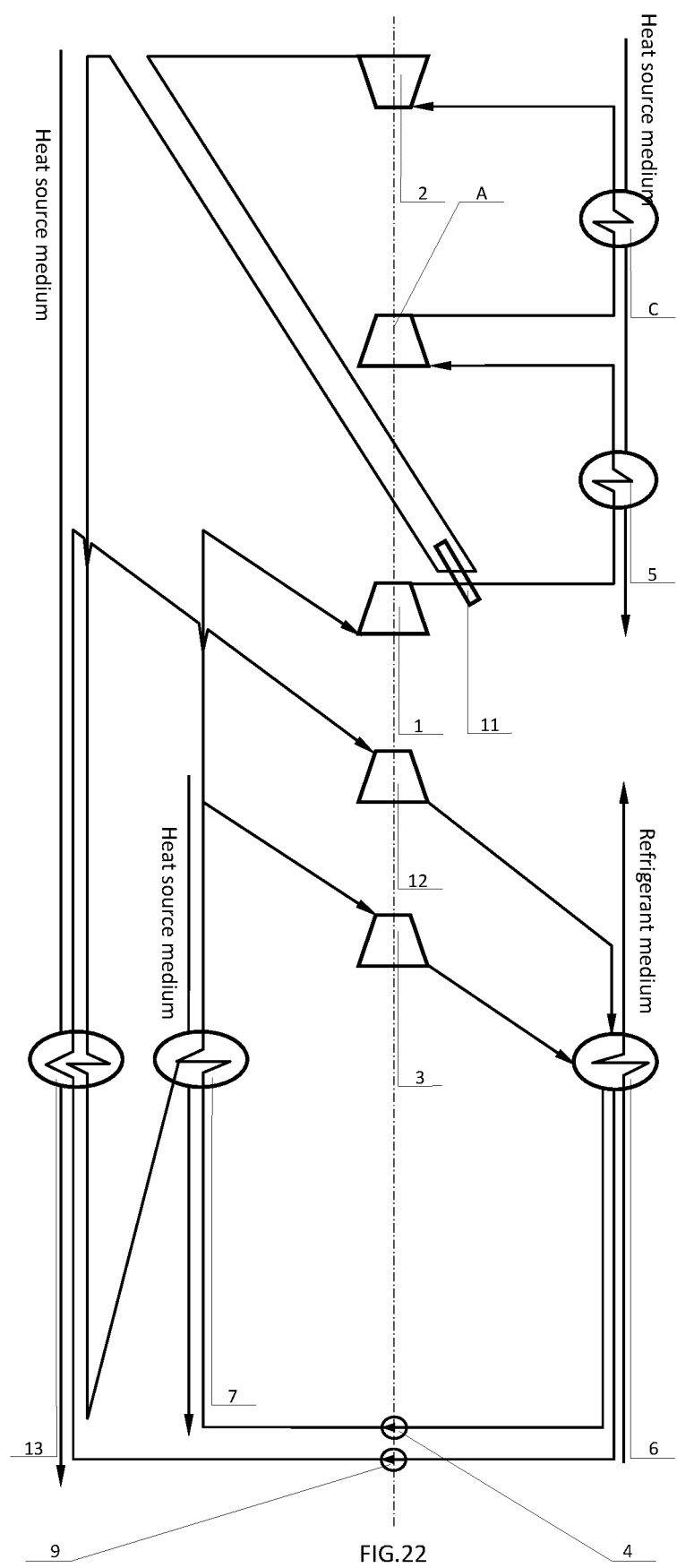
FIG. 22 is the type 20 principle thermal system diagram of the vapor power device for combined cycle provided in this invention.

The vapor power device for combined cycle described in the FIG. 22 works as follows:

(1) In the vapor power device for combined cycle in the FIG. 11, if an added high-temperature reheater, an added compressor and an added high-temperature heat exchanger is added, 'the compressor 1 connects to the expander 2 by a vapor channel via the high-temperature heat exchanger 5' is replaced by 'the compressor 1 connects to the added compressor A by a vapor channel via the high-temperature heat exchanger 5, the added compressor A connects to the expander 2 by a vapor channel via the added high-temperature heat exchanger C', 'the expander 2 connects to the mixing evaporator 7 by a vapor channel via the middle-temperature reheater 13' is replaced by 'the expander 2 connects to the mixing evaporator 7 by a vapor channel via the high-temperature reheater 11 and the middle-temperature evaporator 13, the added high-temperature heat exchanger C connects to the external part by a working-medium pipeline, the expander 2 connects to the added compressor A and transfers power', these above-mentioned processes build up the vapor power device for combined cycle.

(2) Structurally, compared with the vapor power device for combined cycle shown in FIG. 11, the differences are as follows: the vapor discharged from the compressor 1 flows through the high-temperature reheater 11 and the high-temperature heat exchanger 5 and gradually absorbs heat, and then enters the added compressor A; The vapor discharged from the added compressor A flows through the added high-temperature heat exchanger C and absorbs heat, then enters the expander 2 and works; The vapor discharged from the expander 2 flows through the high temperature heat exchanger 11 and the middle-temperature evaporator 13 and release heat gradually and then enters the mixing evaporator 7; The expander 2 supplies power to the added compressor A, and the heat source working-medium provide a drive thermal load via the added high-temperature heat exchanger C, the high-temperature heat exchanger 5, the middle-temperature evaporator 13 and the mixing evaporator 7, these above-mentioned processes build up the vapor power device for combined cycle.

The vapor power device for combined cycle described in the FIG. 23 works as follows:

(1) Structurally, In the vapor power device for combined cycle in the FIG. 11, if an added expander and an added high-temperature heat exchanger is added, 'the compressor 1 connects to the expander 2 by a vapor channel via the high-temperature heat exchanger 5' is replaced by 'the compressor 1 connects to the added expander B by a vapor channel via the high-temperature heat exchanger 5, the added expander B connects to the expander 2 by a vapor channel via the high-temperature heat exchanger C, the added high-temperature heat exchanger C connects to the external part by a working-medium pipeline of the heat source, the added expander B connects to the compressor 1 and transfers power', in summary, these above-mentioned equipment and pipelines build up the vapor power device for combined cycle.

(2) Procedurally, compared with the vapor power device for combined cycle shown in FIG. 11, the differences are as follows: the vapor discharged from the compressor 1 flows through the high-temperature heat exchanger 5 and absorbs heat, and then enters the added expander B and works, the vapor discharged from the added expander B flows through the added high-temperature heat exchanger C and absorbs heat, and then enters the expander 2 and works; The work outputted from the added expander B is supplied to the compressor 1 for power or outputted externally, the heat source working-medium provides a driving heat load by the adding high-temperature heat exchanger C, the high-temperature heat exchanger 5, a middle-temperature evaporator 13 and a mixing evaporator 7, in summary, these above-mentioned equipment and pipelines build up the vapor power device for combined cycle.

Figure 24:
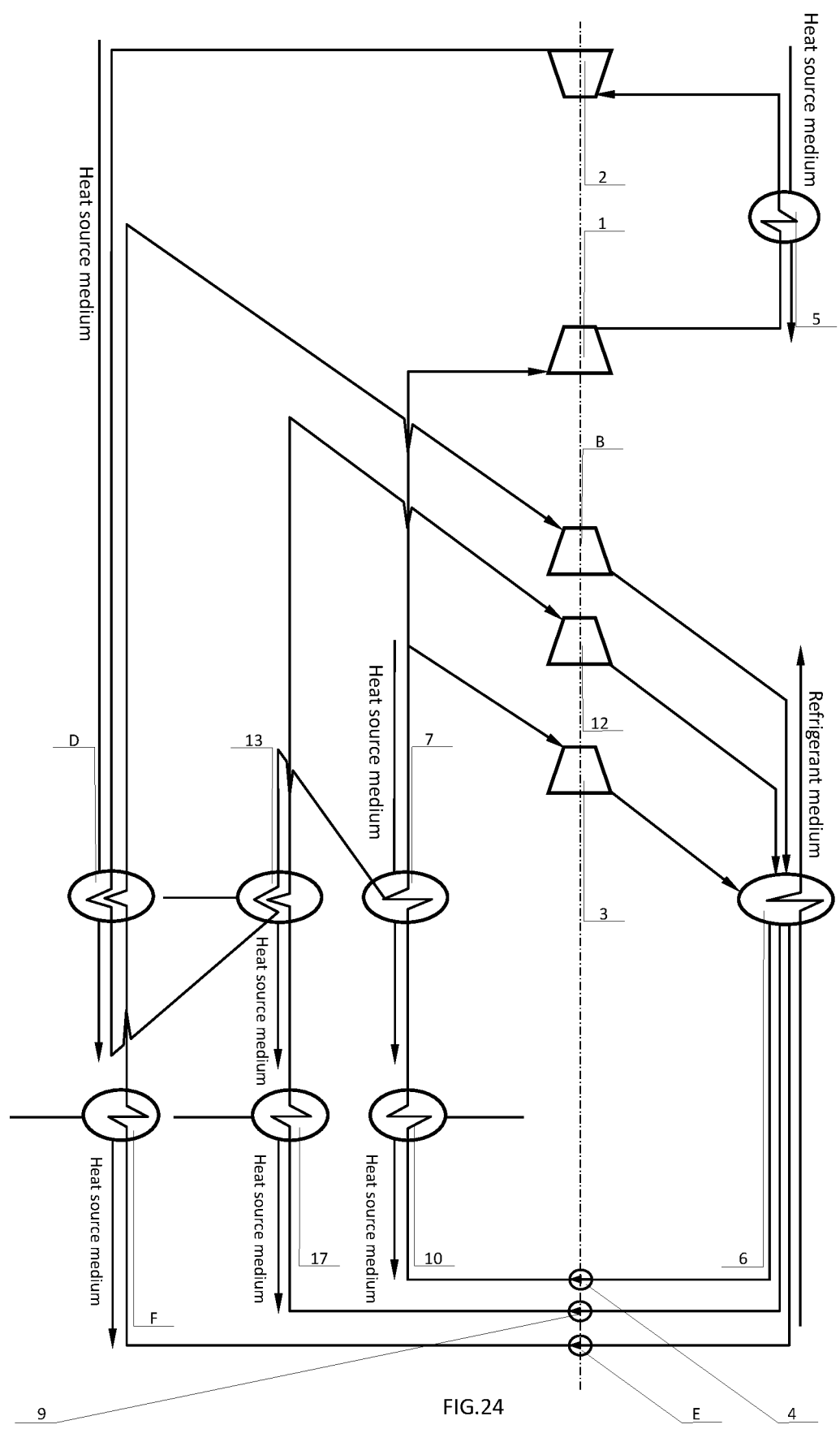
FIG. 24 is the type 22 principle thermal system diagram of the vapor power device for combined cycle provided in this invention.

The vapor power device for combined cycle described in the FIG. 24 works as follows:

(1) Structurally, In the vapor power device for combined cycle described in the FIG. 14, if an added expander, an added middle-temperature evaporator, an added circulating pump and an added preheater, the condenser 6 connects to the added middle-temperature evaporator D by an added condensate pipeline via the added circulating pump E and the added preheater F, the added middle-temperature evaporator D connects to the added expander B by a vapor channel, the added expander B connects to the condenser 6 by a vapor channel, 'the expander 2 connects to the mixing evaporator 7 by a vapor channel via the middle-temperature evaporator 13' is replaced by 'the expander 2 connects to the mixing evaporator 7 by a vapor channel via the added middle-temperature evaporator D and the middle-temperature evaporator 13', the added preheater F connects to the external part by a working-medium pipeline of the heat source, the added middle-temperature evaporator D be connected to the external part by a working-medium pipeline of the heat source, the added expander B connects to the external part and output power, in summary, these processes build up the vapor power device for combined cycle.

(2) Procedurally, compared with the vapor power device for combined cycle shown in FIG. 14, the difference are as follows: the vapor discharged from the expander 2 flows through the added middle-temperature evaporator D and the middle-temperature evaporator 13 and gradually releases the heat and cools down and then enters the mixing evaporator 7; part of the condensate of the condenser 6 is boosted by the added circulating pump E, flows through the added preheater F, absorbs heat and flows through the added middle-temperature evaporator D, absorbs heat and vaporizes, and then enters the added expander B and works, the vapor discharged from the added expander B enters the condenser 6, releases heat and condenses; The heat source working-medium provides a driving heat load via the high temperature heat exchanger 5, the added middle-temperature evaporator D, the middle-temperature evaporator 13, the mixing evaporator 7, the added preheater B, the preheater 10 and the second preheater 17, the expander 2 supplies power to the compressor 1, the expander 2, the second expander 3, the third expander 12 and the added expander B output power, in summary, these processes build up the vapor power device for combined cycle.

Figure 23:
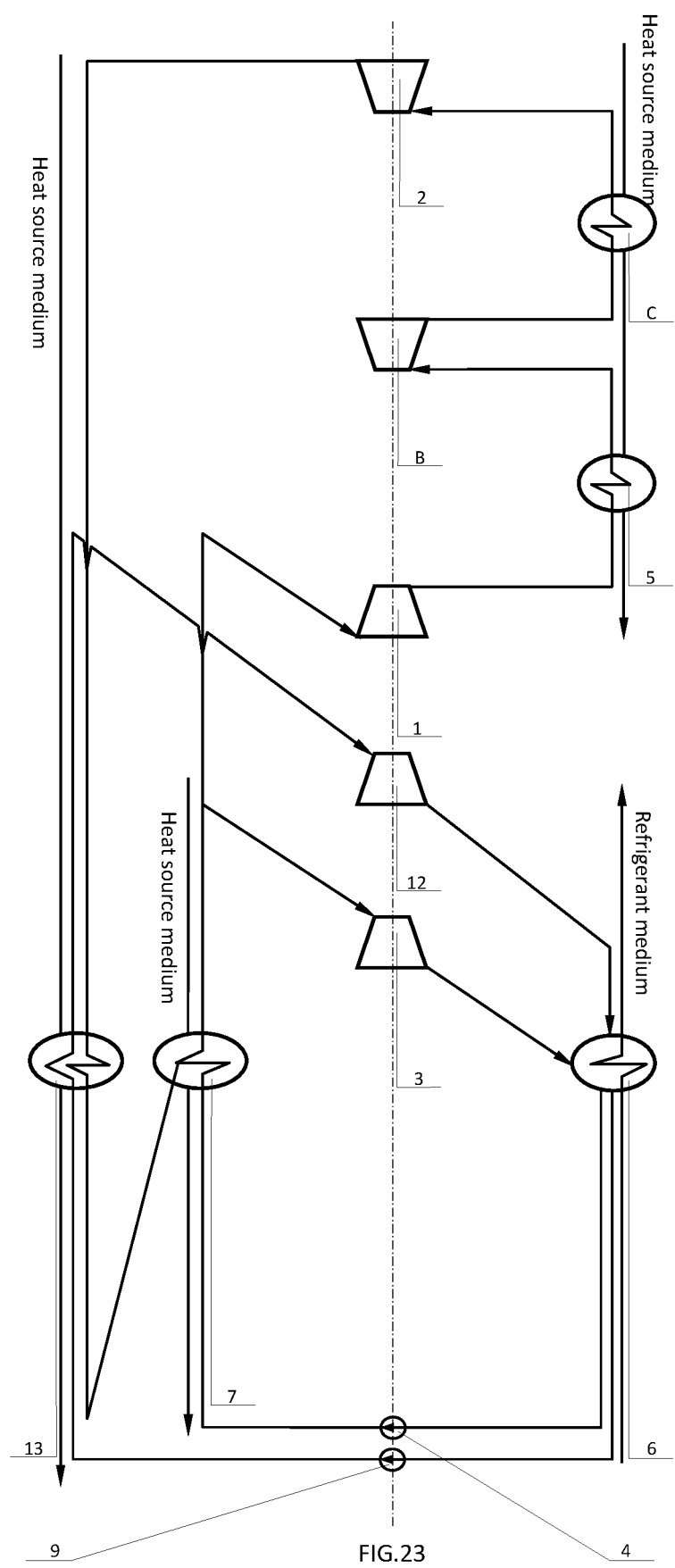
FIG. 23 is the type 21 principle thermal system diagram of the vapor power device for combined cycle provided in this invention.
Figure 25:
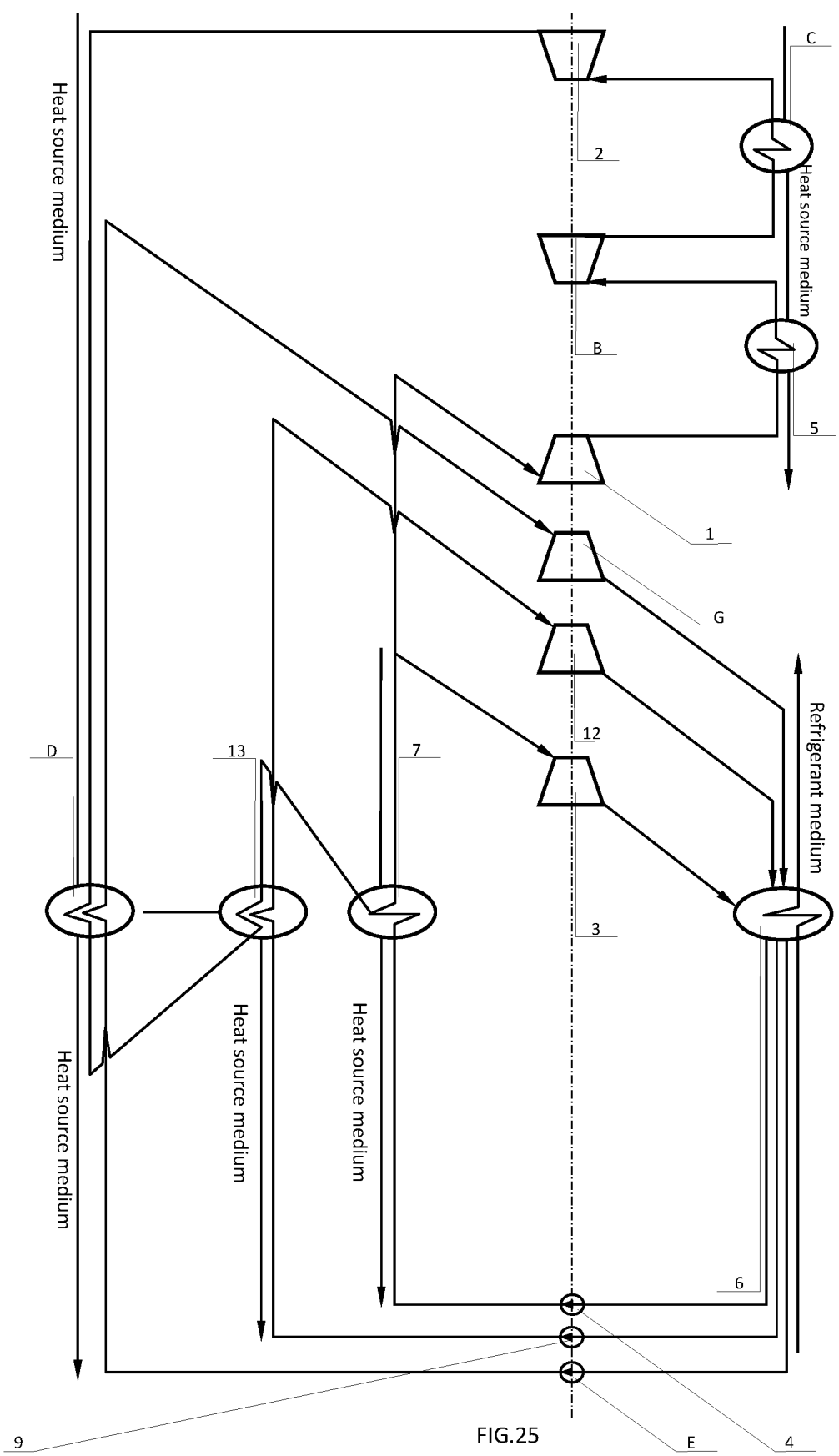
FIG. 25 is the type 23 principle thermal system diagram of the vapor power device for combined cycle provided in this invention.

The vapor power device for combined cycle described in the FIG. 25 works as follows:

(1) Structurally, In the vapor power device for combined cycle described in the FIG. 23, if an added second expander, an added middle-temperature evaporator and an added circulating pump, the condenser 6 connects to the added middle-temperature evaporator D by a condensate pipeline via the added circulating pump E, the added middle-temperature evaporator D connects to the added second expander G by a vapor pipeline, the added second expander G connects to the condenser 6 by a vapor pipeline, 'the expander 2 connects to the mixing evaporator 7 by a vapor channel via the middle-temperature evaporator 13' is replaced by 'the expander 2 connects to the mixing evaporator 7 by a vapor channel via the added middle-temperature evaporator D and the middle-temperature evaporator 13', the added middle-temperature evaporator D be connected to the external part by a working-medium channel of the heat source, the added second expander G connects to the external part and transfers power, in summary, these processes build up the vapor power device for combined cycle.

(2) Procedurally, Compared with the vapor power device for combined cycle shown in FIG. 23, the difference are as follows: the vapor discharged from the expander 2 flows through the added middle-temperature evaporator D and the middle-temperature evaporator 13 and gradually releases the heat and cools down and then enters the mixing evaporator 7; part of the condensate of the condenser 6 is boosted by the added circulating pump E and flows through the added middle-temperature evaporator D, absorbs heat and vaporizes, and then is supplied to the added second expander G and works, the vapor discharged from the added second expander G enters the condenser 6, releases heat and condenses; The heat source working-medium provides the driving heat load via the high-temperature heat exchanger 5, the added high-temperature heat exchanger C, the added middle-temperature evaporator D, the middle-temperature evaporator 13 and the mixing evaporator 7, the expander 2 supplies power to the compressor 1, and the expander 2, the second expander 3, the third expander 12 and the added second expander G output externally power, in summary, these processes build up the vapor power device for combined cycle.

The Effect Achieved by the Invention Technology:

The single working-medium vapor combined cycle and the vapor power device for combined cycle proposed by this invention has the following effects and advantages (mainly take a vapor power device with vapor as the circulating working-medium as an example):

(1) Preserve the original advantages of the traditional steam power cycle. For example, in a steam power cycle device in which steam is the circulating working-medium, water vapor is widely available, inexpensive, has a wide range of operating parameters, and still work in a subcritical, critical, supercritical or ultra-supercritical state; There is no incompatibility between the vapor and the environment, and the thermal pollution is extremely small.

(2) Compared with the traditional steam power device with water vapor as the circulating working-medium, the heat source load of the single working-medium vapor combined cycle (provided by the external heat source and the exhaust heat released by the expander) is greatly increased during the phase change process, which is beneficial to reduce the irreversible loss because of the temperature difference.

(3) The use of the mixing evaporator reduces heat transfer process and improves thermal efficiency.

(4) Staged evaporation achieves reasonable use of temperature difference, reduces irreversible heat transfer loss, and improves thermal efficiency.

(5) The circulating working-medium and the heat source working-medium in the high temperature zone are both gases, so the single working-medium vapor combined cycle is beneficial to reduce the heat transfer loss because of the temperature difference and improve the heat efficiency in the heat absorption link of the circulating working working-medium from the heat source.

(6) The adoption of low-pressure and high-temperature mode in high temperature zone solves the contradiction between thermal efficiency, circulating medium parameters and the pressure and temperature resistance of the pipe in traditional steam power device, so that the temperature difference between heat source and circulating medium be greatly reduced, and the thermal efficiency be Greatly improved.

(7) The adoption a single working fluid reduces operating costs and improves flexibility of adjustment.

(8) For the steam power device with solid fuel typified by coal, there is no need to impose an additional burden on the preparation and storage of circulating steam in the high temperature zone.

(9) Under the premise of achieving high thermal efficiency, low-pressure be selected, so that the safety of the of the device is greatly improved.

The invention claimed is:

1. A vapor power device for combined cycle comprising a compressor, a first expander, a second expander, a circulating pump, a high temperature heat exchanger, a condenser, a mixing evaporator, a reheater and a second circulating pump; wherein the condenser connects the reheater by a condensate pipeline via the circulating pump, the second expander connects the reheater by a extraction vapor channel, the reheater connects the mixing evaporator by a condensate pipeline via the second circulating pump, the first expander connects the mixing evaporator by a vapor channel, the mixing evaporator connects the compressor and the second expander respectively, the compressor connects the first expander by a vapor channel via the high temperature heat exchanger, the second expander connects the condenser by a vapor channel; the high temperature heat exchanger connects the external part by a working-medium channel of the heat source, the condenser connects the external part by a refrigerant channel, the mixing evaporator is connected with the external part by a working-medium channel of heat source, the first expander connects the compressor and transfers power, the first expander and the second expander connect to the external part and output power, these above-mentioned equipment and pipelines build up the vapor power device for combined cycle; among them, the first expander be connected with the compressor, the circulating pump and the second circulating pump and transfers power.

2. A vapor power device for combined cycle comprising a compressor, a first expander, a second expander, a circulating pump, a high temperature heat exchanger, a condenser, a mixing evaporator and a preheater; wherein the condenser connects the mixing evaporator by a condensate pipeline via the circulating pump and the preheater, the first expander connects the mixing evaporator by a vapor channel, the mixing evaporator connects the compressor and the second expander respectively, the compressor connects the first expander by a vapor channel via the high temperature heat exchanger, the second expander connects condenser by a vapor channel; the high temperature heat exchanger connects the external part by a working-medium channel of the heat source, the condenser connects the external part by a refrigerant working-medium channel, the mixing evaporator can connect to the external part by the working-medium channel of the heat source, the preheater connects the external part by a working-medium channel of heat source, the first expander connects the compressor and transfers power, the first expander and the second expander connect to the external part and output power the first expander is connected with the compressor and transfers power.

3. A vapor power device for combined cycle comprising a compressor, a first expander, a second expander, a circulating pump, a high temperature heat exchanger, a condenser, a mixing evaporator, a third expander, a second circulating pump and a middle temperature evaporator; wherein the condenser connects the mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; the condenser connects the middle temperature heat exchanger by a condensate pipeline via the second circulating pump, the middle temperature heat exchanger connects the third expander by a vapor channel, the third expander connects the condenser by a vapor channel; the high temperature heat exchanger connects the external part by a heat source working-medium channel, the condenser connects the external part by a refrigerant working-medium channel, the first expander connects the compressor and transfers power, the first expander, the second expander and the third expander connect to the external part and output power.

4. A vapor power device for combined cycle comprising a compressor, a first expander, a second expander, a circulating pump, a high temperature heat exchanger, a condenser, a mixing evaporator, a third expander, a second circulating pump and a middle temperature evaporator; wherein the condenser connects the mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; the condenser connects the middle temperature heat exchanger by a condensate pipeline via the second circulating pump, the middle temperature heat exchanger connects the third expander by a vapor channel, the third expander connects the condenser by a vapor channel; the high temperature heat exchanger connects the external part by a heat source working-medium channel, the condenser connects the external part by a refrigerant working-medium channel, the middle temperature evaporator or the mixing evaporator connects the external part by a heat source working-medium channel, the first expander connects the compressor and transfers power, the first expander, the second expander and the third expander connect to the external part and output power.

5. A vapor power device for combined cycle comprising a compressor, a first expander, a second expander, a circulating pump, a high temperature heat exchanger, a condenser, a mixing evaporator, a third expander, a second circulating pump and a middle temperature evaporator; wherein the condenser connects the mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects the expender by a vapor channel via the high temperature heat exchanger, the second expander connects the condenser by a vapor channel; the condenser connects the middle temperature heat exchanger by a condensate pipeline via the second circulating pump, the middle temperature heat exchanger connects the third expander by a vapor channel, the third expander connects the condenser by a vapor channel; the high temperature heat exchanger connects the external part by a heat source working-medium channel, the condenser connects the external part by a refrigerant working-medium channel, the middle temperature evaporator and the mixing evaporator connects the external part by the heat source working-medium channel respectively, the first expander connects the compressor and transfers power, the first expander; the second expander and the third expander connect to the external part and output power.

6. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump; wherein the condenser connects the reheater by a condensate pipeline via the circulating pump, the second expander or the third expander connects the reheater by the extraction vapor pipeline, the reheater connects mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the first expander by a vapor channel via the high temperature heat exchanger, the second expander connects the condenser by a vapor channel; the high temperature heat exchanger connects the external part by a working-medium channel of the heat source, the condenser connects the external part by a refrigerant working-medium channel, the first expander connects the compressor and transfers power, the first expander, the second expander and the third expander connect to the external part and output power.

7. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump, wherein the condenser connects the reheater by a condensate pipeline via the circulating pump, the second expander or the third expander connects the reheater by the extraction vapor pipeline, the reheater connects mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the first expander by a vapor channel via the high temperature heat exchanger, the second expander connects the condenser by a vapor channel; the high temperature heat exchanger connects the external part by a working-medium channel of the heat source, the condenser connects the external part by a refrigerant working-medium channel, the middle temperature evaporator or the mixing evaporator connects the external part by a working-medium channel of the hear source, the first expander connects the compressor and transfers power, the first expander, the second expander and the third expander connect to the external part and output power.

8. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump; wherein the condenser connects the reheater by a condensate pipeline via the circulating pump, the second expander or the third expander connects the reheater by the extraction vapor pipeline, the reheater connects mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the first expander by a vapor channel via the high temperature heat exchanger, the second expander connects the condenser by a vapor channel; the high temperature heat exchanger connects the external part by a working-medium channel of the heat source, the condenser connects the external part by a refrigerant working-medium channel, the middle temperature evaporator and the mixing evaporator connects the external part by a working-medium channel of the hear source, the first expander connects the compressor and transfers power, the first expander, the second expander and the third expander connect to the external part and output power.

9. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump; wherein the condenser connects mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects high temperature heat exchanger and the first expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; the high temperature evaporator connects the external part by a working-medium of the heat source, the condenser connects the external part by a refrigerant working-medium pipeline, the first expander connects the compressor and transfers power, the first expander, the second expander and the third expander connect to the external part and output power.

10. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump; wherein the condenser connects mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects high temperature heat exchanger and the first expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; the high temperature evaporator connects the external part by a working-medium of the heat source, the condenser connects the external part by a refrigerant working-medium pipeline, the first expander connects the compressor and transfers power, the middle temperature evaporator or the mixing evaporator connects the external part by a working-medium pipeline of the heat source, the first expander connects the compressor and transfers power, the first expander, the second expander and the third expander connect to the external part and Output power.

11. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator and a third circulating pump; wherein the condenser connects mixing evaporator by a condensate pipeline via the circulating pump, the first expander connects the mixing evaporator by a vapor channel via the middle temperature evaporator, the mixing evaporator connects the compressor and the second expander by a vapor channel respectively, the compressor connects high temperature heat exchanger and the first expander by a vapor channel, the second expander connects the condenser by a vapor channel, the condenser connects the reheater by a condensate pipeline via the second circulating pump, the third expander or the second expander connects the reheater by a extraction vapor channel, the reheater connects the middle temperature evaporator by a condensate pipeline via the third circulating pump, the middle temperature evaporator connects the third expander by a vapor channel, the third expander connects a condenser by a vapor channel; the high temperature evaporator connects the external part by a working-medium of the heat source, the condenser connects the external part by a refrigerant working-medium pipeline, the first expander connects the compressor and transfers power, the middle temperature evaporator and the mixing evaporator connects the external part by a working-medium pipeline of the heat source, the first expander connects the compressor and transfers power, the first expander, the second expander and the third expander connect to the external part and output power.

12. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator, a third circulating pump, a second reheater and a forth circulating pump; wherein the condenser connects the reheater by a condensate pipeline via the circulating pump, the second expander or the third expander connects the reheater by a extraction vapor channel, the reheater connects the mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the high temperature heat exchanger and the first expander by a vapor channel, the second expander connects the condenser by a vapor channel; the condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the first expander connects the compressor and transfers power, the first expander, the second expander and the third expander connect to the external part and output power.

13. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator, a third circulating pump, a second reheater and a forth circulating pump; wherein the condenser connects the reheater by a condensate pipeline via the circulating pump, the second expander or the third expander connects the reheater by a extraction vapor channel, the reheater connects the mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the high temperature heat exchanger and the first expander by a vapor channel, the second expander connects the condenser by a vapor channel; the condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the middle evaporator or the mixing evaporator connects the external part by a working-medium channel of the heat source, the first expander connects the compressor and transfers power, the first expander, the second expander and the third expander connect to the external part and output power.

14. A vapor power device for combined cycle comprising a compressor, a first expander, a second expander, a circulating pump, a high temperature heat exchanger, a condenser, a mixing evaporator, a reheater, a second circulating pump, a third expander, a middle temperature evaporator, a third circulating pump, a second reheater and a forth circulating pump; wherein the condenser connects the reheater by a condensate pipeline via the circulating pump, the second expander or the third expander connects the reheater by a extraction vapor channel, the reheater connects the mixing evaporator by a condensate pipeline via the second circulating pump, the first expander connects the mixing evaporator by a vapor channel via the middle temperature evaporator, the mixing evaporator connects the compressor and the second expander by a vapor channel respectively, the compressor connects the high temperature heat exchanger and the first expander by a vapor channel, the second expander connects the condenser by a vapor channel; the condenser connects the second reheater by a condensate pipeline via the third circulating pump, and the third expander or the second expander connects the second reheater by a extraction vapor channel, the second reheater connects the middle temperature evaporator by a condensate pipeline via the forth circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the middle evaporator and the mixing evaporator connects the external part by a working-medium channel of the heat source respectively, the first expander connects the compressor and transfers power, the first expander, the second expander and the third expander connect to the external part and output power.

15. A vapor power device for combined cycle comprising a compressor, a first expander, a second expander; a circulating pump, a high temperature heat exchanger, a condenser, a mixing evaporator, a second circulating pump, a preheater, a third expander and a middle temperature evaporator; wherein the condenser connects the mixing evaporator by a condensate pipeline via the circulating pump and the preheater, the first expander connects the mixing evaporator by a vapor channel via the middle temperature evaporator, the mixing evaporator connects the compressor and second expander by a vapor channel respectively, the compressor connects the first expander by a vapor channel via the high temperature heat exchanger, the second expander connects the condenser by a vapor channel; the condenser connects the middle temperature evaporator by a condensate pipeline via the second circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the preheater connects the external part by a working-medium pipeline of the heat source, the first expander; the second expander and the third expander connect to the external part and output power.

16. A vapor power device for combined cycle comprising a compressor, a first expander, a second expander, a circulating pump, a high temperature heat exchanger, a condenser, a mixing evaporator, a second circulating pump, a preheater, a third expander and a middle temperature evaporator; wherein the condenser connects the mixing evaporator by a condensate pipeline via the circulating pump and the preheater, the first expander connects the mixing evaporator by a vapor channel via the middle temperature evaporator, the mixing evaporator connects the compressor and second expander by a vapor channel respectively, the compressor connects the first expander by a vapor channel via the high temperature heat exchanger, the second expander connects the condenser by a vapor channel; the condenser connects the middle temperature evaporator by a condensate pipeline via the second circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the middle evaporator or the mixing evaporator connects the external part by a working-medium channel of the heat source, the preheater connects the external part by a working-medium pipeline of the heat source, the first expander, the second expander and the third expander connect to the external part and output power.

17. A vapor power device for combined cycle comprising a compressor, a first expander, a second expander, a circulating pump, a high temperature heat exchanger, a condenser, a mixing evaporator, a second circulating pump, a preheater, a third expander and a middle temperature evaporator; wherein the condenser connects the mixing evaporator by a condensate pipeline via the circulating pump and the preheater, the first expander connects the mixing evaporator by a vapor channel via the middle temperature evaporator, the mixing evaporator connects the compressor and second expander by a vapor channel respectively, the compressor connects the first expander by a vapor channel via the high temperature heat exchanger, the second expander connects the condenser by a vapor channel; the condenser connects the middle temperature evaporator by a condensate pipeline via the second circulating pump, the middle temperature evaporator connects the third expander by a vapor channel, the third expander connects the condenser by a vapor channel; the high temperature evaporator connects the external part by a working-medium pipeline of the heat source, the condenser connects the external part by the refrigerant working-medium channel, the middle evaporator and the mixing evaporator connects the external part by a working-medium channel of the heat source respectively, the preheater connects the external part by a working-medium pipeline of the heat source, the first expander, the second expander and the third expander connect to the external part and output power.

18. A vapor power device for combined cycle comprising a compressor, a first expander, a second expander, a circulating pump, a high-temperature heat exchanger, a condenser, a mixing evaporator, a second circulating pump, a preheater, a third expander and a middle-temperature evaporator; wherein the condenser connects the mixing evaporator by a condensate pipeline via the circulating pump, the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the preheater, the middle-temperature evaporator connects the third expander by a vapor channel, the third expander connects the condenser by a vapor channel; the high-temperature evaporator connects the external part by a working-medium channel of the heat source, the condenser connects the external part by a condensate pipeline, the preheater connects the external part by a working-medium pipeline of the heat source, the first expander connects the compressor and transfers power, the first expander, the second expander and the third expander connect to the external part and output power.

19. A vapor power device for combined cycle comprising a compressor, a first expander, a second expander, a circulating pump, a high-temperature heat exchanger, a condenser, a mixing evaporator, a second circulating pump, a preheater, a third expander and a middle-temperature evaporator; wherein the condenser connects the mixing evaporator by a condensate pipeline via the circulating pump, the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the preheater, the middle-temperature evaporator connects the third expander by a vapor channel, the third expander connects the condenser by a vapor channel; the high-temperature evaporator connects the external part by a working-medium channel of the heat source, the condenser connects the external part by a condensate pipeline, the middle-temperature evaporator or the mixing evaporator connects the external part by a working-medium pipeline of the heat source, the preheater connects the external part by a working-medium pipeline of the heat source, the first expander connects the compressor and transfers power; the first expander; the second expander and the third expander connect to the external part and output power.

20. A vapor power device for combined cycle comprising a compressor, a first expander, a second expander, a circulating pump, a high-temperature heat exchanger, a condenser, a mixing evaporator, a second circulating pump, a preheater, a third expander and a middle-temperature evaporator; wherein the condenser connects the mixing evaporator by a condensate pipeline via the circulating pump; the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the preheater, the middle-temperature evaporator connects the third expander by a vapor channel, the third expander connects the condenser by a vapor channel; the high-temperature evaporator connects the external part by a working-medium channel of the heat source, the condenser connects the external part by a condensate pipeline, the middle-temperature evaporator and the mixing evaporator connects the external part by a working-medium pipeline of the heat source respectively, the preheater connects the external part by a working-medium pipeline of the heat source, the first expander connects the compressor and transfers power, the first expander, the second expander and the third expander connect to the external part and output power.

21. A vapor power device for combined cycle comprising a compressor, a first expander, a second expander, a circulating pump, a high-temperature heat exchanger, a condenser, a mixing evaporator, a second circulating pump, a preheater, a third expander, a middle-temperature evaporator and a second preheater; wherein the condenser connects the mixing evaporator by a condensate pipeline via the circulating pump and the preheater, the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the second preheater, the middle-temperature evaporator connects the third expander by a vapor channel, the third expander connects the condenser by a vapor channel; the high-temperature heat exchanger connects the external part by a working-medium pipeline of the heat source, the condenser connects the external part by a refrigerant working-medium channel, the preheater and the second preheater connect to the external part by a working-medium pipeline respectively, the first expander connects the compressor and transfers power, the first expander, the second expander and the third expander connect to the a part and output power.

22. A vapor power device for combined cycle comprising a compressor, a first expander, a second expander, a circulating pump, a high-temperature heat exchanger, a condenser, a mixing evaporator, a second circulating pump, a preheater, a third expander, a middle-temperature evaporator and a second preheater; wherein the condenser connects the mixing evaporator by a condensate pipeline via the circulating pump and the preheater, the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the second preheater, the middle-temperature evaporator connects the third expander by a vapor channel, the third expander connects the condenser by a vapor channel; the high-temperature heat exchanger connects the external part by a working-medium pipeline of the heat source, the condenser connects the external part by a refrigerant working-medium channel, the middle-temperature evaporator or mixing evaporator connect to the external part by a working-medium channel of the heat source, the preheater and the second preheater connect to the external part by a working-medium pipeline respectively, the first expander connects the compressor and transfers power, the first expander, the second expander and the third expander connect to the external part and output power.

23. A vapor power device for combined cycle comprising a compressor, a first expander, a second expander, a circulating pump, a high-temperature heat exchanger, a condenser, a mixing evaporator, a second circulating pump, a preheater, a third expander, a middle-temperature evaporator and a second preheater; wherein the condenser connects the mixing evaporator by a condensate pipeline via the circulating pump and the preheater, the first expander connects the mixing evaporator by a vapor channel via the middle-temperature evaporator, the mixing evaporator connects the compressor and the second expander by a vapor channel respectively, the compressor connects the first expander by a vapor channel via the high-temperature heat exchanger, the second expander connects the condenser by a vapor channel; the condenser connects the middle-temperature evaporator by a condensate pipeline via the second circulating pump and the second preheater, the middle-temperature evaporator connects the third expander by a vapor channel, the third expander connects the condenser by a vapor channel; the high-temperature heat exchanger connects the external part by a working-medium pipeline of the heat source, the condenser connects the external part by a refrigerant working-medium channel, the middle-temperature evaporator and mixing evaporator connect to the external part by a working-medium channel of the heat source respectively, the preheater and the second preheater connect to the external part by a working-medium pipeline respectively, the first expander connects the compressor and transfers power, the first expander, the second expander and the third expander connect to the external part and output power.

24. A vapor power device for combined cycle comprising a compressor, a first expander, a second expander, a circulating pump, a high-temperature heat exchanger, a condenser, a mixing evaporator; a second circulating pump, a preheater, a middle-temperature evaporator and a second preheater; wherein the condenser connects the mixing evaporator by a condensate pipeline via the circulating pump and the preheater, the first expander connects the mixing evaporator by a vapor channel via the middle-temperature evaporator, and the mixing evaporator connects the compressor by a vapor channel, the mixing evaporator connects the second compressor by an intermediate intake channel, the compressor connects the first expander by a vapor channel via the high-temperature heat exchanger; the condenser connects the middle-temperature evaporator by a condensate pipeline via the second circulating pump and the second preheater, the middle-temperature evaporator connects the second expander by a vapor channel, the second expander connects the condenser by a vapor channel; the high-temperature heat exchanger connects the external part by a working-medium pipeline of the heat source, the condenser connects the external part by a refrigerant working-medium channel, the middle-temperature evaporator and the mixing evaporator connect to the external part by a working-medium channel of the heal source, the preheater and the second preheater connect to the external part by a working-medium pipeline of the heat source, the first expander connects the compressor and transfers power, the first expander and the second expander connect to the external part and transfer power.

* * * * *